US012120481B2

(12) United States Patent
Li et al.

(10) Patent No.: US 12,120,481 B2
(45) **Date of Patent: *Oct. 15, 2024**

(54) ACOUSTIC INPUT AND OUTPUT APPARATUS

(71) Applicant: SHENZHEN SHOKZ CO., LTD., Guangdong (CN)

(72) Inventors: Chaowu Li, Shenzhen (CN); Yueqiang Wang, Shenzhen (CN); Fen You, Shenzhen (CN); Junjiang Fu, Shenzhen (CN); Zhongqi Wu, Shenzhen (CN); Qian Chen, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,993

(22) Filed: Apr. 25, 2023

(65) Prior Publication Data

US 2023/0262377 A1 Aug. 17, 2023

Related U.S. Application Data

(63) Continuation of application No. 17/657,615, filed on Mar. 31, 2022, now Pat. No. 11,641,541, which is a (Continued)

(30) Foreign Application Priority Data

Apr. 30, 2020 (CN) ......................... 202020719606.1
Apr. 30, 2020 (CN) ......................... 202020720291.2

(Continued)

(51) Int. Cl.

*H04R 1/02* (2006.01)
*H04R 1/08* (2006.01)
*H04R 1/10* (2006.01)

(52) U.S. Cl.

CPC ............. *H04R 1/1075* (2013.01); *H04R 1/02* (2013.01); *H04R 1/08* (2013.01); *H04R 1/10* (2013.01);

(Continued)

(58) Field of Classification Search

CPC ... H04R 1/00; H04R 1/02; H04R 1/10; H04R 1/1008; H04R 1/1075; H04R 1/105;

(Continued)

(56) References Cited

U.S. PATENT DOCUMENTS 4,875,233 A * 10/1989 Derhaag ................. H04M 1/05 379/430
6,466,681 B1 * 10/2002 Siska, Jr. ............. H04R 5/0335 381/372

(Continued)

FOREIGN PATENT DOCUMENTS

CA 2561021 A1 10/2005
CA 2709832 A1 6/2009

(Continued)

OTHER PUBLICATIONS

Notice of Preliminary Rejection in Korean Application No. 10-2022-7029147 mailed on Sep. 11, 2023, 8 pages.

(Continued)

*Primary Examiner* — Thang V Tran
(74) *Attorney, Agent, or Firm* — METIS IP LLC

(57) ABSTRACT

The present disclosure discloses an acoustic input and output apparatus. The acoustic input and output apparatus may include a loudspeaker assembly, a sound-pickup assembly configured to pick up a sound signal, and a connection assembly including an elastic member, wherein a first end of the elastic member may connect to the loudspeaker assembly, and a second end of the elastic member may connect to the sound-pickup assembly. The elastic member may be (Continued)

configured to cause an average amplitude attenuation rate of vibrations within a phonic frequency band generated by the loudspeaker assembly to be larger than or equal to 35% in a process that the vibration transmits from the first end of the elastic member to the second end of the elastic member.

19 Claims, 18 Drawing Sheets

Related U.S. Application Data continuation of application No. 17/455,010, filed on Nov. 15, 2021, now Pat. No. 11,317,191, which is a continuation of application No. PCT/CN2021/089853, filed on Apr. 26, 2021.

(30) Foreign Application Priority Data

Apr. 30, 2020 (CN) ......................... 202020720293.1
Apr. 30, 2020 (CN) ......................... 202020725495.5
Apr. 30, 2020 (CN) ......................... 202020725563.8

(52) U.S. Cl.
CPC .......... *H04R 1/1008* (2013.01); *H04R 1/105* (2013.01); *H04R 2460/13* (2013.01)

(58) Field of Classification Search
CPC .......... H04R 1/04; H04R 1/083; H04R 1/028; H04R 1/2803; H04R 1/2892; H04R 1/2896; H04R 1/28; H03R 1/08
See application file for complete search history.

(56) References Cited

U.S. PATENT DOCUMENTS 6,681,022 B1 1/2004 Puthuff et al.
7,099,487 B2 8/2006 Fukuda
7,391,863 B2 * 6/2008 Viduya .................. H04M 1/05 379/430
8,139,807 B2 * 3/2012 Reiss .................. H04R 1/1058 381/375
11,317,191 B2 4/2022 Li et al.
2002/0176588 A1 11/2002 Seto et al.
2003/0076976 A1 4/2003 Fukuda
2004/0037444 A1 2/2004 Redmer et al.
2010/0040252 A1 2/2010 Thompson et al.
2010/0296684 A1 11/2010 Eberl et al.
2011/0228925 A1 * 9/2011 Birch .................. H04R 1/1041 379/428.02
2013/0208940 A1 8/2013 Hansen et al.
2014/0363012 A1 12/2014 Wolf et al.
2015/0382101 A1 * 12/2015 Dai ...................... H04R 1/1091 381/375
2016/0198254 A1 7/2016 Gecawicz et al.
2019/0253547 A1 8/2019 Kunimoto et al.
2019/0253809 A1 8/2019 Kunimoto et al.
2020/0118533 A1 4/2020 You
2021/0067862 A1 3/2021 Li et al.

FOREIGN PATENT DOCUMENTS

CN 1934896 A 3/2007
CN 202818553 U 3/2013
CN 205336486 U 6/2016
CN 208273200 U 12/2018
CN 209358728 U 9/2019
CN 211702354 U 10/2020
CN 211702356 U 10/2020
CN 211702357 U 10/2020
CN 211702358 U 10/2020
CN 212628327 U 2/2021
JP H08265888 A 10/1996
JP 2004104400 A 4/2004
JP 2013038455 A 2/2013
KR 20130125247 A 11/2013
KR 101819530 B1 1/2018
WO 2005051036 A2 6/2005
WO 2007103561 A2 9/2007
WO 2019243424 A1 12/2019

OTHER PUBLICATIONS

International Search Report in PCT/CN2021/089853 mailed on Jul. 15, 2021, 7 pages.
Written Opinion in PCT/CN2021/089853 mailed on Jul. 15, 2021, 6 pages.
Decision of Grant in Russian Application No. 2022120124 mailed on Jan. 20, 2023, 29 pages.
The Partial Supplementary European Search Report in European Application No. 21797620.8 mailed on Sep. 4, 2023, 14 pages.

* cited by examiner

A-A

ACOUSTIC INPUT AND OUTPUT APPARATUS

CROSS REFERENCE TO RELATED APPLICATIONS

This application is a Continuation of U.S. patent application Ser. No. 17/657,615, filed on Mar. 31, 2022, which is a Continuation of U.S. patent application Ser. No. 17/455,010 (issued as U.S. Pat. No. 11,317,191), filed on Nov. 15, 2021, which is a Continuation of International Application No. PCT/CN2021/089853, filed on Apr. 26, 2021, which claims priority of Chinese Patent Application No. 202020719606.1, filed on Apr. 30, 2020, Chinese Patent Application No. 202020720291.2, filed on Apr. 30, 2020, Chinese Patent Application No. 202020725495.5, filed on Apr. 30, 2020, Chinese Patent Application No. 202020725563.8, filed on Apr. 30, 2020, and Chinese Patent Application No. 202020720293.1, filed on Apr. 30, 2020, the entire contents of which are incorporated herein by reference.

TECHNICAL FIELD

The present disclosure relates to acoustics, in particular, relates to an acoustic input and output apparatus.

BACKGROUND

An acoustic input and output apparatus is an apparatus that facilitates sound input and sound output, such as a headset, glasses, or the like. The acoustic input and output apparatus may include a loudspeaker assembly and a sound-pickup assembly. The loudspeaker assembly may be configured to produce a sound signal, and the sound-pickup assembly may be configured to pick up a sound signal. In addition, the acoustic input and output apparatus may also include an assembly that keeps the acoustic input and output apparatus being in a stable contact with a user (e.g., when the acoustic input and output apparatus is a headset, a rear hook assembly and an ear hook assembly may be provided). However, at present, since a volume size of each assembly is relatively large, the overall size of the acoustic input and output apparatus is relatively large, and connections between various assemblies are easily to be invalid, which shortens the service life of the acoustic input and output apparatus and reduces the user experience.

The present disclosure provides an acoustic input and output apparatus. Stability and reliability of the overall structure of the acoustic input and output apparatus may be improved, the sound quality of the sound picked up by the sound-pickup assembly may be enhanced, and the comfort of the user experience may be improved.

SUMMARY

The embodiments of the present disclosure provide an acoustic input and output apparatus, including a loudspeaker assembly, a sound-pickup assembly configured to pick up a sound signal, a connection assembly including an elastic member, wherein a first end of the elastic member may connect to the loudspeaker assembly, and a second end of the elastic member may connect to the sound-pickup assembly, wherein the elastic member may be configured to cause an average amplitude attenuation rate of vibrations within a phonic frequency band generated by the loudspeaker assembly to be larger than or equal to 35% in a process that the vibrations transmit from the first end of the elastic member to the second end of the elastic member.

In some embodiments, the elastic member includes an elastic metal filament and plug-in parts connecting to the two ends of the elastic metal filament, respectively. One of the plug-in parts may be configured to match and plug in the sound-pickup assembly, and the other one of the plug-in parts may be configured to match and plug in the loudspeaker assembly. The plug-in parts may be connected to and plugged in the loudspeaker assembly.

In some embodiments, an elastic modulus of the elastic metal filament may be 70 GPa~90 GPa.

In some embodiments, the connection assembly further may include an elastic cover layer covering a periphery of the elastic member.

In some embodiments, an elastic modulus of the elastic cover layer may be 0.8 GPa~2 GPa.

In some embodiments, the loudspeaker assembly may include a first loudspeaker housing, a second loudspeaker housing, and a loudspeaker, wherein the first loudspeaker housing may be matched and connected to the second loudspeaker housing to form a containment space for accommodating the loudspeaker, wherein a first through-hole and a second through-hole may be arranged on the first loudspeaker housing at an interval, and the first through-hole and second through-hole may be in communication with the containment space. A wiring group of the sound-pickup assembly may traverse the first through-hole, the containment space, and the second through-hole.

In some embodiments, the loudspeaker assembly further may include a wire-fixing assembly configured to fix the wiring group of the sound-pickup assembly passing through the first through-hole and reaching the second through-hole.

In some embodiments, the wire-fixing assembly may include press-holding members arranged in the containment space, and the press-holding members may be configured to contact the wiring group of the sound-pickup assembly to reduce a vibration amplitude of the wiring group of the sound-pickup assembly.

In some embodiments, the press-holding members may include a first press-holding member covering the first through-hole.

In some embodiments, the press-holding members further may include a second press-holding member, and the first press-holding member and the second press-holding member may be sheet-shaped members. The first press-holding member and the second press-holding member may be arranged in a stacked manner. The second press-holding member may be spaced away from the first through-hole than the first press-holding member, and the hardness of the second press-holding member may be greater than the hardness of the first press-holding member.

In some embodiments, the loudspeaker assembly further may include a plurality of locating members arranged on the first loudspeaker housing at an interval, and the first press-holding member and the second press-holding member may be fixed to the first loudspeaker housing via the plurality of locating members.

In some embodiments, the plurality of locating members may be convex cylinders arranged on a periphery of the first through-hole and extending into the containment space.

In some embodiments, the second press-holding member may be fixedly connected with the plurality of locating members, and the first press-holding member may be fixed among the plurality of locating members.

In some embodiments, the first loudspeaker housing may include a bottom wall and a side wall connecting with each other, and the side wall may surround and connect with the bottom wall. The second loudspeaker housing may be arranged covering one side of the side wall away from the bottom wall to form the containment space. The first through-hole may be formed on the bottom wall, and the second through-hole may be formed on the sidewall.

In some embodiments, the bottom wall may include a first convex part protruding in a direction deviate from the containment space, and the first through-hole may be formed on the first convex part. The side wall may include a second convex part protruding in a direction deviate from the containment space, and the second through-hole may be formed on the second convex part.

In some embodiments, the sound-pickup assembly may be rotatable relative to the loudspeaker assembly.

In some embodiments, the connection assembly further may include a rotation member matched and connected to the first through-hole rotatably, and the sound-pickup assembly may be connected with the rotation member so as to rotate relative to the first loudspeaker housing.

In some embodiments, the rotation member may include a wire-guiding part and a rotation part connecting with each other. The rotation part may be inserted in the first through-hole. The sound-pickup assembly may be connected with the wire-guiding part to enable the wiring group of the sound-pickup assembly to pass through the wire-guiding part and enter the first through-hole via the rotation part.

In some embodiments, a damping groove may be arranged along a circumferential direction of the rotation part. The connection assembly further may include a damping member arranged in the damping groove. The damping member may contact an inner wall of the first through-hole to provide a rotational damping for the rotation part via contact friction.

In some embodiments, the rotation part may include a rotation main body, and a first stopping part and a second stopping part protruding from two ends of the rotation main body along radial directions of the rotation main body, respectively. The rotation main body may be inserted into the first through-hole. The first stopping part and the second stopping part may abut against two sides of the first loudspeaker housing, respectively, to restrict a movement of the rotation part relative to the first loudspeaker housing along an axial direction. The damping groove may be formed between the first stopping part and the second stopping part.

In some embodiments, the connection member further may include a rotation-limiting structure configured to restrict a rotation range of the rotation part relative to the first loudspeaker housing.

In some embodiments, the rotation-limiting structure may include a limiting groove arranged at an upper portion of the rotation part along a circumferential direction, and a limiting member arranged on the inner wall of the first through-hole and matched to the limiting groove. The limiting member may abut against two ends of the limiting groove, when the rotation part rotates relative to the first loudspeaker housing, to restrict the rotation part from rotating.

In some embodiments, the limiting groove may be arranged as an open-loop.

In some embodiments, the rotation range of the rotation part may be 0~270 degrees.

In some embodiments, the wire-guiding part may be configured with a first hole segment, the rotation part may be arranged with a second hole segment, and the first hole segment communicates with the second hole segment. The sound-pickup assembly may be matched and connected to the first hole segment. The wiring group of the sound-pickup assembly may traverse the first hole segment and reach the first through-hole via the second hole segment.

In some embodiments, the loudspeaker assembly further may include a fixing member configured to restrict a movement of the sound-pickup assembly relative to the rotation member.

In some embodiments, the fixing member may include a fixing main body inserted into the second hole segment, and matched and connected to the first end of the elastic member to restrict the movement of the elastic member relative to the rotation member.

In some embodiments, the fixing member further may include a fixedly connection part arranged on one end of the fixing main body, and the first end of the elastic member may be configured with a fixedly adaptive connection part. The fixedly connection part may be matched and connected with the fixedly adaptive part.

In some embodiments, gaps may be formed at one end of the rotation part away from the wire-guiding part, and the gaps may communicate with the second hole segment. The fixing member further may include convex tables protruding from a periphery of the fixing main body, and the convex tables may be inserted into the gaps to fill the gaps.

In some embodiments, a count of the gaps may be at least two, and the gaps may divide the rotation part into at least two sub-members spaced apart from each other along the circumferential direction of the rotation part.

In some embodiments, the count of the gaps may be two, and the gaps may be arranged opposite to each other. A count of the convex tables may be two, correspondingly, and the convex tables may be arranged deviating from each other. The two convex tables may be inserted into the two gaps, respectively, so that the fixing member may be supported between two sub-members.

In some embodiments, the acoustic input and output apparatus may further include at least one ear hook assembly configured connect to the loudspeaker assembly so that the loudspeaker assembly may be in a stable contact with ears of a user.

In some embodiments, the at least one ear hook assembly may include an ear hook connection assembly and an ear hook housing. The ear hook assembly may be connected with the second through-hole and the ear hook housing, and the ear hook housing may be configured with an accommodating space for accommodating at least one of a battery assembly or a control circuit assembly. The wiring group of the sound-pickup assembly may pass through the second through-hole and enter the accommodating space via the ear hook connection assembly.

In some embodiments, the ear hook housing may include a first ear hook housing and a second ear hook housing matching the first ear hook housing, and the accommodating space may be formed when the first ear hook housing is connected with the second ear hook housing.

In some embodiments, the ear hook assembly may include a splicing assembly configured to restrict a movement of the first ear hook housing and the second ear hook housing in a splicing direction and a thickness direction.

In some embodiments, the splicing assembly may include a first splicing member and a second splicing member matched to the first splicing member, and the first splicing member and the second splicing member may be arranged on the first ear hook housing and the second ear hook housing, respectively. The first ear hook housing and the second ear hook housing may be relatively fixed in the splicing direction and the thickness direction when the first splicing member is matched and connected to the second splicing member.

In some embodiments, the first splicing member may include a first slot and a second slot arranged along a length direction of the first ear hook housing with a same opening direction. The second splicing member may include a first block and a second block protruding along a length direction of the second ear hook housing with a same extending direction so that the first block and the second block may be inset in the first slot and the second slot, respectively, along a same direction.

In some embodiments, the first splicing member further may include a first blocking part arranged at a first splicing edge of the first ear hook housing, and the second splicing member further may include a second blocking part arranged at a second splicing edge of the second ear hook housing. The first blocking part may abut against the second blocking part to restrict a relative movement of the first ear hook housing and the second ear hook housing along the length direction.

In some embodiments, the ear hook housing may be configured with a buttonhole and a power plug-in hole.

In some embodiments, the ear hook housing may include a housing panel contacting a user, a housing back panel deviate from the user, and a plurality of housing side panels connecting the housing panel and the housing back panel. The buttonhole and the power plug-in hole may be arranged on different housing side panels of the plurality of housing side panels.

In some embodiments, the ear hook connection assembly may include an ear hook connection member and a wire stuck part. The ear hook connection member may be arranged with a lead channel configured to lead the wiring group from the loudspeaker assembly, and the wire stuck part may be configured to stuck and stop the wiring group in a radial direction of the wiring group.

In some embodiments, a joint part may be arranged at one end of the ear hook connection member away from the ear hook housing. The wire stuck part may include a first wire stuck part and a second wire stuck part. The first wire stuck part may be arranged at the joint part, and the second wire stuck part may be arranged on the first ear hook housing. The wiring group may enter the accommodating space through the first wire stuck part, the lead channel, and the second wire stuck part in sequence.

In some embodiments, the ear hook assembly further may include an ear hook elastic cover layer covering at least a periphery of the ear hook connection member.

In some embodiments, the acoustic input and output apparatus further may include a rear hook assembly configured to connect the ear hook assembly so that the acoustic input and output apparatus may be in a stable contact with a back side of the head of the user.

In some embodiments, the rear hook assembly may include a rear connection member and inserting parts arranged at two ends of the rear connection member, and the inserting parts may be configured to facilitate a stable connection between the rear connection member and the ear hook assembly.

In some embodiments, a plug-in hole may be arranged on one side of the first ear hook housing away from the ear hook connection assembly. At least one inserting part may be configured with at least two groups of notches arranged at an interval in a length direction of the at least one inserting part. The plug-in hole may be matched and connected to one group of the at least two groups of notches to restrict a relative movement of the ear hook assembly and the rear hook assembly.

BRIEF DESCRIPTION OF THE DRAWINGS

The present disclosure is further illustrated in terms of exemplary embodiments. These exemplary embodiments are described in detail with reference to the drawings. These embodiments are not limited, in these embodiments, and the same number denotes the same structure.

Figure 1:
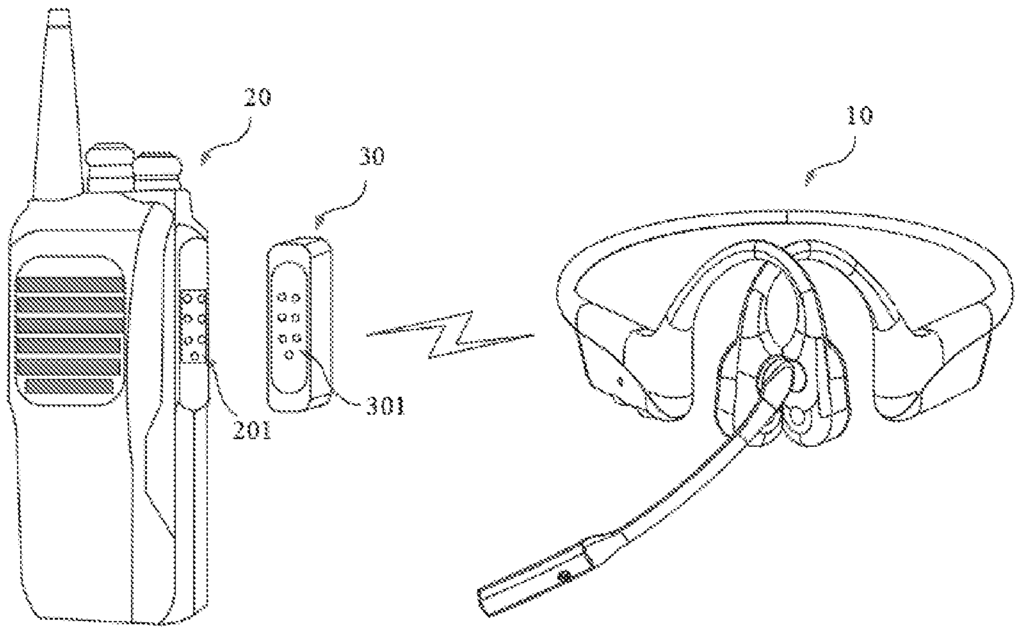
FIG. 1 is a structural diagram illustrating a communication system of an acoustic input and output apparatus according to some embodiments of the present disclosure.

Reference Numbers: 10—acoustic input and output apparatus; 20—intercom device; 30—external communication module; 101—first Bluetooth module; 102—first NFC module; 201—first external interface; 301—second external interface; 302—second Bluetooth module; 303—second NFC module; 11—loudspeaker assembly; 12—ear hook assembly; 13—rear hook assembly; 14—battery assembly; 15—control circuit assembly; 16—sound-pickup assembly; 17—sensor assembly; 18—connection assembly; 110—containment space; 111—first loudspeaker housing; 112—second loudspeaker housing; 113—loudspeaker; 114—fixing member; 115—press-holding member; 116—damping member; 1110—first through-hole; 1111—second through-hole; 1112—bottom wall; 1113—side wall; 1114—first convex part; 1115—second convex part; 1116—limiting member; 11161—convex block; 1117—locating member; 11171—convex cylinders; 1140—wire-guiding hole; 1141—fixing main body; 1142—plug-in pin; 1143—convex table; 1151—first press-holding member; 1152—second press-holding member; 120—accommodating space; 121—first ear hook housing; 122—ear hook connection assembly; 123—second ear hook housing; 1200—window; 1201—first splicing edge; 1202—second splicing edge; 1210—first sub-accommodation space; 1211—first slot; 1212—second slot; 1213—first blocking part; 1215—outer hole segment; 1216—inner hole segment; 1217—filling member; 1218—plug-in hole; 1219—second wire stuck part; 1221—ear hook elastic metal filament; 1222—joint part; 1223—ear hook elastic cover layer; 1224—first wire stuck part; 1225—through-groove; 1230—second sub-accommodating space; 1231—first block; 1232—second block; 1233—power plug-in hole; 1234—second blocking part; 1235—button hole; 12181—stuck connection parts; 12191—second sub-wire stuck part; 12221—end part; 12241—first sub-wire stuck part; 131—rear hook elastic metal filament; 132—rear hook elastic cover layer; 133—inserting parts; 1331—notches; 151—circuit board; 152—power supply interface; 153—button; 154—antenna; 180—fixing hole; 181—connection member; 1811—elastic member; 18111—elastic connecting rod; 18113—elastic metal filament; 182—plug-in parts; 183—elastic cover layer; 184—rotation member; 1841—wire-guiding part; 1842—rotation part; 1843—damping groove; 18441—limiting groove; 18410—first hole segment; 18420—second hole segment; 18421—rotation main body; 18422—first stopping part; 18423—second stopping part; 18424—gaps; 18425—sub-member.

DETAILED DESCRIPTION

In order to illustrate technical solutions of the embodiments of the present disclosure more clearly, the following briefly illustrates drawings in the illustration of the embodiments. Drawings in the following illustration are merely some examples or embodiments of the present disclosure. For those skilled in the art, the present disclosure may be applied to other similar scenarios in accordance with the drawings without creative works. Unless obviously obtained from the context or the context illustrates otherwise, the same number in the drawings refers to the same structure or operation.

It should be understood that “system”, “apparatus”, “unit”, and/or “module” used herein are a method for distinguishing different components, elements, members, parts, or assemblies of different levels. However, if other words may achieve the same purpose, the words may be replaced by other expressions.

As used in the disclosure and the appended claims, the singular forms “a,” “an,” and “the” include plural referents unless the content clearly dictates otherwise. In general, the terms “comprising” and “including” only prompt steps and elements that are explicitly identified, and these steps and elements do not constitute an exclusive list. Methods or apparatus may also include other steps or elements.

Flowcharts are used in the present disclosure to illustrate the operations performed by the system according to some embodiments of the present disclosure. It should be understood that the front or rear operations may not be necessarily performed exactly in order. On the contrary, each step may be performed in reverse or simultaneously. At the same time, other operations may also be added to the procedures, or a certain step or several steps may be removed from the procedures.

Figure 2:
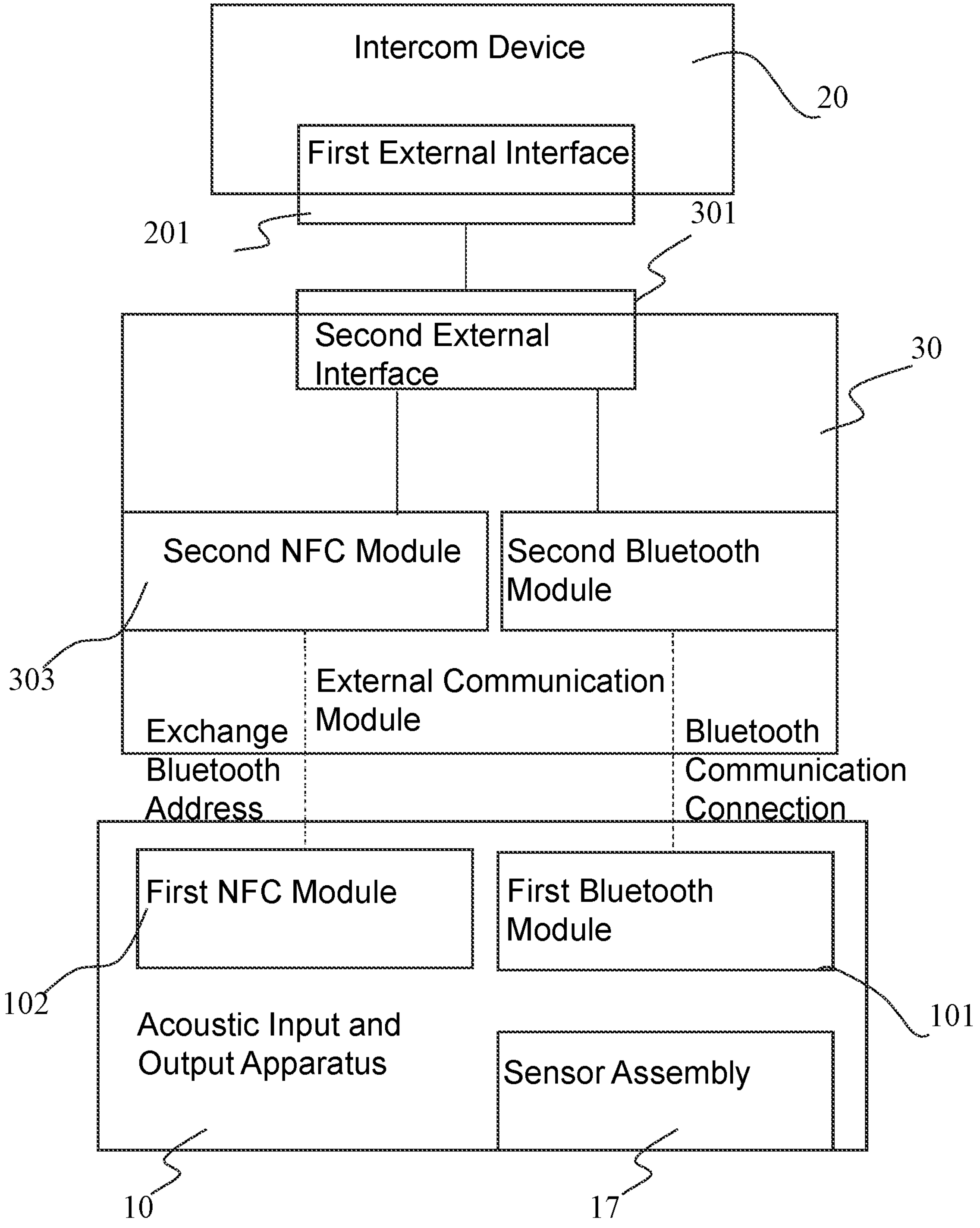
FIG. 2 is a block diagram illustrating a circuit of a communication system of an acoustic input and output apparatus according to some embodiments of the present disclosure.

The present disclosure provides a communication system of an acoustic input and output apparatus. As shown in FIG. 1 and FIG. 2, in some embodiments, the communication system may include an acoustic input and output apparatus 10, an intercom device 20, and an external communication module 30.

The acoustic input and output apparatus 10 may refer to an apparatus having both a sound input function and an output function. In some embodiments, the acoustic input and output apparatus 10 may be divided into bone conduction and air conduction according to the way in which the sound is input and output. Taking a loudspeaker assembly as an example, a bone conduction loudspeaker may convert audio signals into mechanical vibrations with different frequencies. A human bone may be configured as a medium for transmitting the mechanical vibrations, and further transmitting sound waves to an auditory nerve, so that a user may receive sound without passing through an external auditory canal and a tympanic membrane of an ear of the user. The air conduction loudspeaker may change the air density by pushing the air to vibrate so that the user may hear the sound. In the embodiment, the acoustic input and output apparatus 10 may have a function as a Bluetooth. As shown in FIG. 2, the acoustic input and output apparatus 10 may include a first Bluetooth module 101. The first Bluetooth module 101 may be configured to implement a Bluetooth communication function.

The intercom device 20, i.e., a walkie-talkie, may be a terminal device of cluster communication or a wireless communication device of mobile communication. In general, the walkie-talkie may convert an electrical signal of the audio signals into a radio-frequency carrier signal through a transmitting assembly. The radio-frequency carrier signal may be further transmitted through an antenna via amplification, filtering, or the like, so as to transmit the user’s voice. The antenna may receive an input signal processed through corresponding conversion, filtering, amplification, mixing, or the like, to form an audio signal, and the audio signal may be played by the loudspeaker assembly, so that the user can hear the audio signals sent by other intercom devices. The intercom device 20 in the embodiment may be an existing intercom device, and components and structures of the intercom device 20 are not described in detail herein.

In some embodiments, the intercom device 20 may not support the Bluetooth function. In order to enable the acoustic input and output apparatus 10 to have an effective Bluetooth connection with the intercom device 20, an external communication module 30 may be used as a Bluetooth communication medium between the acoustic input and output apparatus 10 and the intercom device 20.

In some embodiments, the intercom device 20 may include a first external interface 201. The intercom device 20 may provide the first external interface 201 for extending the function of the intercom device 20, and different functions may be achieved by connecting different external modules. External terminals may provide programs for the intercom device 20 via the first external interface 201. The first external interface 201 may include a plurality of contact points spaced at an interval, such as 7 contact points.

In some embodiments, the external communication module 30 may include a second external interface 301 and a second Bluetooth module 302. The external communication module 30 may be detachably arranged on the intercom device 20, for example, the external communication module 30 may be fixed to the intercom device 20 by snapping. The second external interface 301 may also have contact points the same as the first external interface 201. When the external communication module 30 is installed on the intercom device 20, the first external interface 201 may be connected to the second external interface 301. The external communication module 30 may be coupled to the intercom device 20 through the first external interface 201 and the second external interface 301. The intercom device 20 may be configured with a Bluetooth function through the external communication module 30.

As shown in FIG. 2, in some embodiments, the intercom device 20 may establish a Bluetooth connection with the acoustic input and output apparatus 10 through the external communication module 30. After the Bluetooth connection between the intercom device 20 and the acoustic input and output apparatus 10 is established through the external communication module 30, the acoustic input and output apparatus 10 may be used to control the intercom device 20. For example, the acoustic input and output apparatus 10 may be used to answer audio signals received by the intercom device 20. The acoustic input and output apparatus 10 may also be used to transmit corresponding voice. The acoustic input and output apparatus 10 may also control other functions of the intercom device 20. The intercom device 20 may also control the acoustic input and output apparatus 10.

In some embodiments, in order to facilitate a rapid Bluetooth connection between the acoustic input and output apparatus 10 and the intercom device 20, a Bluetooth address may be exchanged between the acoustic input and output apparatus 10 and the intercom device 20 quickly to facilitate a fast pairing. As shown in FIG. 2, the acoustic input and output apparatus 10 may also have a near-field communication (NFC) function and may include a first NFC module 102, which may be configured to implement the near-field communication function. The external communication module 30 may also include a second NFC module 303, which may enable the intercom device 20 without the NFC near-field communication function to realize near-field communication.

Specifically, the acoustic input and output apparatus 10 and the intercom device 20 may exchange the Bluetooth address by the near-field communication of the first NFC module 102 and the second NFC module 303, so that a Bluetooth connection may be established between the first Bluetooth module 101 and the second Bluetooth module 302 by a Bluetooth pairing. To exchange the Bluetooth address, the following ways may be used.

The first way: the acoustic input and output apparatus 10 may transmit the Bluetooth address to the intercom device 20, which may save the time that the intercom device 20 searches and selects the acoustic input and output apparatus 10. That is, the first NFC module 102 may store or acquire the Bluetooth address of the first Bluetooth module 101. When the first NFC module 102 and the second NFC module 303 perform a near-field communication, the first NFC module 102 may transmit the Bluetooth address to the second NFC module 303, thereby enabling the external communication module 30 to acquire the Bluetooth address of the first Bluetooth module 101. Accordingly, the exchange of the Bluetooth address may be implemented, and the fast pairing and connection may also be implemented.

The second way: the intercom device 20 may send the Bluetooth address to the acoustic input and output apparatus 10, which may save the time that the acoustic input and output apparatus 10 searches and selects the intercom device 20. That is, the second NFC module 303 may store or acquire the Bluetooth address of the second Bluetooth module 302. When the first NFC module 102 and the second NFC module 303 perform a near-field communication, the second NFC module 303 may transmit the Bluetooth address of the second Bluetooth module 302 to the first NFC module 102, thereby enabling the acoustic input and output apparatus 10 to acquire the Bluetooth address of the second Bluetooth module 302. Accordingly, the exchange of the Bluetooth address may be implemented, and the fast pairing and connection may also be further implemented.

The third way: the intercom device 20 and the acoustic input and output apparatus 10 may send the Bluetooth address to each other actively, thereby saving the time to search and select each other, and achieving the fast pairing and connection. That is, the first NFC module 102 may store or acquire the Bluetooth address of the first Bluetooth module 101, and the second NFC module 303 may store or acquire the Bluetooth address of the second Bluetooth module 302. When the first NFC module 102 and the second NFC module 303 perform a near-field communication, the first NFC module 102 and the second NFC module 303 may exchange the Bluetooth address of each other to implement the exchange of the Bluetooth address.

A rapid Bluetooth connection may be established between the intercom device 20 and the first NFC module 102 of the acoustic input and output apparatus 10 through the second NFC module 303 of the external communication module 30, so that the intercom device 20 may match different acoustic input and output apparatuses 10 quickly. Taking industrial field operations as an example, different staff members may be configured with different acoustic input and output apparatuses 10. For example, two staff members may share an intercom device 20, the two staff members may use the shared intercom device 20 alternately when they worked in relays, and the intercom device 20 may be connected through the acoustic input and output apparatus 10 quickly. When a staff member is on duty, "one-touch to connect" may be implemented through the acoustic input and output apparatus 10 and the intercom device 20, and the communication system composed of the intercom device 20 and the acoustic input and output apparatus 10 may be used. When the staff member is off duty and the other staff member is on duty, the other staff member may also implement "one-touch to connect" through the acoustic input and output apparatus 10 and the intercom device 20. A logic including "independent" and "shared" may be formed by the communication system composed of the intercom device 20 and the acoustic input and output apparatus 10. The "independent" may indicate that everyone may use the acoustic input and output apparatus 10 independently, and the "shared" may indicate that the intercom device 20 may be shared. The communication system of the present embodiment may also identify the acoustic input and output apparatus 10 individually, and multiple individuals may use a same intercom device 20. Fast switching and other functions such as checking attendance and identifying personal identities may be realized.

The intercom device 20 and the acoustic input and output apparatus 10 may perform a Bluetooth matching to establish the Bluetooth connection quickly through the NFC near-field communication, and the user's ears may be released when the user wears the acoustic input and output apparatus 10. By transmitting sound through bone conduction, the effect of noise on the sound transmission may be reduced and the quality of voice communication may be improved. In this way, playing the audio signal received by the intercom device 20 through the acoustic input and output apparatus 10, or picking up sound transmitted to other intercom devices via the intercom device 20 through the acoustic input and output apparatus 10 may avoid broadcasting of sound and protect the privacy of the user. For application scenarios such as factory workshops, when using the acoustic input and output apparatus 10 for intercom communication, the user may also notice changes in the surrounding environment, which may ensure the security of the user.

For the acoustic input and output apparatus 10, the first NFC module 102 may be a passive NFC module. The first NFC module 102 may store the Bluetooth address of the first Bluetooth module 101, and the Bluetooth address of the first Bluetooth module 101 may be transmitted to the second NFC module 303. The first NFC module 102 may also be an active NFC module, which may transmit the Bluetooth address of the first Bluetooth module 101 and receive the Bluetooth address of the second Bluetooth module 302 transmitted by the second NFC module 303. Similarly, the second NFC module 303 may also be a passive NFC module or an active NFC module.

The first NFC module 102 may be attached on a battery assembly 14 of the acoustic input and output apparatus 10 for the convenience of installation. The structure may be simple so as to save the space. When the Bluetooth connection to the intercom device 20 is required, a fast Bluetooth pairing may be performed by placing the battery assembly 14 of the acoustic input and output apparatus 10 close to the external communication module 30 of the intercom device 20.

In some embodiments, in order to facilitate a control between the intercom device 20 and the acoustic input and output apparatus 10 and realize the switching of related functions between the intercom device 20 and the acoustic input and output apparatus 10 automatically, sensing and controlling may be carried out by a corresponding sensor. An example is provided in the following descriptions. As shown in FIG. 2, the acoustic input and output apparatus 10 may include a sensor assembly 17 for detecting whether the acoustic input and output apparatus 10 is worn by a user. Specifically, the sensor assembly 17 may include, for example, an optical sensor, which may detect whether the acoustic input and output apparatus 10 is worn by transmitting and/or receiving a corresponding optical signal. The optical sensor, for example, a low beam sensor emitting a respective optical signal, may emit light by reflecting the optical signal when the acoustic input and output apparatus 10 is worn, and may not reflect light when the acoustic input and output apparatus 10 is not worn. The low beam sensor may detect whether the acoustic input and output apparatus 10 is worn or perform a distance measurement according to whether reflected light is received. The low beam sensor may be, for example, an infrared low beam sensor. The sensor assembly 17 may also include an acceleration sensor, a gravity sensor, a touch sensor, or the like.

When the acoustic input and output apparatus 10 and the intercom device 20 are in the Bluetooth connection state and the sensor assembly 17 detects that the acoustic input and output apparatus 10 is worn by a user, the acoustic input and output apparatus 10 may be controlled to pick up sound and/or play voice, and the intercom device 20 may not be used to pick up sound and/or play voice. That is, when the acoustic input and output apparatus 10 is worn by a user, the communication system may pick up sound through a microphone of the acoustic input and output apparatus 10 and/or play voice through a loudspeaker 113. When the sensor assembly 17 detects that the acoustic input and output apparatus 10 is not worn by a user, the intercom device 20 may be controlled to pick up sound and/or play voice, and the acoustic input and output apparatus 10 may not be used to pick up sound and/or play voice. That is, when the acoustic input and output apparatus 10 is not worn, the communication system may pick up sound through a microphone of the intercom device 20 and/or play voice through the loudspeaker 113.

Based on the descriptions above, when the acoustic input and output apparatus 10 is not worn, the acoustic input and output apparatus 10 may not able to pick up sound or play voice effectively, or the user may not hear the voice transmitted by the acoustic input and output apparatus 10. At this time, the intercom device 20 may be used to pick up sound and/or play voice, thus the played voice may be heard clearly and the sound may be picked up effectively. When the acoustic input and output apparatus 10 is worn, the acoustic input and output apparatus 10 may be used to pick up sound and/or play voice, so that the user may send or hear the voice. Detecting whether the acoustic input and output apparatus 10 is worn through the sensor assembly 17 may be convenient for the communication system to realize the automatic switching as mentioned above, and avoid omission of voice information, which may adapt to different application scenarios and improve working efficiency.

Figure 3:
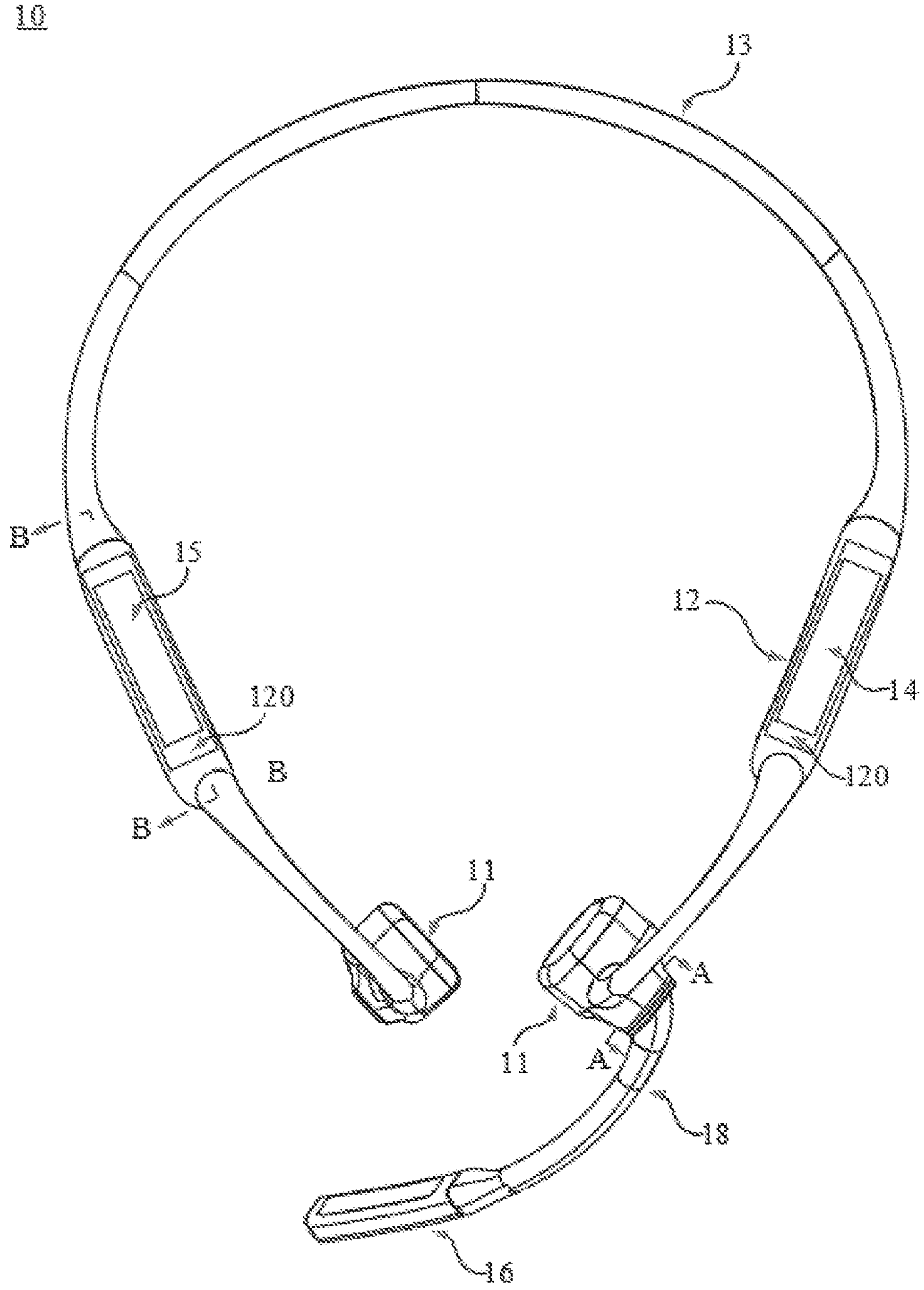
FIG. 3 is a top plan view illustrating an overall structure of an acoustic input and output apparatus according to some embodiments of the present disclosure.

FIG. 3 is a top view illustrating an overall structure of an acoustic input and output apparatus according to some embodiments of the present disclosure. As shown in FIG. 3, in some embodiments, the acoustic input and output apparatus 10 may include loudspeaker assemblies 11, a sound-pickup assembly 16, and a connection assembly 18. The loudspeaker assemblies 11 may be configured to produce a sound signal, the sound-pickup assembly 16 may be configured to pick up a sound signal, and the connection assembly 18 may be configured to connect the loudspeaker assemblies 11 and the sound-pickup assembly 16 to transmit the sound signal.

The loudspeaker assemblies 11 may be configured to convert a signal including sound information into an acoustic signal (or a voice signal). For example, the loudspeaker assemblies 11 may generate mechanical vibrations to transmit sound waves (e.g., sound signals) in response to receiving a signal including sound information. In some embodiments, the loudspeaker assemblies may include vibration elements and/or vibration transmission elements connected to the vibration elements (e.g., at least a part of a housing vibration transmission piece of the acoustic input and output apparatus 10). The loudspeaker assemblies 11 may generate the mechanical vibrations with energy conversion, and the loudspeaker assemblies 11 may convert the signal including sound information to the mechanical vibrations. The conversion may include a variety of different types of energy coexistence and conversion. For example, an electrical signal (i.e., the signal including sound information) may be directly converted into the mechanical vibrations through transducers (not shown in the figure) in the vibration elements (not shown in the figure) of the loudspeaker assemblies 11. The sound waves may be transmitted by the vibration transmission elements of the loudspeaker assemblies 11 conducting the mechanical vibrations. As another example, the sound information may be included in an optical signal, and a particular transducer may implement a process of converting the optical signal into a vibration signal. Other energy types that may be coexisting and converted during the operation of the transducers may include thermal energy, magnetic field energy, or the like. The energy conversion method of the transducers may include dynamic, electrostatic, piezoelectric, dynamic iron type, pneumatic, electromagnetic, or the like.

In some embodiments, the loudspeaker assemblies 11 may be divided into bone conduction loudspeaker assemblies and air conduction loudspeaker assemblies according to the sound producing principle of the loudspeaker assemblies. In some embodiments, a loudspeaker assembly 11 may include one or more bone conduction loudspeakers. In some embodiments, a loudspeaker assembly 11 may include one or more air conduction loudspeakers 113. In some embodiments, a loudspeaker assembly 11 may include a combination of one or more bone conduction loudspeakers and one or more air conduction loudspeakers 113 at the same time.

In some embodiments, the sound-pickup assembly 16 may include one or more microphones. In some embodiments, one or more microphones may be air conduction microphones. In some embodiments, one or more microphones may be bone conduction microphones. In some embodiments, one or more microphones may be a combination of bone conduction microphones and air conduction microphones.

The microphones may be configured to pick up the acoustic signal (also referred to as a voice signal) and convert the acoustic signal to the signal including sound information (e.g., an electrical signal). For example, the microphones may pick up the mechanical vibrations generated when the voice signal provides a voice signal and convert the mechanical vibrations into an electrical signal. For the convenience of description, the mechanical vibrations generated when the user provides a voice signal may be referred to as the mechanical vibrations. In one or more embodiments of the present disclosure, the bone conduction microphone may be described as an example.

The bone conduction microphone may be a pickup device (e.g., a voice acquisition device) capable of converting the vibration signal into an electrical signal. The vibration signal may refer to the signal generated by the vibrations of the user's body part when the user speaks. For the convenience of understanding, the bone conduction microphone may be understood as a microphone device that is sensitive to a bone conduction sound transmitted by vibrations, while a microphone that is not sensitive to an air conduction sound transmitted by air.

In some embodiments, when the user wears the acoustic input and output apparatus 10, the bone conduction microphone may not be in contact with the human body directly. The vibration signal (e.g., facial vibrations) generated when the user speaks may be transmitted to the loudspeaker assemblies 11, and transmitted to the bone conduction microphone through the loudspeaker assemblies 11. The bone conduction microphone further may convert the body vibration signal to an electrical signal including voice information. In some embodiments, when the user wears the acoustic input and output apparatus 10, the bone conduction microphone may be in contact with the human body directly, and the vibration signal generated when the user speaks may be transmitted to the bone conduction microphone directly.

In some embodiments, the acoustic input and output apparatus 10 may be a headset. For the convenience of description, the present disclosure describes the acoustic input and output apparatus 10 as an example of a headset. In some embodiments, the acoustic input and output apparatus 10 may be a bone conduction headset, and the sound may be input and output through the bone conduction.

In some embodiments, the sound-pickup assembly may be connected to a loudspeaker assembly, and a wiring group of the sound-pickup assembly may be electrically connected to the remaining elements (e.g., the battery assembly) of the bone conduction headset via the loudspeaker assembly. In some embodiments, the sound-pickup assembly 16 may be physically connected with the loudspeaker assembly 11 through, for example, a hinged connection, a clip connection, a welding connection, an integral molding, or the like.

In some embodiments, the sound-pickup assembly 16 may be connected to the loudspeaker assembly 11 through a connection assembly 18. The connection assembly 18 may refer to a connection structure for physically connecting the components of the acoustic input and output apparatus 10. In some embodiments, the connection assembly 18 may include a connection member configured to connect the sound-pickup assembly 16 and the loudspeaker assembly 11.

In some embodiments, when the sound-pickup assembly is connected to the loudspeaker assembly through the connection member. For the convenience of description, the sound-pickup assembly and the connection member may be regarded as an entirety. Further, the sound-pickup assembly and the connection member as an entirety may be regarded as a stick assembly. In some embodiments, the bone conduction headset may also include the stick assembly, and the stick assembly may be configured to pick up the sound. The stick assembly may be configured to connect the loudspeaker assembly 11 and the sound-pickup assembly and have a structure receiving the sound signal generated by the user. In some embodiments, the number or count of the stick assembly may be one, which is connected to one of the two loudspeaker assemblies 11. For example, the stick assembly may be connected to the loudspeaker assembly 11 corresponding to the battery assembly 14. Certainly, in other embodiments, each loudspeaker assembly 11 may be connected to a stick assembly.

Figure 4:
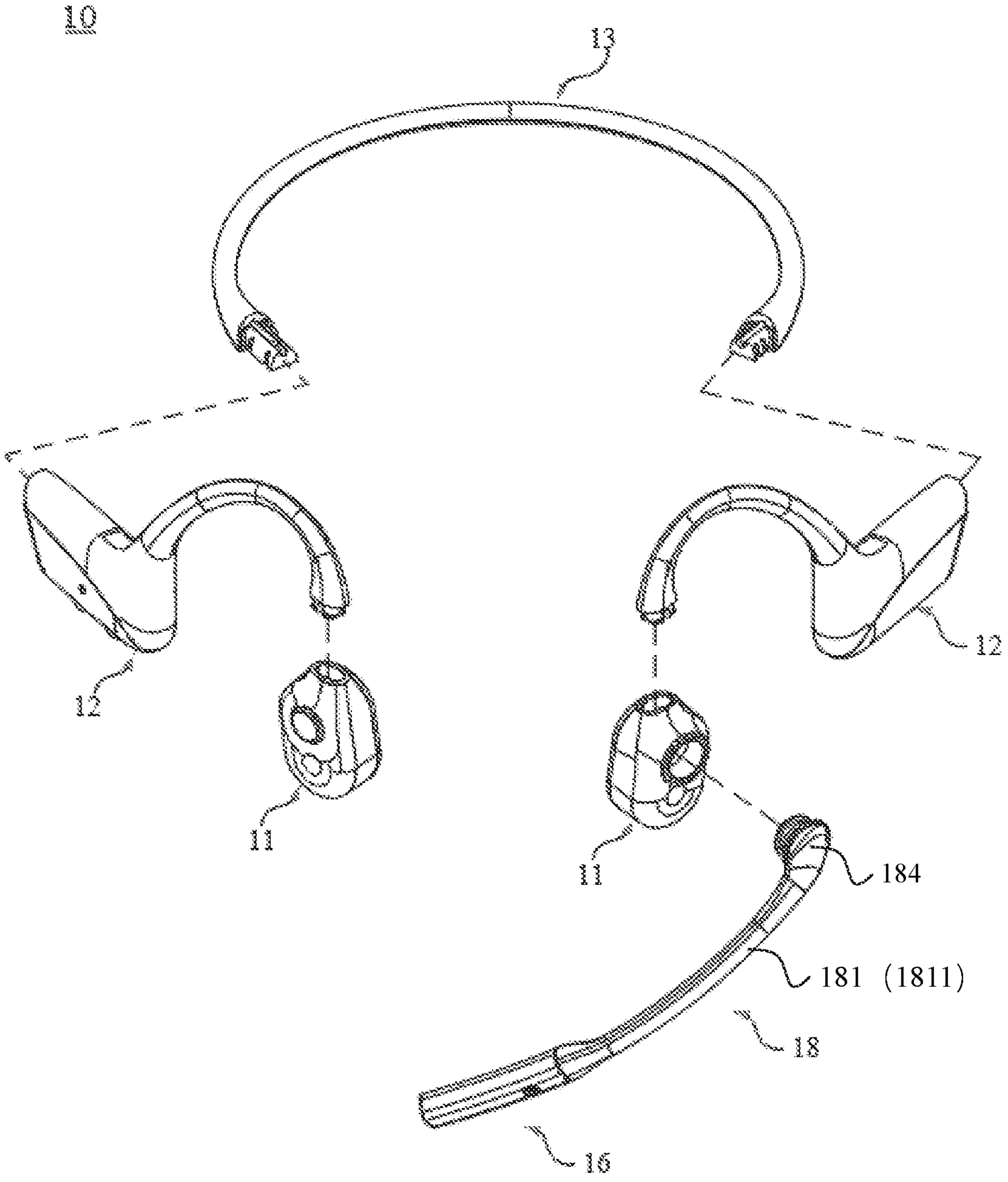
FIG. 4 is an exploded diagram illustrating an overall structure of an acoustic input and output apparatus according to some embodiments of the present disclosure.

In some embodiments, the connection member 181 may be a rigid member. The rigid member may be a member that does not have elasticity or whose elasticity is negligible. In some embodiments, the connection member 181 may be made of stainless steel, carbon fiber, aluminum alloy, or the like. In some embodiments, the connection member 181 may have a certain shape. For example, the connection member 181 may be a slender strip (e.g., a stick shape). In some embodiments, the connection member 181 may have a certain radian. As shown in FIG. 4, the connection member 181 may be a stick member having a certain radian.

In some embodiments, the loudspeaker assemblies 11 may cause the user to hear the sound by generating the mechanical vibrations to transmit the sound waves. The way that the loudspeaker assemblies 11 transmit the sound waves may include air conduction and bone conduction. Regardless of whether the sound waves are transmitted through bone conduction or air conduction, the sound-pickup assembly may be directly or indirectly connected to the loudspeaker assembly 11, and the vibrations generated by the loudspeaker assembly 11 may have an impact on the sound-pickup assembly to reduce the sound quality of the sound picked up by the sound-pickup assembly.

Specifically, taking the bone conduction loudspeaker as an example, the mechanical vibrations of the connection assembly 18 and the loudspeaker housing may be generated when the bone conduction loudspeaker generates sound. The connection assembly 18 and the loudspeaker housing may transmit the mechanical vibrations to the sound-pickup assembly. The microphones of the sound-pickup assembly may generate corresponding mechanical vibrations after receiving the mechanical vibrations and generate the signal including sound information (e.g., an electrical signal) based on the mechanical vibrations. As stated above, since the sound-pickup assembly is directly or indirectly connected to the connection assembly 18 and the loudspeaker housing, the mechanical vibrations of the connection assembly 18 and the loudspeaker housing may be generated when the loudspeaker 113 transmits sound waves. The connection assembly 18 and the loudspeaker housing may transmit the mechanical vibrations to the sound-pickup assembly, and the microphones of the sound-pickup assembly may generate corresponding mechanical vibrations after receiving the mechanical vibrations and generate the signal including sound information (e.g., an electrical signal) based on the mechanical vibrations.

Therefore, at least part of the mechanical vibrations generated by the loudspeaker assemblies 11 may be transmitted to the microphones of the sound-pickup assembly to cause the mechanical vibrations of the microphones of the sound-pickup assembly. When the microphones of the sound-pickup assembly and the loudspeaker assemblies 11 operate at the same time, the loudspeaker assemblies 11 may vibrate to transmit a voice signal (e.g., music), while the microphones of the sound-pickup assembly are receiving the voice signal (i.e., receiving a voice signal when the user speaks through picking up the vibrations of the skin, or the like, when the user speaks). The microphones of the sound-pickup assembly may receive a variety of mechanical vibrations at the same time. The microphones of the sound-pickup assembly may receive the voice signals transmitted by the loudspeaker assemblies 11 other than the voice signal transmitted by the user, thereby affecting the quality of the voice signal picked up by the microphones. In some embodiments, in order to reduce the impact of the mechanical vibrations generated by the loudspeaker assemblies 11 on the sound-pickup assembly, the connection member 181 may be configured to have a certain elasticity to reduce the magnitude of the vibrations.

Figure 5:
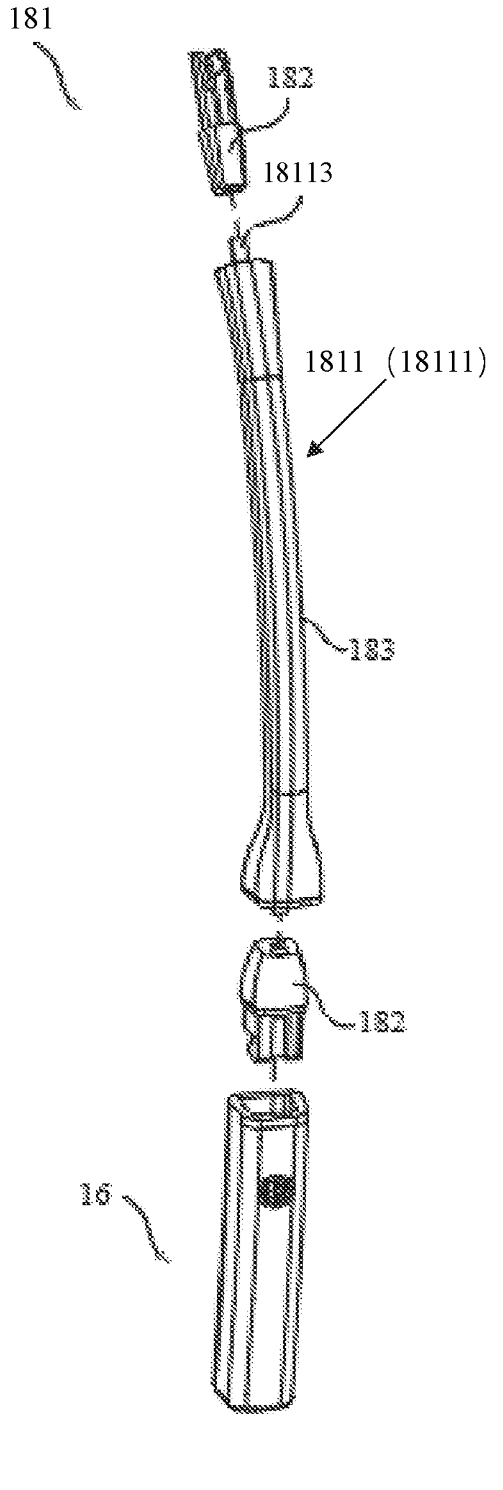
FIG. 5 is a disassembly diagram illustrating a connection member of an acoustic input and output apparatus according to some embodiments of the present disclosure.

In some embodiments, the connection member 181 may be an elastic member 1811. The strength of the mechanical vibrations transmitted from the loudspeaker assemblies 11 may be reduced through the elasticity of the elastic member 1811, thereby increasing the quality of the voice signal picked up by the microphones. As shown in FIG. 5, in some embodiments, the elastic member 1811 may be an elastic connecting rod 18111, and the stick assembly may include the elastic connecting rod 18111 and the sound-pickup assembly 16. One end of the elastic connecting rod 18111 may be connected to the loudspeaker assembly 11. The other end of the elastic connecting rod 18111 may be connected to the sound-pickup assembly 16.

In some embodiments, the sound-pickup assembly 16 may have one or more microphones. For example, the number of microphones of the sound-pickup assembly 16 may be greater than or equal to 2, and the microphones may be spaced apart. For example, a microphone may be arranged at an end of the sound-pickup assembly 16 away from the loudspeaker assembly 11, and other microphones may be arranged on one side that the sound-pickup assembly 16 is connected to the end, which may facilitate a cooperation among multiple microphones, thus reducing the noise and improving the quality of the picked-up sound. The loudspeaker assemblies 11 may convert the audio into the mechanical vibrations, that is, when the loudspeaker assemblies 11 are playing corresponding audio, a phonic band corresponding to the audio may cause a loudspeaker 113 to generate the corresponding vibrations.

In some embodiments, the elastic member 1811 may be configured to cause the vibrations of the phonic band generated by the loudspeaker assemblies 11 to attenuate when the vibrations are transmitted from a first end of the elastic member 1811 (e.g., the elastic connecting rod 18111 of the elastic member 1811) to a second end of the elastic member 1811. Specifically, the vibrations of a phonic band generated by the elastic connecting rod 18111 and the vibrations of the phonic band generated by the loudspeaker assembly 11 may be passed from the first end of the elastic connecting rod 18111 (i.e., one end connected to the loudspeaker assembly 11) to the elastic connecting rod 18111. The average amplitude attenuation rate at the end (i.e., one end connected to the sound-pickup assembly 16) may be larger than or equal to 35%. In some embodiments, the average amplitude attenuation rate may be larger than or equal to 45%. In some embodiments, the average amplitude attenuation rate may be larger than or equal to 50%. In some embodiments, the average amplitude attenuation rate may be larger than or equal to 55%. In some embodiments, the amplitude attenuation rate may be larger than or equal to 60%. In some embodiments, the amplitude attenuation rate may be larger than or equal to 70%.

In actual use, the mechanical vibrations generated by the loudspeaker assemblies 11 of the acoustic input and output device 10 may cause a negative effect on the pickup effect of the stick assembly, such as an echo. More details regarding the effects of loudspeaker assemblies 11 for the stick assembly may be found in other embodiments of the present disclosure, which is described here. Based on the reasons mentioned above, the elastic connecting rod 18111 may be configured to cause the average amplitude attenuation rate of the vibrations within the phonic band generated by the loudspeaker assemblies 11 to be larger than or equal to 35% in a process that the vibrations transmits from one end of the elastic connection rod 18111 to the other end of the elastic connection rod 18111, so that the elastic connection rod 18111 may effectively absorb the vibrations during vibration transmission and reduce the vibration amplitude of the elastic connecting rod 18111 transmitted from one end to the other end, thereby reducing the vibrations generated by the loudspeaker assemblies 11, which causes the vibrations of the sound-pickup assembly 16, effectively reducing the influence of the vibrations of the loudspeaker assemblies 11 on the pickup effect of the sound-pickup assembly 16, and improving the sound quality of the sound-pickup assembly.

In some embodiments, the attenuation of the vibration amplitude may be achieved by the structure of the elastic member 1811 and/or the material of the elastic member 1811. In some embodiments, the elasticity of the elastic member 1811 may be provided by the structural design. The elastic member 1811 may be an elastic structure, even if the material of the elastic member 1811 may have high rigidity, the elasticity may also be provided by the structure of the elastic member 1811. In some embodiments, the shape of the elastic member 1811 may include, but may not be limited to, a sheet shape, a strip shape, a column shape, a spring-like structure, a ring, a ring-like cross-sectional structure, or the like. In some embodiments, the elasticity of the elastic member 1811 may be determined by the material of which the elastic member 1811 is made. For example, the elastic member 1811 may be made of nickel-titanium alloy, and the nickel-titanium alloy has a strong elasticity and a shape memory ability. The nickel-titanium alloy may automatically return to a state that is close to the original shape when the nickel-titanium alloy is deformed.

As shown in FIG. 5, for example, regarding the elastic member 1811 as the elastic connecting rod 18111, in some embodiments, the elastic connecting rod 18111 may include an elastic metal filament 18113 configured to provide elasticity, and the elastic metal filament 18113 may be configured as a skeleton of the elastic connecting rod 18111 to support the elastic connecting rod 18111 to form a fixed shape. The elastic connecting rod 18111 may also include plug-in parts 182 connecting to two ends of the elastic metal filament 18113, respectively. That is, two ends of the elastic metal filament 18113 may be connected with a plug-in part 182, respectively. One of the plug-in parts 182 may be configured to match and plug in the sound-pickup assembly 16. The other plug-in parts 182 may be configured to match and plug in the loudspeaker assembly 11. In some embodiments, the plug-in parts 182 may be plug-in buckles, and plug-in slots corresponding to the buckles may be arranged on the loudspeaker assemblies 11 and the sound-pickup assembly 16. In some embodiments, the plug-in parts 182 may be magnets. Magnetic conductors may be arranged on the loudspeaker assemblies 11 and the sound-pickup assembly 16, and the loudspeaker assemblies 11 and the sound-pickup assembly 16 may be connected to the plug-in parts 182 through a magnetic force. In some embodiments, the plug-in structures of the two plug-in parts 182 may be the same or different. For example, the plug-in parts 182 connected to the loudspeaker assemblies 11 may be the plug-in buckles, and the plug-in parts 182 connected to the sound-pickup assembly 16 may be magnets. The interfaces may be matched to the plug-in structures corresponding to the sound-pickup assembly 16 and the loudspeaker assemblies 11. In some embodiments, the plug-in parts 182 may be directly connected to the sound-pickup assembly 16 and the loudspeaker assemblies 11 through, for example, a hinged connection, a snap-joint connection, a welding connection, an integrally formed connection, or the like. In some embodiments, the elastic metal filament 18113 may be any suitable shape, which includes, but is not limited to, a strip shape, a columnar shape, a sheet shape. The present disclosure may not be limited herein, and the shape of the elastic metal filament 18113 may be determined according to the actual situation.

In some embodiments, the elastic metal filament 18113 may have a strong ability to recover from deformation, that is, after deformation, the elastic metal filament 18113 may return to the original shape. In some embodiments, the elastic modulus of the elastic metal filament 18113 may be 70 Gpa to 90 Gpa. In some embodiments, the elastic modulus of the elastic metal filament 18113 may be 75 Gpa to 85 Gpa. In some embodiments, the elastic modulus of the elastic metal filament 18113 may be 80 Gpa to 84 Gpa. In some embodiments, the elastic modulus of the elastic metal filament 18113 may be 81 Gpa to 83 Gpa.

In some embodiments, the material of the elastic metal filament 18113 may be spring steel, titanium, or the like. In some embodiments, the material of the elastic metal filament 18113 may be nickel-titanium alloy. Nickel-titanium alloy may have a strong capability to recover from deformation and improve a service life effectively. In the embodiment, by setting the elastic modulus of the elastic metal filament 18113 to be 70 Gpa to 90 Gpa, the elastic metal filament 18113 may have a good capability to absorb the vibrations, which may meet the requirements of the vibration absorbing capability for the connection member 181, thereby improving the pickup quality of the sound-pickup assembly 162.

It should be noted that, in addition to the metal material, a non-metallic material may be used as the material making the skeleton of the connection member 181, for example, an elastic filament made of plastic, rubber, or other materials, may be used as a skeleton connected to the connection member 181.

In some embodiments, if an elastic member 1811 is exposed to the outside, long-term usage may cause a loss of the elastic member 1811. For example, the elasticity of the elastic member 1811 may be reduced, and the ability to restore from the deformation may also decline when the elastic member 1811 contacts with rainwater and rubs against the user's skin, which may also reduce the service life of the elastic member 1811. Therefore, in some embodiments, a structure may be arranged outside of the elastic member 1811 to protect the elastic member 1811.

As shown in FIG. 5, in some embodiments, the connection assembly 18 may also include an elastic cover layer 183 covering the periphery of the elastic member 1811. The elastic cover layer 183 may have a certain elasticity so that the average amplitude attenuation rate of the vibrations of the phonic frequency band generated by the loudspeaker assemblies 11 may be further reduced when the vibrations of the phonic frequency band is transmitted from the connection assembly to the sound-pickup assembly. In some embodiments, the elastic cover layer 183 may be a part of the elastic member 1811, for example, the elastic cover layer 183 may be integrally formed with the elastic member 1811. In some embodiments, the elastic cover layer 183 may be formed separately from the elastic member 1811 and then assembled.

For the convenience of description, for example, still taking the elastic member 1811 as the elastic connecting rod, specifically, the elastic connecting rod 18111 may include the elastic cover layer 183 covering the periphery of the elastic metal filament 18113. In some embodiments, the elastic cover layer 183 may only cover part of the periphery of the elastic metal filament 18113. In some embodiments, the elastic cover layer 183 may cover the periphery of the elastic metal filament 18113, that is, completely cover the elastic metal filament 18113. In some embodiments, the elastic cover layer 183 may further cover part of the plug-in parts 182, and may further protect the elastic metal filament 18113 and the plug-in parts 182 at the same time. In some embodiments, the material of the elastic cover layer 183 may be silica gel, rubber, plastic, or the like. In some embodiments, a lead channel (not shown in the figure) may be arranged on the elastic cover layer 183 along a length direction of the elastic cover layer 183 (such as the connection direction of the two plug-in parts 182 shown in FIG. 5), and the lead channel and the elastic metal filament 18113 may be arranged in parallel and spaced apart. Buried wiring grooves communicating with the lead channel may be arranged on the plug-in parts 182 (not shown in the figure). The wiring group for connecting the sound-pickup assembly 16 may enter into the lead channel through the buried wiring grooves of adjacent plug-in parts 182, and further enter into the loudspeaker assemblies 11 through the other plug-in part 182. The wiring group may be configured to electrically connect the sound-pickup assembly 16 with other assemblies (e.g., a battery assembly 14 and a control circuit assembly 15). In some embodiments, the elastic modulus of the elastic cover layer 183 may be 0.5 Gpa to 2 Gpa. In some embodiments, the elastic modulus of the elastic cover layer 183 may be 0.8 Gpa to 1.5 Gpa. In some embodiments, the elastic modulus of the elastic cover layer 183 may be 1.2 Gpa to 1.4 Gpa. In the embodiment, by setting the elastic modulus of the elastic cover layer 183 to be 0.5 Gpa~2 Gpa, and due to the elastic cover layer 183 covers the outside of the elastic metal filament 18113, the vibrations transmitted outward by the elastic metal filament 18113 may be further absorbed, thereby forming the effect of internal and external coordinated vibration absorption, which may improve the vibration absorption effect of the stick assembly greatly, reduce the vibrations transmitted to the sound-pickup assembly 16 effectively, and improve the sound-pickup quality.

It should be noted that the description for the connection member 181 mentioned above may be only for convenience, and one or more embodiments of the present disclosure may not be limited to the scope of the present disclosure. It should be noted that, for those skilled in the art, after understanding the principle of the connection member 181, various components may be arbitrarily combined, or one or more elements may be omitted without departing from the principle. For example, the elastic cover layer 183 may be omitted or replaced with a rigid housing. For example, when the connection member 181 is not the elastic member 1811, or the elastic member 1811 is not the elastic connecting rod 18111, the periphery of the connection member 181 may still be covered by the elastic cover layer 183. For example, the elastic member 1811 may be an elastic connecting piece. Such variations are all within the protection scope of one or more embodiments of the present disclosure.

In some embodiments, the sound-pickup assembly may be electrically connected to other assemblies of the bone conduction headset to facilitate the controlling of the sound-pickup assembly by the user. For example, the user may choose to turn off the sound-pickup function of the sound-pickup assembly. As another example, the user may adjust the volume of the sound picked up by the sound-pickup assembly. In some embodiments, the sound-pickup assembly may include the wiring group electrically connected to other assemblies of the bone conduction headset. The sound-pickup assembly may be electrically connected to the remaining one or more assemblies of the bone conduction headset through the wiring group of the sound-pickup assembly 16. The assemblies mentioned above may be connected to the loudspeaker assemblies 11. Therefore, the wiring group of the sound-pickup assembly 16 may be electrically connected to the assemblies mentioned above through the loudspeaker assemblies 11. The assemblies mentioned above may be electrically connected to the remaining one or more assemblies of the bone conduction headset through the wiring group of the sound-pickup assembly 16. The assemblies mentioned above may be connected to the loudspeaker assemblies 11. Therefore, the wiring group of the sound-pickup assembly 16 may be electrically connected to the assemblies mentioned above through the loudspeaker assemblies 11.

Figure 6:
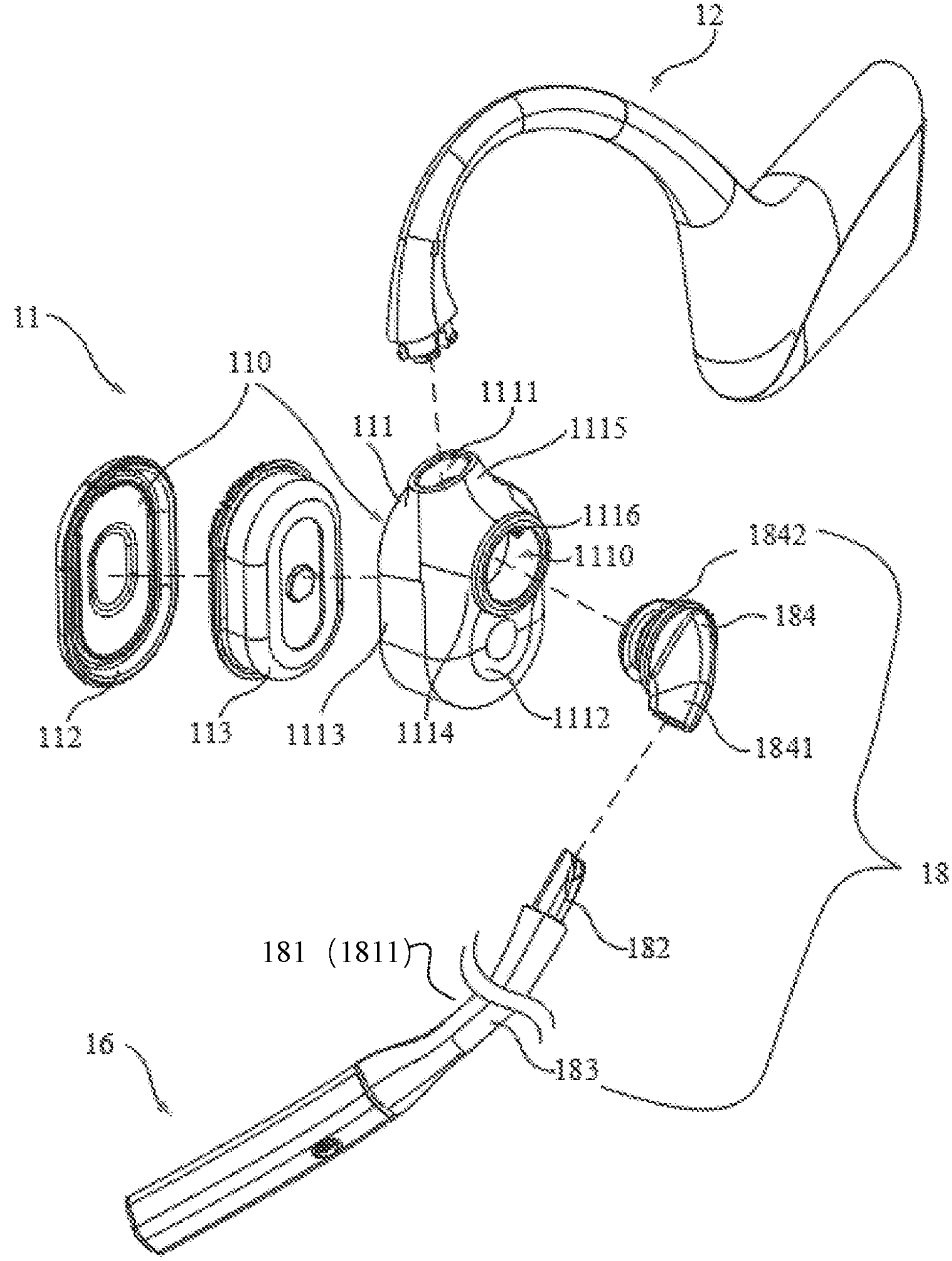
FIG. 6 is an exploded diagram illustrating a structure of a loudspeaker assembly of an acoustic input and output apparatus according to some embodiments of the present disclosure.

As shown in FIG. 6, in some embodiments, the loudspeaker assembly 11 may include a first loudspeaker housing 111, a second loudspeaker housing 112, and the loudspeaker 113. The first loudspeaker housing 111 may be matched and connected to the second loudspeaker housing 112 to form a containment space 110 for accommodating the loudspeaker 113. A first through-hole 1110 and a second through-hole 1111 may be arranged on the first loudspeaker housing at an interval, and the first through-hole 1110 and the second through-hole 1111 may be in communication with the containment space 110. The wiring group of the sound-pickup assembly 16 may traverse the first through-hole 1110, the containment space 110, and the second through-hole 1111.

In some embodiments, the sound-pickup assembly 16 may be relatively fixed opposite to the loudspeaker assembly 11. That is, the sound-pickup assembly 16 may not move relative to the loudspeaker assembly 11 after the sound-pickup assembly 16 is matched and connected to the loudspeaker assembly 11. In some embodiments, the sound-pickup assembly may be directly connected to the first loudspeaker housing, and the connection way may not be described herein. In some embodiments, the first loudspeaker housing 111 may be matched and connected to one end of the connection member 181 (e.g., the elastic member 1811). In some embodiments, the first loudspeaker housing 111 may be matched to and inserted into one end of the elastic connecting rod 18111.

In some embodiments, when the sound-pickup assembly 16 is closer to a body part of the user that generates sound, for example, the vocal cord, the throat, the mouth, the nasal cavity, or the like, the microphones of the sound-pickup assembly 16 may receive a vibration signal with greater amplitude. The sound quality of the sound signal picked up by the microphones may be better, and the volume may be larger. For example, when the sound-pickup assembly 16 is aligned with the mouth of the user, the radio effect may be better. When the user does not need to use the microphone function, for example, when the user eats food, the position of the sound-pickup assembly 16 may be adjusted. Therefore, in some embodiments, the sound-pickup assembly 16 may be configured to be rotatable relative to the loudspeaker assembly 11 to facilitate an adjustment the position of the sound-pickup assembly 16 by the user, thereby improving the user experiences.

In some embodiments, in order to facilitate the adjustment of the pickup position of the sound-pickup assembly, the sound-pickup assembly may be configured to be rotatable relative to the first loudspeaker housing 111. In some embodiments, the loudspeaker assembly 11 may include a rotation member 184. The first loudspeaker housing 111 may be configured with the first through-hole 1110.

In some embodiments, the rotation member 184 may be combined with the connection member 181 (e.g., the elastic member 1811) in one or more embodiments described above. For example, the sound-pickup assembly 16 may be connected to the rotation member 184 by the connection member 181, and the rotation relative to the loudspeaker assembly 11 may be achieved through the connection between the rotation member 184 and the loudspeaker assembly 11. In some embodiments, the connection member 181 may be the elastic member 1811. For example, the elastic member 1811 may be the elastic connecting rod 18111. The present disclosure may be illustrated combined with the rotation member 184 and the elastic connecting rod 18111.

In some embodiments, the rotation member 184 may be inserted into the first through-hole 1110 rotatably, and a plug-in part 182 may be matched to and inserted into the rotation member 184 so that the sound-pickup assembly may be rotatable relative to the first loudspeaker housing 111.

The second through-hole 1111 may be arranged on the first loudspeaker housing 111 spaced apart from the first through-hole 1110. The second through-hole 1111 may be matched to and inserted into the remaining assemblies (e.g., the ear hook assembly 12) of the bone conduction headset so that the loudspeaker assembly 11 may be fixedly connected to the remaining assemblies of the bone conduction headset (e.g., the ear hook assembly 12). The first through-hole 1110 and the second through-hole 1111 may be in communication with the containment space 110.

Figure 8:
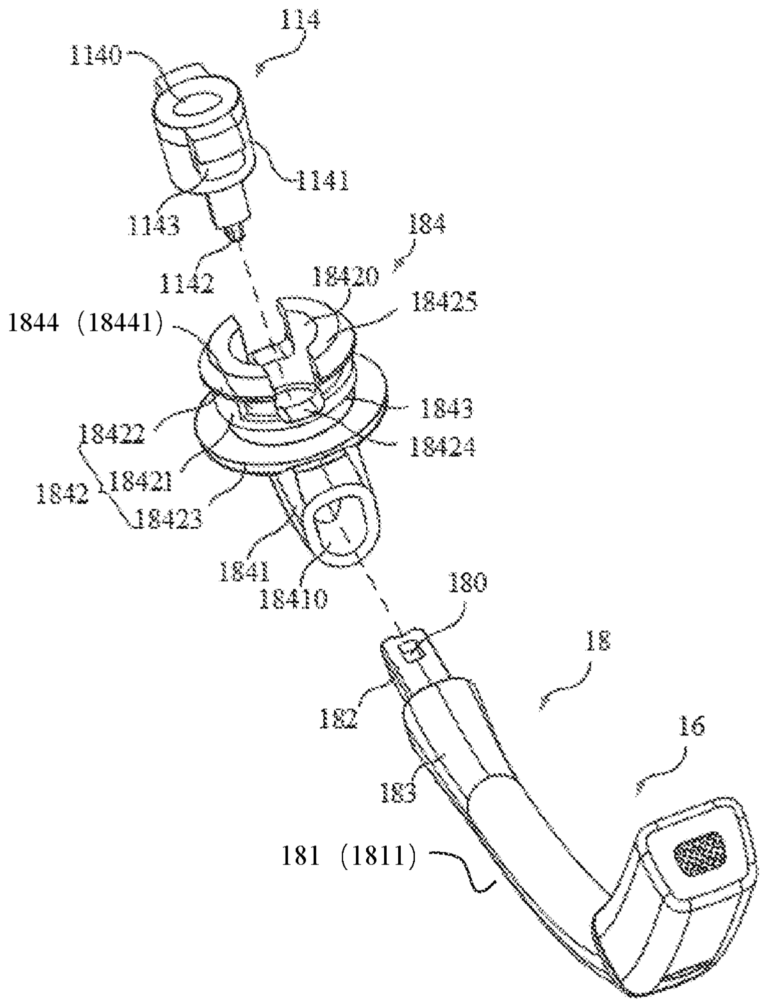
FIG. 8 is a structural diagram illustrating a fixing member, a rotation member, a connection member, and a sound-pickup assembly of an acoustic input and output apparatus according to some embodiments of the present disclosure.

As shown in FIG. 8, in some embodiments, the rotation member 184 may include a wire-guiding part 1841 and a rotation part 1842 connecting with each other. The rotation part 1842 may be inserted in the first through-hole 1110, and the sound-pickup assembly 16 may be connected with the wire-guiding part to cause the wiring group of the sound-pickup assembly 16 to pass through the wire-guiding part 1841 and traverse the first through-hole 1110 via the rotation part 1842.

In some embodiments, an access segment (not shown in the figure) extending away from the first through-hole 1110 may be arranged on an end opening of the first through-hole 1110 of the first loudspeaker housing 111. The access segment may be in communication with the first through-hole 1110. The rotation part 1842 may be sleeved on a peripheral wall of the access segment to achieve a rotatable connection with the loudspeaker assembly 11. More details regarding the wire-guiding part 1841 and the rotation part 1842 may be described elsewhere in the present disclosure, which is described here.

In some embodiments, the first loudspeaker housing 111 may include a bottom wall 1112 and a sidewall 1113 connecting with each other. The sidewall 1113 may surround and connect with the bottom wall 1112, and the second loudspeaker housing 112 may be arranged covering one side of the sidewall 1113 deviate from the bottom wall 1112 to form the containment space 110 for accommodating the loudspeaker 113. In some embodiments, the first through-hole 1110 may be formed on the bottom wall 1112, and the second through-hole 1111 may be formed on the sidewall 1113. In some embodiments, the first through-hole 1110 may be formed on one side of the bottom wall 1112 close to the second through-hole 1111 so that the first through-hole 1110 may be close to the second through-hole 1111.

In some embodiments, when the sound-pickup assembly 16 is directly connected to the loudspeaker assembly 11 (e.g., the first loudspeaker housing 111) or the sound-pickup assembly 16 is connected to the loudspeaker assembly 11 via the connection assembly 18 (e.g., the elastic member 1811), if the connecting surface between the connection assembly 18 or the sound-pickup assembly 16 and the first loudspeaker housing 111 is a plane, the rotation of the sound-pickup assembly 16 may be interfered by the first loudspeaker housing 111. Therefore, in some embodiments, the bottom wall 1112 may include a first convex part 1114 protruding in a direction away from the containment space 110, and the first through-hole 1110 may be formed on the first convex part 1114. The sidewall 1113 may include a second convex part 1115 protruding in a direction away from the containment space 110. The second through-hole 1111 may be formed on the second convex part 1115.

In some embodiments, a certain angle may be formed between a convex direction of the first convex part 1114 and a convex direction of the second convex part 1115. That is, the angle between an axial direction of the first convex part 1114 and an axial direction of the second convex part 1115 may be a certain angle. In some embodiments, the convex direction of the first convex part 1114 may be perpendicular to the convex direction of the second convex part 1115. In some embodiments, a connection between the first convex part 1114 and the second convex part 1115 may be an arched connection, that is, a connecting surface between the first convex part 1114 and the second convex part 1115 may be an arched surface. In some embodiments, the connecting surface between the first convex part 1114 and the second convex part 1115 may be a plane.

In the present embodiment, the structural strength and structural stability of the first loudspeaker housing 111 may be enhanced through the first convex part 1114 and the second convex part 1115 arranged on the bottom wall 1112 and the sidewall 1113, respectively. The convex direction of the first convex part 1114 may be perpendicular to the convex direction of the second convex part 1115, and the connection between the first convex part 1114 and the second convex part 1115 may be the arched connection. The rotation member 184 may be inserted into the first through-hole 1110 of the first convex part 1114. The rotation of the stick assembly may not be interfered from the first loudspeaker housing 111 via the first convex part 1114 with a corresponding height. Possible mutual interferences between the ear hook assembly 12 and the stick assembly may be reduced in a case that the convex direction of the convex part 1114 and the convex direction of the second convex part 1115 are perpendicular to each other.

In the present embodiment, the sound-pickup assembly 16 may connect other related assemblies of the acoustic input and output apparatus 10 via the corresponding wiring group, for example, the battery assembly 14 or the control circuit assembly 15. In addition to facilitating the controlling of the sound-pickup assembly described in the embodiments mentioned above, the acquired audio signal may be transmitted to the related assemblies for subsequent processing.

In some embodiments, a wiring group of the stick assembly (e.g., the structure formed by the connection member 181 and the sound-pickup assembly 16) may pass through the elastic cover layer 183 of the elastic connecting rod 18111 and may be led outside via the plug-in parts 182. In some embodiments, the lead channel (not shown in the figure) may be arranged on the elastic cover layer 183, and the wiring group of the sound-pickup assembly 16 may pass through the lead channel. The wiring group of the sound-pickup assembly 16 may be led outside by passing through the plug-in parts 182 and enter the inside of the first loudspeaker housing 111. Specifically, the wiring group of the sound-pickup assembly 16 may traverse the first through-hole 1110 and reach the inside of the second through-hole 1111 via the containment space 110. In some embodiments, the wiring group of the sound-pickup assembly 16 may be further led out from the second through-hole 1111, enter other assemblies of the bone conduction headset (e.g., an accommodating space 120 of the ear hook assembly 12), and be connected to other assemblies of the bone conduction headset (e.g., the battery module 14 or the control circuit assembly 15) electrically.

In actual use, the stick assembly (i.e., the structure formed by the sound-pickup assembly 16 and the connection member 181) may be rotatable relative to the first loudspeaker housing 111. In some embodiments, when the sound-pickup assembly 16 rotates, the wiring group of the sound-pickup assembly 16 may move, and the rotation of the sound-pickup assembly 16 may be restricted due to improper movement of the wiring group of the sound-pickup assembly 16. For example, the wiring group that is wound or bent excessively may restrict the sound-pickup assembly 16 to continue to rotate. In some embodiments, since the wiring group of the sound-pickup assembly 16 entering the first through-hole 1110 may contact the loudspeaker assembly 11 directly or indirectly (i.e., contacting the first loudspeaker housing 111), the wiring group of the sound-pickup assembly may also transmit the mechanical vibrations generated by the loudspeaker assembly 11 to the sound-pickup assembly 16, which in turn affecting the pickup effect of the sound-pickup assembly 16 and the stability of the electrical connection. Based on the reasons mentioned above, the present disclosure provides the loudspeaker assemblies 11 to solve the technical problems mentioned above.

In some embodiments, the loudspeaker assembly 11 may further include a wire-fixing assembly configured to fix the wiring group of the sound-pickup assembly 16 passing through the first through-hole 1110 and reaching the second through-hole 1111, thereby restricting the movement of the wiring group caused by the rotation of the sound-pickup assembly 16 relatives to the first loudspeaker housing 111, reducing the wear of the wiring group, and restricting the amplitude of the mechanical vibrations of the wiring group of the sound-pickup assembly 16 to improve the pickup effect of the sound-pickup assembly 16.

In some embodiments, the wire-fixing assembly may include a press-holding member 115 configured to press the wiring group of the sound-pickup assembly 16 tightly, thereby reducing the vibration amplitude of the wiring group of the sound-pickup assembly 16 and restricting the movement of the wiring group. Specifically, the press-holding member may be arranged in the containment space 110. That is, the press-holding member may press the wiring group of the sound-pickup assembly 16 tightly in the first loudspeaker housing 111.

Figure 7:
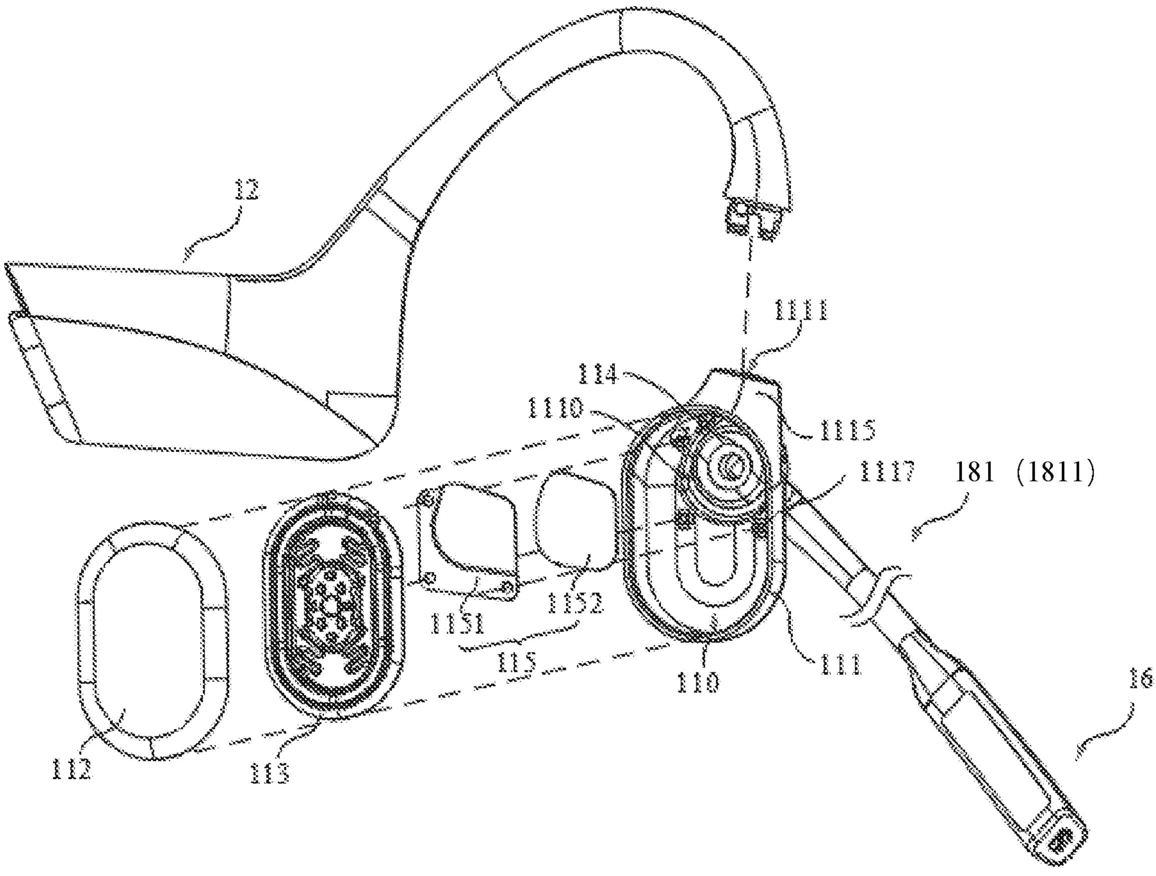
FIG. 7 is another exploded diagram illustrating a structure of a loudspeaker assembly of an acoustic input and output apparatus according to some embodiments of the present disclosure.

As shown in FIG. 7, in some embodiments, the press-holding member 115 may include a first press-holding member 1151 configured to press and hold the wiring group of the sound-pickup assembly 16. Specifically, the first press-holding member 1151 may be arranged in the containment space 110 and cover the first through-hole 1110 for pressing and holding the wiring group of the sound-pickup assembly 16 passing through the first through-hole 1110 and reaching the second through-hole 1111. In some embodiments, the first press-holding member 1151 may partially cover the first through-hole 1110, for example, the first press-holding member 1151 may partially cover the first through-hole 1110, and only a part of the gap may be left as the channel for the wiring group to pass through. In some embodiments, the first press-holding member 1151 may completely cover the first through-hole 1110. For example, the first press-holding member 1151 may completely cover the first through-hole 1110, and the wiring group may enter the containment space 110 through the gap of the connection between the first press-holding member 1151 and the first through-hole 1110. In some embodiments, a through-hole (not shown in the figure) may be arranged on the first press-holding member 1151 for the wiring group of the sound-pickup assembly 16 to pass through, and the wiring group of the sound-pickup assembly 16 may enter the containment space 110 via the through-hole of the first press-holding member 1151, which does not have to pass through the gap of the connection between the first press-holding member 1151 and the first through-hole 1110, thereby the first press-holding member 1151 may contact the first through-hole 1110 tightly.

The press-holding member 115 may restrict the movable space of the wiring group of the sound-pickup assembly 16, reduce the shaking or movement of the wiring group of the sound-pickup assembly 16, and further reduce the vibrations generated by the vibration of the loudspeaker assembly 11 and the vibrations transmitted to the sound-pickup assembly 14. The pickup effect of the sound-pickup assembly 16 and the stability of the electricity performance may also be improved. In addition, the pressing and holding of the press-holding member 115 may reduce the friction between the wiring group of the sound-pickup assembly 16 and the first loudspeaker housing 111, thereby the wiring group of the sound-pickup assembly 16 may be protected.

In some embodiments, the press-holding member 115 may further include a second press-holding member 1152. The second press-holding member 1152 may be combined with the first press-holding member 1151 in the embodiments mentioned above and press the wiring group tightly together. In some embodiments, the press-holding member may only include the second press-holding member 1152, and the tightly pressing of the wiring group may also be realized by the second press-holding member 1152. Specifically, the arrangement of the second press-holding member 1152 may be the same as or similar to the first press-holding member 1151. For example, the second press-holding member 1152 may at least partially cover the first through-hole 1110, or the through-hole may be arranged on the second press-holding member 1152 for the wiring group to pass through.

In some embodiments, the press-holding member may include the first press-holding member 1151 and the second press-holding member 1152 at the same time to improve the limiting effect of the wiring group of the sound-pickup assembly 16. In some embodiments, both the first press-holding member 1151 and the second press-holding member 1152 may be sheet-shaped members. The first press-holding member 1151 and the second press-holding member 1152 may be in a stacked manner and the second press-holding member 1152 may be spaced away from the first through-hole 1110 relative to the first press-holding member 1151. In the present embodiment, the first press-holding member 1151 may be configured as a structure contacting the wiring group of the sound-pickup assembly 16 directly and pressing the wiring group of the sound-pickup assembly 16 tightly. The second press-holding member 1152 may be configured as a structure fixing the first press-holding member 1151 and pressing the wiring group of the sound-pickup assembly 16 indirectly, thereby improving the limiting effect of the press-holding member for the wiring group of the sound-pickup assembly 16. In some embodiments, the hardness of the second press-holding member 1152 may be greater than the hardness of the first press-holding member 1151. Since the first press-holding member 1151 contacts the wiring group of the sound-pickup assembly 16 directly, the first press-holding member 1151 with smaller hardness may reduce the wear of the wiring group of the sound-pickup assembly 16, and the second press-holding member 1152 with certain hardness may make the first press-holding member 1151 to be more stable, thereby reducing the movement and the vibration amplitude of the wiring group of the sound-pickup assembly 16. In some embodiments, the press-holding member may include a plurality of the press-holding members or a combination of the plurality of the press-holding members at the same time. The combination of the press-holding members may include at least two different press-holding members.

In some embodiments, the press-holding member 115 may include a hardcover and an elastomer arranged in a stacked manner. The hardcover may be used as the first press-holding member 1151, and the elastomer may be used as the second press-holding member 1152. The hardcover may be spaced away from the first through-hole 1110 than the elastomer and the elastomer may be configured to contact the wiring group of the sound-pickup assembly 16. The hardness of the hardcover may be greater than the hardness of the elastomer. The hardcover may contact the wiring group of the sound-pickup assembly 16 by pressing and holding the elastomer. Since the hardness of the hardcover is greater than the hardness of the elastomer, the hardcover with greater hardness may ensure the stiffness pressing and holding the wiring group of the sound-pickup assembly 16, and the elastomer with smaller hardness may improve the absorption of movement and the vibrations of the wiring group of the sound-pickup assembly 16, thereby reducing the vibrations of the wiring group of the sound-pickup assembly 16 to play a role of buffer and protection.

In some embodiments, the hardcover may be metal, ceramic, plastic, or the like. For example, the hardcover may be a steel sheet. In some embodiments, the elastomer may be plastic, silica gel, rubber sheet, fiber, or the like, for example, the elastomer may be a bubble foam.

In some embodiments, a wire-fixing assembly may fix the wiring group of the sound-pickup assembly by other means or structures except for the press-holding member 115 in one or more embodiments mentioned above.

In some embodiments, the wire-fixing assembly may include one or more clamps arranged in the containment space 110, and the clamps may be used to fix the wiring group of the sound-pickup assembly 16. Specifically, the one or more clamps may be fixedly arranged on an inner wall of the first loudspeaker housing 111. The wiring group of the sound-pickup assembly 16 may be fixed by the clamps after the wiring group of the sound-pickup assembly 16 enters the containment space 110 via the first through-hole 1110. In some embodiments, the one or more clamps may be arranged in a predetermined manner so that the wiring group of the sound-pickup assembly 16 may reach the second through-hole 1111 smoothly via the containment space 110. Although the wiring group of the sound-pickup assembly 16 is fixed by the clamps, the rotation of the sound-pickup assembly 16 relative to the first loudspeaker housing 111 may not be affected. In the present embodiment, the wiring group of the sound-pickup assembly 16 may also be fixed by the clamps. The volumes of the clamps may be relatively small to reduce the occupied space, which may reduce the volume of the loudspeaker assembly.

In some embodiments, the press-holding member may be physically connected to the first loudspeaker housing 111, for example, by a bonding connection, a pin connection, a welding connection, an integral molding, or the like. In order to ensure that the press-holding member 115 accurately presses the wiring group of the sound-pickup assembly 16, and further improve the connection strength between the press-holding member 115 and the first loudspeaker housing 111 and the service life, in some embodiments, the loudspeaker assembly 11 may further include locating members 1117 arranged on the first loudspeaker housing 111 at an interval. The first press-holding member 1151 and/or the second press-holding member 1152 may be fixed to the first loudspeaker housing 111 via the locating members 1117.

In some embodiments, the locating members 1117 may be convex cylinders 11171 arranged on the periphery of the first through-hole 1110 and extending into the containment space 110.

Figure 9:
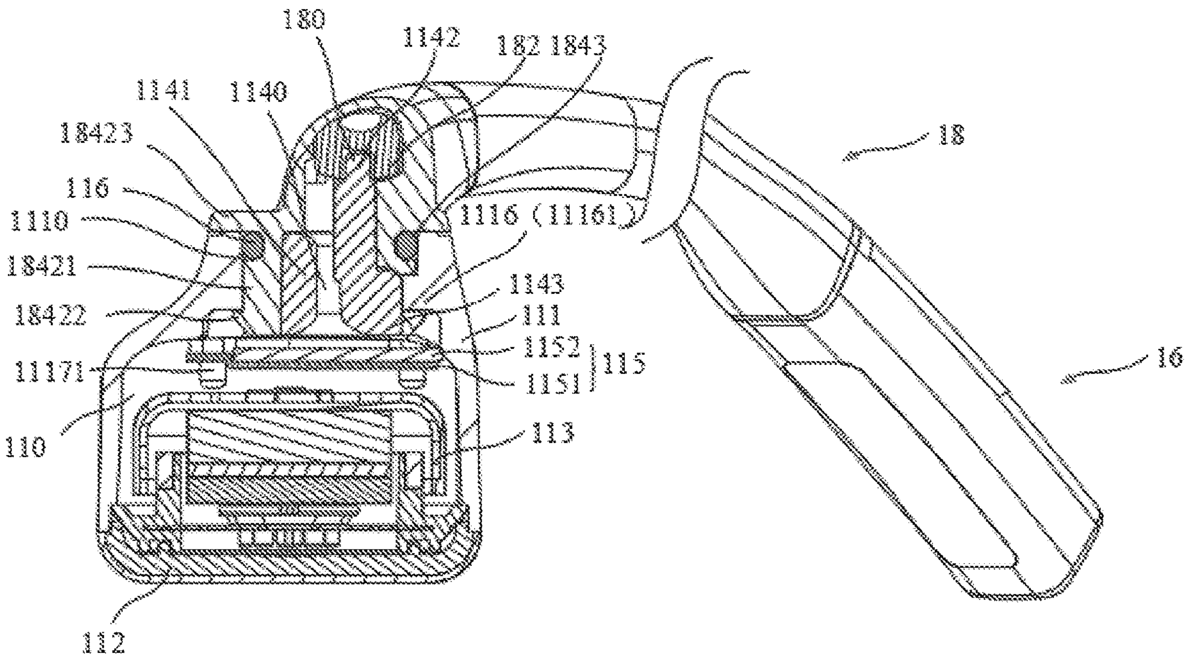
FIG. 9 is a sectional view of A-A as a section line in FIG. 3.

Specifically, taking the embodiments shown in FIG. 9 as examples, a plurality of convex cylinders 13171 may be arranged on the periphery of the first through-hole 1110 of the first loudspeaker housing 111 and extending into the containment space 110, and the plurality of convex cylinders 11171 may be the locating members 1117 fixing the press-holding member 115. The plurality of convex cylinders 11171 may be arranged on the periphery of the first through-hole 1110 at an interval. In some embodiments, the second press-holding member 1152 may be fixedly connected to the plurality of locating members 1117, and the first press-holding member 1151 may be fixed among the plurality of locating members 1117. Specifically, a hardcover 1151 may be fixed on the plurality of convex cylinders 11171, and the elastomer 1152 may be arranged among the plurality of convex cylinders 11171 without connecting the plurality of convex cylinders 11171 directly. For example, the number or count of the convex cylinders 11171 may be three. The elastomer 1152 may be pressed and held between the first through-hole 1110 and the hardcover through the hardcover fixed by the plurality of convex cylinders 11171 arranged on the periphery of the first through-hole 1110. The elastomer may press and hold the wiring group of the sound-pickup assembly 16, and the plurality of convex cylinders 11171 may improve the stability of the hardcover 1151, which in turn improving the stability of the elastomer 1152 contacting the wiring group.

It should be noted that the locating members 1117 may be other structures or forms fixing the press-holding member 115 except for the convex cylinders 11171 in the embodiments mentioned above. For example, the locating members 1117 may be arranged on a position-limiting board (not shown in the figure) in the first loudspeaker housing 111, and the position-limiting board may restrict the press-holding member 115 (e.g., the hardcover and the elastomer) to move. The press-holding member 115 may be limited at a position contacting the first through-hole closely to make the press-holding member 115 press the wiring group of the sound-pickup assembly 16 tightly.

The wiring group of the sound-pickup assembly 16 may be fixed by the wire-fixing assembly. For example, the wiring group of the sound-pickup assembly 16 may be pressed and held via the press-holding member 115, the vibrations of the wiring group of the sound-pickup assembly 16 generated by the vibrations of the loudspeaker assembly 11 may be reduced, the stability of the wiring group may be enhanced during the process of rotating of the sound-pickup assembly 16, the wear of the wiring group of the sound-pickup assembly 16 may be reduced, and the service life of the wiring group may also be improved.

In some embodiments, the sound-pickup assembly 16 may also have a good stability during the process of rotating, that is, a matching structure of the rotation member 184 and the first through-hole 1110 may have a greater effect on the rotation stability of the sound-pickup assembly 16. The following is an exemplary description of the structure of the rotation member 184.

As shown in FIG. 8, in some embodiments, the rotation member 184 may include a wire-guiding part 1841 and a rotation part 1842 connecting with each other. The wire-guiding part 1841 may be configured to be connected to the sound-pickup assembly 16 (or the connection member 181). The rotation part 1842 may be inserted in the first through-hole 1110 and may be rotatable relative to the first loudspeaker housing 111. The wiring group of the sound-pickup assembly 16 may enter the containment space 110 via the wire-guiding part 1841 and the rotation part 1842. In some embodiments, the wire-guiding part 1841 may be configured with a first hole segment 18410. The rotation part 1842 may be configured with a second hole segment 18420 along an axial direction. The first hole segment 18410 may communicate with the second hole segment 18420.

In some embodiments, the connection member 181 (e.g., the elastic member 1811) may be matched and connected to the wire-guiding part 1841, and the wiring group of the sound-pickup assembly 16 may enter the first through-hole 1110 via the connection member 181, the wire-guiding part 1841 (the first hole segment 18410 of the wire-guiding part 1841), and the rotation part 1842 (the second hole segment 18420 of the rotation part 1842) sequentially.

In some embodiments, the connection assembly 18 may include a matching connection assembly configured to match and connect the connection member 181 (e.g., the elastic member 1811) to the wire-guiding part 1841. For example, one end of the connection member 181 away from the sound-pickup assembly 16 and one end of the wire-guiding part 1841 away from the rotation part 1842 may be configured with a first matching connection member and a second matching connection member mutually matched. When the first matching connection member is matched and connected to the second matching connection member, the wire-guiding part 1841 may be relatively fixed to the connection member 181.

In some embodiments, the first matching connection member may be the plug-in parts 182 in one or more embodiments mentioned above. The plug-in parts 182 (e.g., the plug-in parts 182 of the connection member 181) of the stick assembly (e.g., the structure formed by the connection member 181 and the sound-pickup assembly 16) may be inserted into the first hole segment 18410 of the wire-guiding part 1841. When the connection member 181 is connected to the rotation member 184, the wiring group of the sound-pickup assembly 16 may enter the containment space 110 via the first hole segment 18410 and the second hole segment 18420. In some embodiments, the plug-in parts 182 may be configured with a plug-in hole segment (not shown in the figure). The plug-in hole segment may be sleeved on the periphery of the first hole segment 18410 of the wire-guiding part 1841, and the wiring group of the sound-pickup assembly 16 may be inserted into the first hole segment 18410 via the plug-in hole segment.

In some embodiments, an angle between an extending direction of the first hole segment 18410 and an extending direction of the second hole segment 18420 may be less than 180°. In some embodiments, the angle between the extending direction of the first hole segment 18410 and the extending direction of the second hole segment 18420 may be less than 170°. In some embodiments, the angle between the extending direction of the first hole segment 18410 and the extending direction of the second hole segment 18420 may be less than 160°. In some embodiments, the angle between the extending direction of the first hole segment 18410 and the extending direction of the second hole segment 18420 may be less than 150°.

When the user wears the bone conduction headset, a facing direction of the sound-pickup assembly 16 may be adjusted by rotating the rotation member to obtain different levels of radio effects. In some embodiments, the user may need to accurately adjust the sound-pickup assembly 16 to a position, for example, the user's mouth. In some embodiments, when the user rotates the sound-pickup assembly 16 to a certain position, the sound-pickup assembly 16 may be kept in the position. For example, when the user no longer needs to use the microphone function, the user may rotate the sound-pickup assembly 16 and keep the sound-pickup assembly 16 on one side deviating from the mouth of the user. Therefore, it may also be necessary to design the rotation member so that the rotation part 1842 may not rotate relative to the first through-hole randomly.

In some embodiments, a damping groove 1843 may be arranged along a circumferential direction of the rotation part 1842. The connection assembly 18 may further include a damping member 116 arranged in the damping groove 1843. The damping member 116 may contact an inner wall of the first through-hole 1110 to provide a rotation damping for the rotation part 1842 via contact friction. In the present embodiment, when the rotation part 1842 is rotatable relative to the first loudspeaker housing 111, the damping member 116 may contact the inner wall of the first through-hole 1110 to provide a rotation damping. During the process of adjusting the sound-pickup assembly 16 by the user, the user may feel the change of damping, and the adjustment accuracy of the sound-pickup assembly 16 may be improved. At the same time, when the user completes the adjustment, the existence of the rotation damping may keep the rotation part 1842 and the sound-pickup assembly 16 in a certain position without rotation casually, so as to further improve the user experiences.

As shown in FIG. 8, in some embodiments, the rotation part 1842 may include a rotation main body 18421, and a first stopping part 18422 and a second stopping part 18423 protruding from two ends of the rotation main body 18421 may be arranged along a radial direction of the rotation main body 18421, respectively. In some embodiments, the rotation main body 18421 may be inserted into the first through-hole 1110. The first stopping part 18422 and the second stopping part 18423 may abut against two sides of the first loudspeaker housing 111, respectively, to restrict a movement of the rotation part 1842 relative to the first loudspeaker housing 111 along an axial direction.

In some embodiments, the rotation main body 18421 may be configured with a cylindrical shape, and the second hole segment 18420 may be arranged along the axial direction of the rotation main body 18421. In some embodiments, the first stopping part 18422 and the second stopping part 18423 may be arranged on the periphery of the rotation main body 18421, which are arranged in an annular shape or open-loops. Specifically, the first stopping part 18422 may be away from the wire-guiding part 1841 than the second stopping part 18423, and the second stopping part 18423 may be close to the wire-guiding part 1841 than the first stopping part 18422. Specifically, the first stopping part 18422 and the second stopping part 18423 may abut against two sides of the first through-hole 1110 of the first loudspeaker housing 111, respectively, that is, one side of the containment space 110 and the other side of the containment space 110. The first stopping part 18422 and the second stopping part 18423 arranged at two ends of the rotation main body 18421 abutting against two sides of the first loudspeaker housing 111 may effectively restrict the movement of the rotation part 1842 along the axial direction, thereby restricting the rotation part 1842 to rotate in the first through-hole 1110 to enhance the rotational stability.

In some embodiments, the first stopping part 18422 and the second stopping part 18423 may be combined with the damping member (e.g., the damping member 116 and the damping groove 1843) in one or more embodiments mentioned above. As shown in FIG. 8 and FIG. 9, in some embodiments, in order to further enhance the rotational stability of the sound-pickup assembly 16, the rotation part 1842 may be configured with the damping groove 1843. In some embodiments, the damping groove 1843 may be formed between the first stopping part 18422 and the second stopping part 18423 of the rotation main body 18421 along the circumferential direction. The loudspeaker assembly 11 may include the damping member 116. For example, the damping member 116 may be a damping ring sleeved in the damping groove 1843. The damping member 116 (e.g., the damping ring) may be arranged in the damping groove 1843 and in contact with the inner wall of the first through-hole 1110 to provide the rotation damping to the rotation part 1842 by contact friction. The inner wall of the first through-hole 1110, that is the bottom wall, may surround a part of the first through-hole 1110. The damping member 116 inserted into the damping groove 1843 that provides the damping to the rotation part 1842 rotating in the first through-hole 1110 may make the rotation of the rotation portion 1842 to be more stable, and enhance the rotation balance and stability of the stick assembly. At the same time, since a damping assembly is added, the rotation part 1842 rotating relative to the first through-hole 1110 may need to overcome the rotation damping, which may effectively prevent the rotation member from rotating randomly. On the other hand, when the user rotates the sound-pickup assembly 16 to the target position, the sound-pickup assembly 16 may not need to be fixed to fix the position of the sound-pickup assembly 16, thereby further improving the user experiences.

The material of the damping member 116 is not limited in the present disclosure. In some embodiments, the damping member 116 may be a rubber member, a plastic member, a silicone element, or the like. In addition, the damping member 116 may also be other types of materials, such as alloy with high damping.

In some embodiments, in the process of rotating the sound-pickup assembly 16, the reliability of the rotation may need to be enhanced except for the rotational stability. If the sound-pickup assembly 16 may be rotatable in the same direction without restrictions (i.e., the rotation range is more than 360 degrees), the wiring group, or the like, of the sound-pickup assembly 16 may be twisted or broken. If the sound-pickup assembly 16 is rotatable in the same direction without restrictions, the damping assembly (the damping groove 1843 and damping member 116) of the rotation member 184 may be more susceptible to fail, resulting in subsequent difficulties to adjust the angles of the sound-pickup assembly 16 by the rotation member 16. Therefore, in some embodiments, it may be necessary to limit the rotation range of the sound-pickup assembly 16.

In some embodiments, the connection assembly 18 may further include a rotation-limiting structure, and the rotation-limiting structure may be configured to restrict a rotation range of the rotation part 1842 relative to the first loudspeaker housing 111, thereby improving the service life of the rotation member.

In some embodiments, the rotation-limiting structure may include a limiting groove 18441 arranged at an upper portion of the rotation part 1842 along a circumferential direction and a limiting member 1116 arranged on the inner wall of the first through-hole and matched to the limiting groove 18441. When the rotation part 1842 rotates relative to the first loudspeaker housing 111, the limiting member 1116 may abut against two ends of the limiting groove 18441, to restrict the rotation part 1842 from rotating.

As shown in FIG. 8 and FIG. 9, in some embodiments, the rotation part 1842 may be configured with the limiting groove 18441. A convex block 11161 may be arranged protruding from the inner wall of the first through-hole 1110, and the convex block 11161 may be matched with the limiting groove 18441 to restrict the rotation range of the rotation part 1842.

In some embodiments, the rotation-limiting structure may be combined with the damping assembly (e.g., the damping member 116 and the damping groove 1843) and/or the first stopping part 18422, and the second stopping part 18423 in one or more embodiments mentioned above.

In some embodiments, the limiting groove may form between the first stopping part 18422 and the second stopping part 18423 along the circumferential direction of the rotation main body 18421. The limiting groove 18441 and the damping groove 1843 may be arranged at an interval. Specifically, the limiting groove 18441 and the damping groove 1843 may be arranged at an interval along the axial direction of the rotation main body 18421. For example, in the embodiment shown in FIG. 9, the limiting groove 18441 may be closer to the first stopping part 18422, and the damping groove 1843 may be closer to the second stopping part 18423. In some embodiments, the limiting groove 18441 may be arranged as the open-loop. That is, an angle occupied by the limiting groove 18441 may be less than 360°. In some embodiments, the angle occupied by the limiting groove 18441 may be less than 300°. In some embodiments, the angle occupied by the limiting groove 18441 may be less than 270°. In some embodiments, the limiting groove 18441 may be coincident with the damping groove 1843. For example, the limiting groove 18441 may provide rotation damping for the rotation member.

In some embodiments, the positions of the limiting groove 18441 and the convex block 11161 may not be limited in the present disclosure. For example, the limiting groove 18441 may be arranged on the inner wall of the first through-hole 1110, and the convex block 11161 may be arranged on the rotation main body 18421.

In some embodiments, the convex block 11161 may be arranged protruding from the inner wall of the first through-hole 1110 (also shown in FIG. 9). The convex block 11161 may be inserted into the limiting groove 18441. In the present embodiment, when the rotation part 1842 is rotatable relative to the first loudspeaker housing 111, two ends of the limiting groove 18441 may change the position between the convex block 11161 with the rotation of the rotation part 1842. When the limiting groove 18441 rotates to one end abutting against the convex block 11161, and the convex block 11161 may restrict the rotation part 1842 from rotating along the current rotation direction. That is, the convex block 11161 may abut against the two ends of the limiting groove 18441 to restrict the rotation range of the rotation part 1842.

The convex block 11161 arranged on the inner wall of the first through-hole 1110 and the limiting groove 18441 arranged on the rotation main body 18421 may restrict the rotation range of the rotation part 1842, and the sound-pickup assembly 16 may be rotatable in a certain range without unrestricted rotation in one direction. Thus, the rotation reliability of the sound-pickup assembly 16 may be improved, the failure probability of the sound-pickup assembly 16 may be reduced, and the service life of the acoustic input and output apparatus 10 may be improved.

In some embodiments, the count of limiting groove 18441 and the convex block 11161 may be one. More details about the matching of the limiting groove 18441 and the convex block 11161 may be illustrated in one or more embodiments mentioned above, which is not illustrated here. In some embodiments, the count of limiting grooves 18441 and the convex blocks 11161 may be at least two. For example, the count of limiting grooves 18441 and the convex blocks 11161 may be two. The two limiting grooves 18441 may be arranged on a peripheral wall of the rotation part 1842 at an interval, and the two convex blocks 11161 may be arranged at the inner wall of the first through-hole 1110. One convex block 11161 may correspond to one limiting groove 18441. In some embodiments, the two limiting grooves 18441 may be located at the same plane of the inner wall of the rotation part 1842, or at different planes. That is, the two limiting grooves 18441 may be in a staggered state. The position of the convex block 11161 may not be limited as long as the convex block 11161 is matched and connected to the limiting groove 18441.

In some embodiments, the rotation-limiting structure may restrict the rotation range of the rotation member 184 in other ways except for the limiting groove 18441 and the convex block 11161 in one or more embodiments mentioned above. In some embodiments, the rotation-limiting structure may include a magnetic assembly (not shown in the figure), and the magnetic assembly may include a magnetic conductor arranged on the rotation part 1842 along a circumferential direction and a magnet arranged on the inner wall of the first through-hole 1110. In some embodiments, the magnetic conductor may have a certain length and surround the peripherical wall of the rotating portion 1842. The strong coupling between the magnets and magnetic conductor may prevent the magnets from being separated from the magnetic conductor. When the magnets move to two ends of the magnetic conductor, the strong coupling between the magnets and the magnetic conductor may prevent the magnets from moving, thereby restricting the rotation range of the rotation part 1842. In some embodiments, the length of the magnetic conductor may be less than the peripherical wall of the rotation part 1842. Further, the length of the magnetic conductor may be less than 5/6 of the circumference of the peripheral wall of the rotation part 1842, and the rotation range corresponding to the rotation part 1842 may be 300 degrees. Further, the length of the magnetic conductor may be less than 3/4 of the circumference of the peripherical wall of the rotation part 1842, and the rotation range corresponding to the rotation part 1842 may be 270 degrees.

In some embodiments, the sound-pickup assembly 16 and the rotation member 184 may be relatively fixed. That is, the sound-pickup assembly 16 may not be disassembled from the rotation member, for example, through a bonding connection, a welding connection, or the like. However, in some practical application scenarios, the user may often need to disassemble the sound-pickup assembly for repair, replacement, or the like. If the connection between the sound-pickup assembly and the rotation member 184 is a fixed connection, it may be inconvenient to disassemble the sound-pickup assembly 16. Therefore, in some embodiments, the sound-pickup assembly 16 may be configured to be detachably connected to the rotation member 184. However, in some application scenarios, the position of the sound-pickup assembly 16 may change frequently, and the connection strength between the sound-pickup assembly 16 and the rotation member 184 may be reduced after a long period of time. Therefore, the sound-pickup assembly 16 may be separated from the rotation member 184.

In some embodiments, the connection assembly 18 may further include a fixing assembly configured to restrict the movement of the sound-pickup assembly 16 relative to the rotation member 184. In some embodiments, the fixing assembly may be a detachable assembly. In some embodiments, the fixing assembly may include a third matching connection member (not shown in the figure) arranged on the wire-guiding part 1841 and a fourth matching connection member arranged on the sound-pickup assembly 16 matched and connected to the third matching connection member (not shown in the figure). The matching between the third matching connection member and the fourth matching connection member may connect the sound-pickup assembly 16 to the rotation member 184. In some embodiments, the third matching connection member may be a buckle arranged on the sound-pickup assembly 16. The fourth matching connection part may be a buckle notch arranged in the first hole segment 18410 of the wire-guiding part 1841 and matched to the buckle. The buckle may be stuck in the buckle notch to fix the sound-pickup assembly 16 and the rotation member 184.

It should be noted that the fixing assembly in the present disclosure may be combined with the connection member 181 (e.g., the elastic member 1811) in one or more embodiments mentioned above. For example, the connection assembly 18 may include the fixing assembly and the connection member 181 at the same time. The sound-pickup assembly 16 may be connected to the rotation member 184 via the connection member 181, while the sound-pickup assembly 16 may be connected to the connection member 181 via the fixing assembly.

Combined FIG. 8 with FIG. 9, in some embodiments, in order to reduce the occurrence of the connection member 181 inserted into the first hole segment 11410 (e.g., the elastic member 1811) to fall off or be pulled out, or the like, in some embodiments, the fixing assembly may include a fixing member 114, and the fixing member 114 may be arranged on the rotation member 184 to fixedly connect the connection member 181 to the rotation member 184. In some embodiments, the fixing member 114 may be a part of the loudspeaker assembly 11 configured to fix the connection member 181 inserted into the first hole segment 11410, thereby restricting the movement of the stick assembly (e.g., the connection member 181 and the sound-pickup assembly 16).

In some embodiments, the fixing member 114 may further include a fixedly connection part arranged on one end of a fixing main body 1141, and the first end of the connection member 181 may be configured with a fixedly adaptive connection part. The fixedly connection part may be matched and connected to the fixedly adaptive connection part.

In some embodiments, the fixedly adaptive connection part may be a fixing hole 180. Specifically, the fixing hole 180 may be arranged on the first end of the connection member 181 inserted into the first hole segment 11410.

In some embodiments, the fixedly connection part may be a plug-in pin 1142 matched and connected to the fixing hole 180. Specifically, the fixing member 114 may include the fixing main body 1141 and the plug-in pin 1142 arranged on one end of the fixing main body 1141. The fixing main body 1141 may be inserted into the second hole segment 18420, and the plug-in pin 1142 may be inserted into the fixing hole 180 to restrict the movement of the connection member 181 and the sound-pickup assembly 16. In some embodiments, the fixing main body 1141 may be configured with a wire-guiding hole 1140 along the length direction. When the fixing member 114 is matched and connected to the rotation member 184 and the rotation member 184 is matched and connected to the first through-hole 1110, the wire-guiding hole 1140 may be in communication with the second hole segment 18420 and the containment space 110 of the loudspeaker assembly 11, and the wiring group of the sound-pickup assembly 16 may enter the wire-guiding hole 1140 via the first hole segment 11410, and enter the containment space 110 by passing through corresponding wire-guiding hole 1140 on the fixing main body 1141.

In some embodiments, the plug-in pin 1142 may be configured with a wire-threading hole communicating with the wire-guiding hole 1140 along the axial direction (not shown in the figure). When the fixing hole 180 is matched and connected to the plug-in pin 1142, the wiring group of the sound-pickup assembly 16 may enter the wire-threading hole via the fixing hole 180 and enter the wire-guiding hole 1140 via the wire-threading hole.

It should be noted that the specific structure of the fixedly connection part and the fixedly adaptive connection part may not be limited in the present disclosure. In some embodiments, the fixedly connection part may be the fixing hole 180 arranged on one end of the fixing main body 1141, and the fixing hole 180 may communicate with the wire-guiding hole 1140. The fixedly adaptive connection part may be the plug-in pin 1142 arranged on one end of the connection member 181 (e.g., the elastic member 1811), and the wiring group of the sound-pickup assembly 16 may enter the fixing hole 180 via the plug-in pin 1142, and enter the wire-guiding hole 1140 via the fixing hole 180.

In some embodiments, the plug-in pin 1142 may include the buckle. When the plug-in pin 1142 is matched and connected to the fixing hole 180, the buckle may be stuck in the fixing hole 180 to prevent the plug-in pin 1142 from separating from the fixing hole 180, thereby further improving the connection strength of the connection member 181.

In some embodiments, the rotation part 1842 may need to have a certain rigidity to ensure that the rotation member 184 has sufficient connection strength when the rotation member 184 is connected to the first loudspeaker housing 111. In some embodiments, when the rotation part 1842 is matched and connected to the first loudspeaker housing 111, the first stopping part 18422 and the rotation main body 18421 may need to be inserted into the first through-hole 1110. If the rigidity of the rotation part 1842 is too large, it may be inconvenient to insert the first stopping part 18422 and the rotation main body 18421 into the first through-hole 1110. Therefore, it may be necessary that the rotation main body 18421 and the first stopping part 18422 have a certain elasticity. Based on the reasons mentioned above, the structure of the rotation part 1842 may need to be designed to have a certain elasticity to be inserted in the first through-hole 1110 while ensuring a certain rigidity.

In some embodiments, gaps 18424 may be formed at one end of the rotation part 1842 away from the wire-guiding part 1841, and the gaps 18424 may communicate with the second hole segment 18420. The fixing member 114 may further include convex tables 1143 arranged protruding from a periphery of the fixing main body 1141. The convex tables 1143 may be inserted into the gaps 18424 to fill the gaps 18424. The rotation main body 18421 may be accommodated in the second hole segment 18420 stably.

In some embodiments, a count of gaps 18424 may be at least two, and the gaps 18424 may divide one end of the rotation part 1842 away from the wire-guiding part 1841 into at least two sub-members 18425 spaced apart from each other along the circumferential direction of the rotation part 1842. That is, the gaps 18424 may penetrate the peripheral side of the rotation main body 18421, and in the circumferential direction of the rotation part 1842, one end of the rotation part 1842 away from the wire-guiding part 1841 may be divided into a corresponding count of sub-members 18425.

The end part of the rotation portion 1842 may be divided into at least two sub-members 18425 by the gaps 18424, so that one end of the rotation part 1842 away from the wire-guiding part 1841 may have a certain elasticity. The difficulty of inserting the rotation part 1842 into the first through-hole 1110 may be reduced, and the assembly efficiency may be improved. At the same time, the convex tables 1143 may be inserted into the gaps 18424, and the structural reliability and strength of the rotation part 1842 may be enhanced by taking advantage of the two complementary approaches.

In some embodiments, the count of gaps 18424 may be two and opposite to each other. The count of convex tables 1143 may be two, correspondingly, and opposite to each other. The two convex tables 1143 may be inserted into the two gaps 18424 so that the fixing member 114 may be supported between the two sub-members 18425. Further, the two convex tables 1143 may be inserted into the two gaps 18424. Therefore, one end of the fixing member 114 and one end of the rotation part 1842 away from the wire-guiding part 1841 may complement with each other to form a complete annular structure.

In some embodiments, the count of the gaps 18424 may not be limited in the present disclosure, and the count of the gaps 18424 may be one, three, four, or more. The count of the sub-members 18425 may be the same as the count of the gaps 18424, so that the sub-members 18425 may completely fill the gaps 18424 to form a complete annular structure.

It should be noted that the description of the fixing assembly may be only for the convenience of description, and one or more embodiments of the present disclosure may not be limited in the scope of the description. It may be understood that for those skilled in the art, after understanding the principle of the fixing assembly, any combination without departing from the principle may be achieved, or one or more of the assemblies herein may be omitted. For example, the fixedly connection member and the fixedly adaptive connection member may be omitted. For example, the fixing assembly may be combined with the wire-fixing assembly in one or more embodiments mentioned above. As another example, the fixing assembly may be combined with the elastic member 1811 in one or more embodiments mentioned above. In some embodiments, the fixing member 114 may further include the fixedly connection part arranged on one end of the fixing main body 1141, and a first end of the elastic member 1811 may be configured with the fixedly adaptive part. The fixedly connection part may be matched and connected to the fixedly adaptive part to restrict the movement of the elastic member 1811 relative to the rotation member 184. As another example, the fixing assembly may be combined with the damping assembly (e.g., the damping member 116 and the damping groove 1843) in one or more embodiments mentioned above and the rotation-limiting structure (e.g., the limiting groove 18441 and the convex table 11161). Such modifications may all be in the scope of one or more embodiments of the present disclosure.

In some embodiments, when the acoustic input and output apparatus 10 is the bone conduction headset, an ear hook assembly 12 may be included and connected to the loudspeaker assembly 11 so that the loudspeaker assembly 11 may be in a stable contact with the ears of the user to prevent the loudspeaker assembly 11 from falling off from the ears of the user.

In some embodiments, the count of the ear hook assembly 12 may be at least one. For example, the bone conduction headset is a single-ear headset. The count of the loudspeaker assembly 11 of the single-ear headset may be one, and one loudspeaker assembly 11 may be connected to one ear hook assembly 12 and fixed to one of the ears of the user. In some embodiments, the count of the ear hook assemblies may be two. For example, the bone conduction headset may be a double-ear headset. When the user wears the bone conduction headset, two groups of the loudspeaker assemblies 11 may be connected to two groups of the ear hook assemblies 12 and fixed near the left and right ear of the user to realize double-ear wearing.

In some embodiments, the second through-hole 1111 of the first loudspeaker housing 111 may be configured for matching to and plugging in the ear hook assembly 12, and the wiring group of the sound-pickup assembly 16 may pass through the ear hook assembly 12 and enter an accommodating space 120 via the second through-hole 1111. The following is an exemplary description of the ear hook assembly 12 in the embodiment.

In some embodiments, the ear hook assembly 12 may include an ear hook connection assembly and an ear hook housing. The ear hook assembly 122 may be connected with the second through-hole 1111 and the ear hook housing. The interior of the ear hook housing may be configured with the accommodating space 120 for accommodating at least one of the battery assembly 14 and the control circuit assembly 15. The wiring group of the sound-pickup assembly 16 may pass through the second through-hole 1111, enter the accommodating space 120 via the ear hook assembly 122, and be electrically connected with the battery assembly 14 and/or the control circuit assembly 15 in the accommodating space 120.

Figure 10:
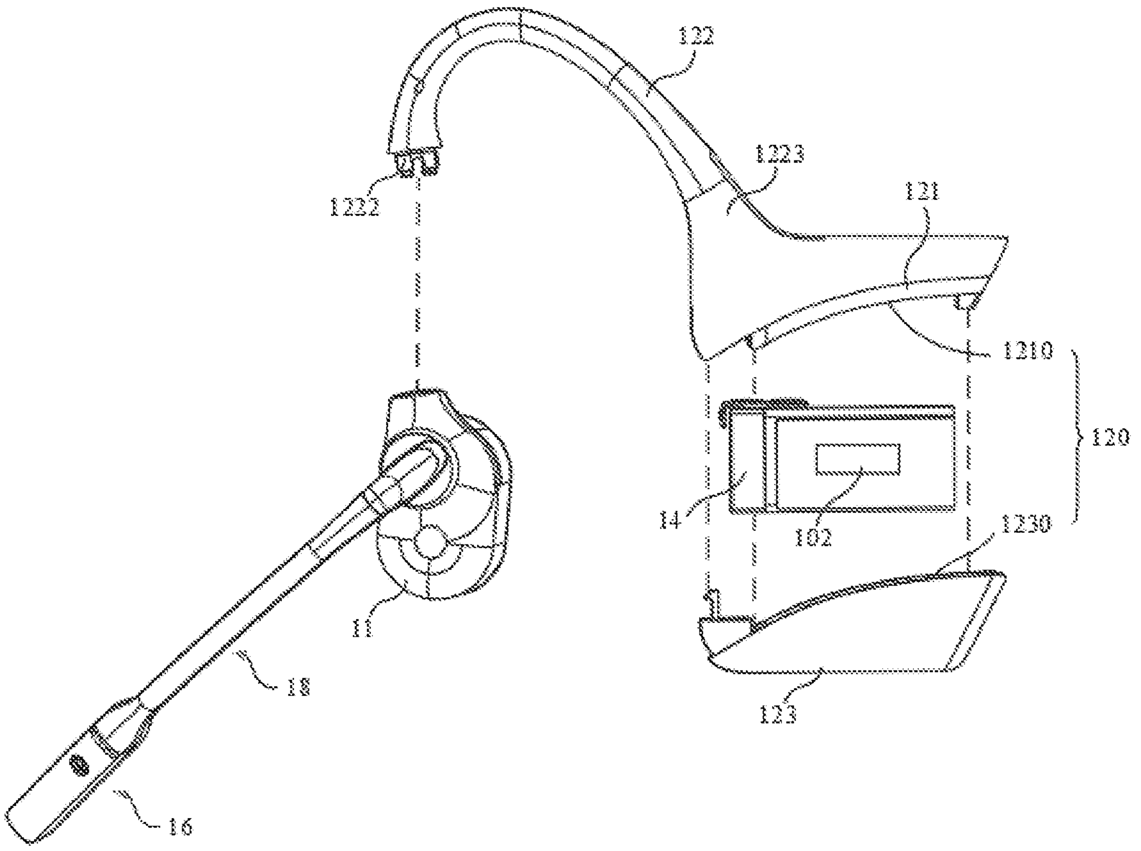
FIG. 10 is an exploded diagram of a structure of an ear hook assembly of an acoustic input and output apparatus according to some embodiments of the present disclosure.
Figure 11:
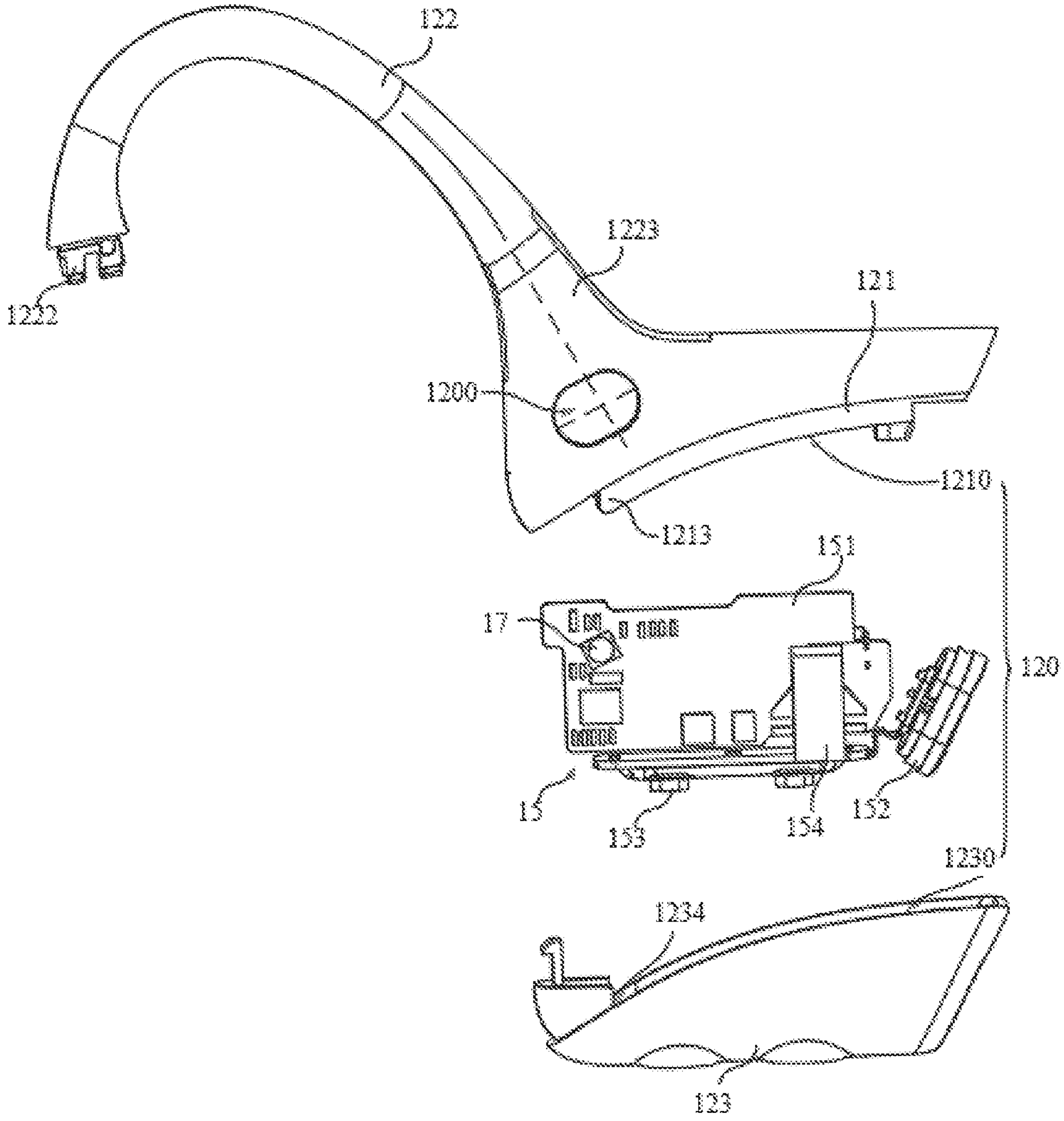
FIG. 11 is another exploded diagram illustrating a structure of an ear hook assembly of an acoustic input and output apparatus according to some embodiments of the present disclosure.

As shown in FIG. 10 and FIG. 11, in some embodiments, the ear hook housing may include a first ear hook housing 121 and a second ear hook housing 123 matching the first ear hook housing 121. When the first ear hook housing 121 is matched and connected to the second ear hook housing 123, the ear hook housing may be formed and the accommodating spaces 120 may be formed inside the ear hook housing. In the present embodiment, the accommodating space 120 of one of the ear hook assemblies 12 may be configured to accommodate the battery assembly 14, such as the ear hook assembly 12 shown in FIG. 10. The accommodating space 120 of the other ear hook assembly 12 may be configured to accommodate the control circuit assembly 15, such as the ear hook assembly 12 shown in FIG. 11. In some embodiments, the accommodating space 120 of the ear hook assembly 12 may accommodate the control circuit assembly 15 and the battery assembly 14 at the same time.

In some embodiments, the ear hook assembly 122 may include the ear hook assembly 122. One end of the ear hook assembly 122 may be connected to the first ear hook housing 121. The other end of the ear hook assembly 122 may be connected to the loudspeaker assembly 11. For example, in the embodiment shown in FIG. 10, the other end of the ear hook connection assembly 122 may be inserted into the second through-hole 1111 of the first loudspeaker housing 111 to be matched to and plugged in the loudspeaker assembly 11.

In some embodiments, the other end of the ear hook assembly 122 may be connected to the loudspeaker assembly 11 in other ways. For example, the ear hook connection assembly 122 may further include an ear hook matching connection member. The ear hook matching connection member may be connected to the second through-hole 1111 and the other end of the ear hook connection assembly 122. The exemplary ear hook matching connection member may be a matching connection tube. The other end of the ear hook connection assembly 122 and the second through-hole 1111 may be connected to two ends of the matching connection tube, respectively, to realize the connection between the ear hook connection assembly 122 and the second through-hole 1111.

As shown in FIG. 10, in some embodiments, the battery assembly 14 may include a battery housing and a battery chip arranged in the battery housing (not shown in the figure). The battery chip may be configured to store power. The first NFC module 102 mentioned in the headset communication system embodiments in one or more embodiments may be attached to the battery assembly 14. For example, the first NFC module may be attached to the battery housing so that the volume of the acoustic input and output apparatus 10 may be reduced, and the electromagnetic interference or signal interference between the first NFC module 102 and the control circuit assembly 15 may also be reduced.

As shown in FIG. 11, in some embodiments, the control circuit assembly 15 may include a circuit board 151, a power supply interface 152, a button 153, antenna 154, or the like. As shown in FIG. 2, in some embodiments, the first Bluetooth module 101 may be integrated into the control circuit assembly 15. The control circuit assembly 15 may also integrate other circuits and elements. For example, the first Bluetooth module 101 may be integrated on the circuit board 151. For example, the sensor assembly 17 may also be integrated on the circuit board 151.

As shown in FIG. 11, taking the sensor assembly 17 including an optical sensor as an example, in the present disclosure, the first ear hook housing 121 may form a window 1200 for transmitting optical signals of the optical sensor. The window 1200 may be arranged close to the ear hook connection assembly 122, for example, as shown in FIG. 11, the window 1200 may be arranged near the connection between the first ear hook housing 121 and the ear hook connection assembly 122, so that when the acoustic input and output apparatus 10 is worn, the window 1200 may attach and close to the position near the root of the user's ear. In some embodiments, the shape of the window 1200 may be circular, elliptical, rectangular, rectangular-like (e.g., four corners of a rectangle are rounded), polygon, or the like. In some embodiments, the shape of the window 1200 may be rectangular-like. For example, as shown in FIG. 11, in some embodiments, the window 1200 may be set up in a shape of a racetrack. In some embodiments, an extension line of a central axis of the ear hook connection assembly 122 and a long axis of the window 1200 may intersect with each other, such as the rough intersecting relationships shown in FIG. 11. The extension line of the central axis of the ear hook connection assembly 122 and the long axis of the window 1200 intersecting with each other may make the window 1200 attach and close to the position near the root of the user's ear effectively. Therefore, the sensitivity and the validity of detection of the sensor assembly 17 may be guaranteed. In some embodiments, the first ear hook housing 121 of the ear hook assembly 12 configured to accommodate the control circuit assembly 15 may form the window 1200 mentioned above.

In some embodiments, the first ear hook housing 121 may need to be matched and connected to the second ear hook housing 123 to form a complete ear hook housing. In some embodiments, the first ear hook housing 121 may be connected to the second ear hook housing 123 directly, for example, by a bonding connection, a welding connection, a riveting connection, or the like. In some embodiments, the first ear hook housing 121 may be connected to the second ear hook housing 123 via a mechanical structure, such as a snap structure, a pin structure, or the like.

In some application scenarios, the development trend of the acoustic input and output apparatus 10 may be lightness and miniaturization, while the ear hook assembly 12 configured to accommodate the battery assembly 14, the control circuit assembly 15, related wiring, or the like, may be the part with a larger volume of the acoustic input and output apparatus 10. At the same time, the associated buckle position and the design of the buckle of the ear hook assembly 12 may affect the volume of the entire ear hook assembly 12. In order to reduce the volume of the ear hook assembly 12, in some embodiments, the ear hook assembly 12 may include a splicing assembly configured to restrict the movement of the first ear hook housing 121 and the second ear hook housing 123 in a splicing direction and a thickness direction. The splicing assembly disclosed in the embodiment may reduce the volume of the ear hook assembly 12 while ensuring the connection strength between the first ear hook housing 121 and the second ear hook housing 123. The following is the housing structure and the splicing assembly of the ear hook assembly 12 disclosed in the embodiment.

In some embodiments, the splicing assembly may include a first splice member and a second splicing member matched to the first splicing member. The first splicing member and the second splicing member may be arranged on the first ear hook housing 121 and the second ear hook housing 123, respectively. When the first splicing member is matched and connected to the second splicing member, the first ear hook housing 121 and the second ear hook housing 123 may be relatively fixed in the splicing direction and the thickness direction. In some embodiments, the first splicing member may include a first slot 1211 and a second slot 1212 arranged along a length direction of the first ear hook housing 121 with the same opening direction. The second splicing member may include a first block 1231 and a second block 1231 protruding along a length direction of the second ear hook housing with the same extending direction, so that the first block 1231 and the second block 1232 may be inserted into the first slot 1211 and the second slot 1212, respectively, along the same direction.

Specifically, the first ear hook housing 121 may be configured with the first slot 1211 and the second slot 1212 arranged at an interval. The second ear hook housing 123 may be configured with the first block 1231 and the second block 1232 at an interval. The first slot 1211 may be matched and stuck connected to the first block 1231, and the second slot 1212 may be matched and stuck connected to the second block 1232. Therefore, the first ear hook housing 121 may be matched and stuck connected to the second ear hook housing.

Figure 12:
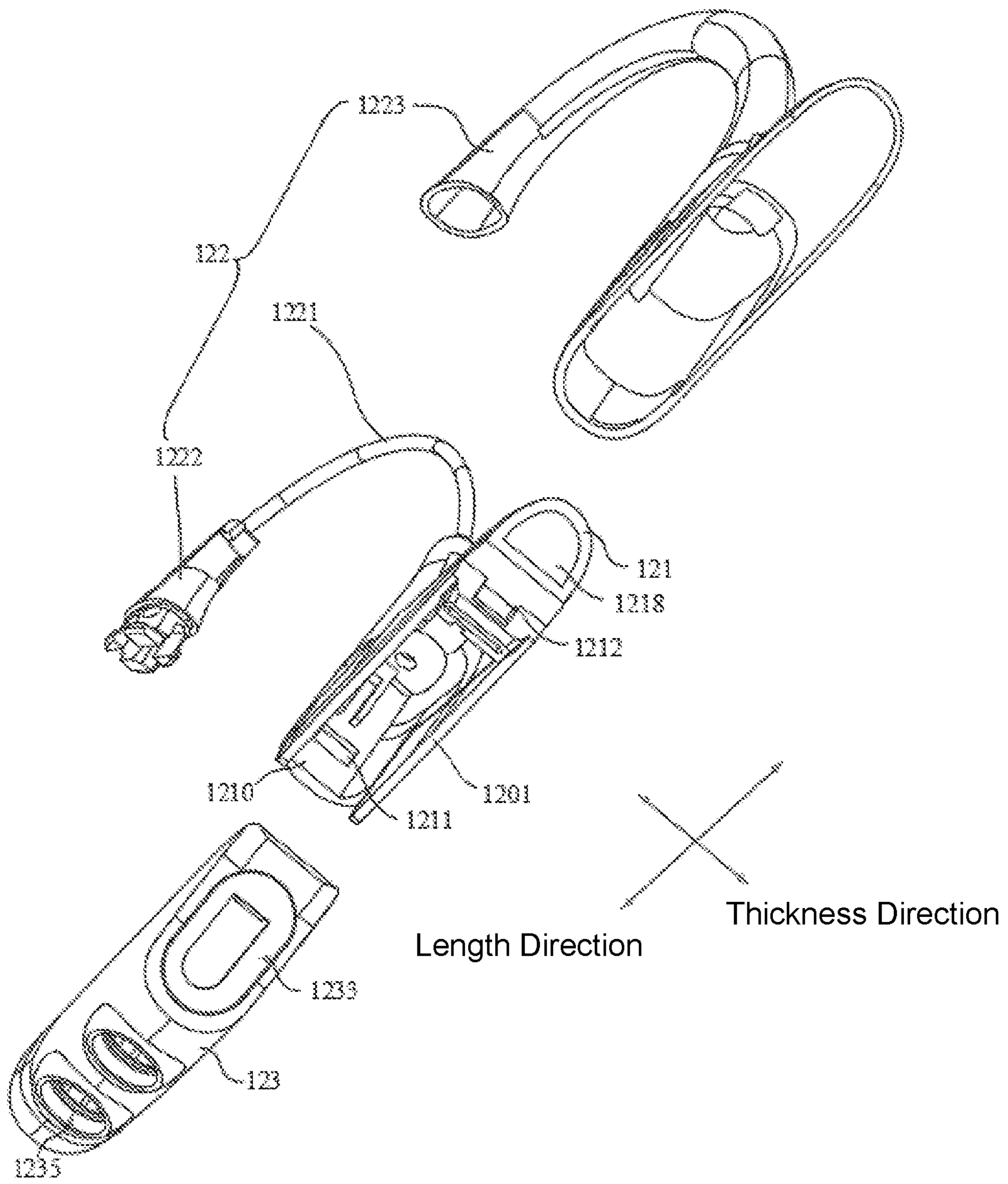
FIG. 12 is a structural diagram illustrating a first ear hook housing and a second ear hook housing of an acoustic input and output apparatus according to some embodiments of the present disclosure.
Figure 13:
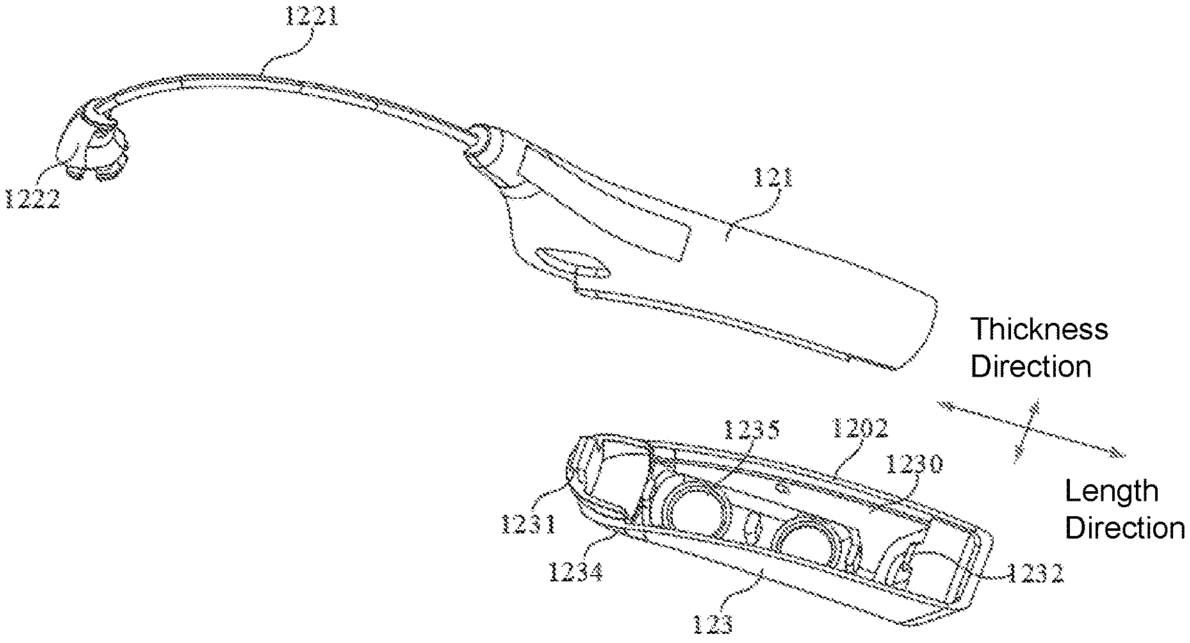
FIG. 13 is another structural diagram illustrating a first ear hook housing and a second ear hook housing of an acoustic input and output apparatus according to some embodiments of the present disclosure.
Figure 14:
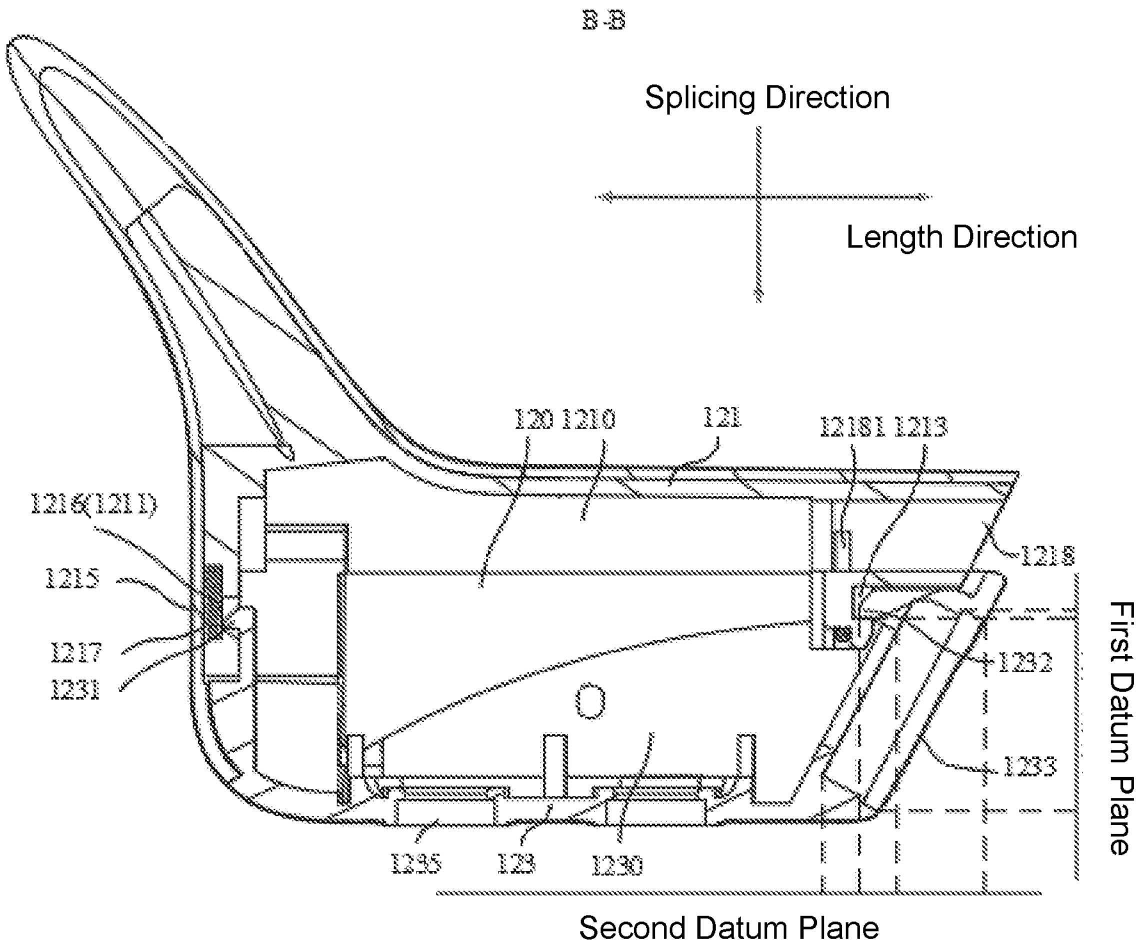
FIG. 14 is a sectional view of B-B as a section line in FIG. 3.

For the convenience of the description of the splicing assembly and the splicing details between the first ear hook housing 121 and the second ear hook housing 123, in some embodiments, an accommodating space 120 may have a length direction perpendicular to a thickness direction. In the present disclosure, if there is no particular indication, the length direction may refer to the length direction of the accommodating space 120 (as shown in FIG. 13), the thickness direction may refer to the thickness direction of the accommodation space 120 (as shown in FIG. 13), and the splicing direction may refer to the moving direction when the first ear hook housing 121 and the second ear hook housing 123 are spliced, as shown in FIG. 14. As shown in FIG. 12 and FIG. 13, in some embodiments, the first ear hook housing 121 and the second ear hook housing 123 may be spliced along a splicing direction perpendicular to the length direction and the thickness direction to form the accommodating space 120. For example, the first ear hook housing 121 may include a first sub-accommodating space 1210, and the second ear hook housing 123 may include a second sub-accommodating space 1230. After the first ear hook housing 121 and the second ear hook housing are spliced, the first sub-accommodating space 1210 and the second sub-accommodating space 1230 may be combined to form the accommodating space 120.

In some embodiments, the first ear hook housing 121 may be configured with the first slot 1211 and the second slot 1212 arranged at an interval along the length direction with the same or similar opening directions. For example, the openings of the first slot 1211 and the second slot 1212 may face the same direction. The second ear hook housing 123 may be configured with the first block 1231 and the second block 1232 protruding along the length direction with the same or similar extending direction. For example, the first block 1231 and the second block 1232 may be spaced apart in the length direction, and the protruding direction of the first block 1231 and the second block 1232 may be the same, thereby facing the same direction. When the first ear hook housing 121 and the second ear hook housing 123 are spliced, the first block 1231 and the second block 1232 may be inserted into the first slot 1211 and the second slot 1212, respectively, in the same direction. As shown in FIG. 14, the first block 1231 may be inserted into the first slot 1211, and the second block 1232 may be inserted into the second slot 1212 to restrict the relative movement of the first ear hook housing 121 and the second ear hook housing 123 along the splicing direction and the thickness direction.

In some embodiments, a first splicing edge 1201 of the first ear hook housing 121 and a second splicing edge 1202 of the second ear hook housing 123 may be matched to each other to restrict the relative movement of the first ear hook housing 121 and the second ear hook housing 123 along the length direction. The first splicing edge 1201 of the first ear hook housing 121 may refer to an edge of the first ear hook housing 121 toward one side of the second ear hook housing 123 splicing with the second ear hook housing 123, such as the first splicing edge 1201 shown in FIG. 12. The second splicing edge 1202 of the second ear hook housing 123 may refer to an edge of the second ear hook housing 123 toward one side of the first ear hook housing 121 splicing with the first ear hook housing 121, such as the second splicing edge 1202 shown in FIG. 13. The first ear hook housing 121 and the second ear hook housing 123 matching to each other may refer to shapes of the first splicing edge 1201 of the first ear hook housing 121 and the second splicing edge 1202 of the second ear hook housing 123 may be matched to each other, which may fit together or complement each other, thereby forming a stable matching structure and restricting the relative movement along the length direction. In the embodiment, the first ear hook housing 121 and the second ear hook housing 123 being spliced may refer to the first splicing edge 1201 of the first ear hook housing 121 may be substantially in contact with and connected to the second splicing edge 1202 of the second ear hook housing 123.

In some embodiments, the extending directions of the first block 1231 and the second block 1232 may be opposite. That is, the first block 1231 and the second block 1232 may protrude toward different directions, respectively. For example, the first block 1231 may extend to the left along the length direction, and the second block 1232 may extend to the right along the length direction. Correspondingly, the opening directions of the first slot 1211 and the second slot 1212 may also be opposite. However, when the extending directions of the first block 1231 and the second block 1232 are opposite, the first block 1231 and the second block 1232 may protrude in opposite directions, which inevitably causes the additional space occupied by the first block 1231 and the second block 1232 to increase. Specifically, in order to ensure that the first block 1231 and the second block 1232 are inserted into the first slot 1211 and the second slot 1212, it may also be necessary to increase the distance in the length direction to cover the first block 1231 and the second block 1232, That is, the size of the ear hook housing may be increased. In the embodiment, the first slot 1211 and the second slot 1212 with the same or similar opening directions, and the first block 1231 and the second block 1232 with the same or similar extending directions may cause the matching directions of the first block 1231 and the second block 1232, and the first slot 1211 and the second slot 1212 to be the same. Further, since the extending directions of the first block 1231 and the second block 1232 are the same or similar, the additional volumes occupied by the first block 1231 and the second block 1232 may be reduced, and the volume occupied by the matching between the first block 1231 and the second block 1232, and the first slot 1211 and the second slot 1212 may also be reduced, thereby effectively reducing the volume of the ear hook assembly 12. In addition, since the first splicing edge 1201 of the first ear hook housing 121 is matched to the second splicing edge 1202 of the second ear hook housing 123, there may be no need to arrange additional buckles, protrusions, or the like, thereby causing the ear hook assembly 12 to be more compact and reducing the volume of the ear hook assembly 12. At the same time, the matching of the first block 1231 and the second block 1232, and the first slot 1211 and the second slot 1212 may restrict the movement of the first ear hook housing 121 and the second ear hook housing 123 in the splicing direction and the thickness direction. The displacement along the length direction may be restricted through the matching between the first splicing edge 1201 and the second splicing edge 1202, so that the splicing of the first ear hook housing 121 and the second ear hook housing 123 may be more stable, and the structure may be more reliable.

As shown in FIG. 12, in some embodiments, the first slot 1211 and the second slot 1212 may be arranged on two sides of the first ear hook housing 121 along the length direction, respectively. The opening direction of the first slot 1211 may face the accommodating space 120, and the opening direction of the second slot 1212 may be deviate from the accommodating space 120. That is, the opening direction of the first slot 1211 may face the first sub-accommodating space 1210, and the opening direction of the second slot 1212 may deviate from the first sub-accommodating space 1210. In some embodiments, the first slot 1211 may be arranged on one side of the first ear hook housing 121 near the ear hook connection assembly 122, and the second slot 1212 may be arranged on one side of the first ear hook housing 121 away from the ear hook connection assembly 122.

As shown in FIG. 13, in some embodiments, the first block 1231 and the second block 1232 may be arranged on two sides of the second ear hook housing 123 along the length direction, the extending direction of the first block 1231 may deviate from the accommodating space 120, and the extending direction of the second block 1232 may face the accommodating space 120. That is, the extending direction of the first block 1231 may deviate from the second sub-accommodating space 1230, and the extending direction of the second block 1232 may face the second sub-accommodating space 1230. Accordingly, the first block 1231 may be arranged on one side of the second ear hook housing 123 near the ear hook connection assembly 122, and the second block 1232 may be arranged on one side of the second ear hook housing 123 away from the ear hook connection assembly 122. Since the second block 1232 protrudes and extends to the inside of the accommodating space 120, compared with protruding and extending to the outside of the accommodating space 120, it may not be necessary to occupy an additional space, and corresponding space may be saved. The second slot 1212 may be arranged on the front of the extending direction of the second block 1232 when the second block is matched to the second slot 1212. The second block 1232 matched and inserted into the second slot 1212 may reduce the volume of the ear hook assembly 12.

It should be noted that the arranged positions of the slot 1211, the second slot 1212, the first block 1231, and the second block 1232, and the specific arranged form may not be specifically limited in the present disclosure. For example, the extending directions of the first block 1231 and the second block 1232 may extend to the right along the length direction, correspondingly, and buckle-directions of the first slot 1211 and the second slot 1212 may correspond to the directions mentioned above. Such deformations may be all within the scope of the present disclosure.

In some embodiments, when the first block 1231 and the second block 1232 are matched and connected to the first slot 1211 and the second slot 1212, respectively, since the extending directions of the first block 1231 and the second block 1232 are the same or similar, for one of the ear hook housings (e.g., the second ear hook housing 123), only the movement along the extending directions of the first block 1231 and the second block 1232 may be restricted. For example, in the embodiments shown in FIG. 14, the first block 1231 and the second block 1232 may extend to the left along the length direction. When the first ear hook housing 121 is matched and connected to the second ear hook housing 123, the second ear hook housing 123 may not move to the left along the length direction relative to the first ear hook housing 121. However, the second ear hook housing 123 may move to the right along the length direction. Therefore, the relative movement of the first ear hook housing 121 and the second ear hook housing 123 may not be fully restricted based on the matching between the block and the slot.

In some embodiments, the first splicing member may further include a first blocking part 1213 arranged at the first splicing edge 1201 of the first ear hook housing 121. The second splicing member may further include a second blocking part 1234 arranged at the second splicing edge 1202 of the second ear hook housing 123. The first blocking part 1213 may be matched to the second blocking part 1234 to restrict the relative movement of the first ear hook housing 121 and the second ear hook housing 123 along the length direction. The first blocking part 1213 and the second blocking part 1234 matched to each other may refer to the shape of the first blocking part 1213 and the shape of the second blocking part 1234 matched to each other. The first blocking part 1213 and the second blocking part 1234 may be matched to or complement each other, thereby forming a stable matching structure to restrict the relative movement of the first ear hook housing 121 and the second ear hook housing 123 in the length direction. For example, the first blocking part 1213 may be an opening formed on the first splicing edge 1201 of the first ear hook housing 121, and the second blocking part 1234 may be a convex part formed on the second splicing edge 1202 of the second ear hook housing 123. The shape of the opening part and the shape of the convex part may be matched to each other, so that the first splicing edge 1201 of the first ear hook housing 121 and the second splicing edge 1202 of the second ear hook housing 123 may be complementary to restrict the relative movement in the length direction. In some embodiments, the opening part may be a notch, and the convex part may be a protrusion matched to the notch. The convex part may be matched to the notch to restrict the relative movement of the first ear hook housing 121 and the second ear hook housing 123 in the length direction.

It should be noted that the present disclosure may not specifically limit the specific structure and the position of the first blocking part 1213 and the second blocking part 1234. For the convenience of description, one or more embodiments of the present disclosure may not be limited to the scope of the embodiments mention above. It may be appreciated that for those skilled in the art, after understanding the principles of the first blocking part 1213 and the second blocking part 1234, improvements may be made be without departing from the principles. For example, the first blocking part 1213 may be the convex part formed on the first splicing edge 1201 of the first ear hook housing 121, and the second blocking part 1234 may be the opening part formed on the second splicing edge 1202 of the second ear hook housing 123.

In the one or more embodiments of the present disclosure, the opening direction of the first slot 1211 may face the accommodating space 120. If the first slot 1211 is formed directly in the first sub-accommodation space 1210, a pattern drawing direction forming the first sub-accommodation space 1210 and a pattern drawing direction forming the first slot 1211 may interfere with each other during the process of using corresponding molds to form the first sub-accommodation space 1210 and the first slot 1211. Since the pattern drawing direction of the first slot 1211 is in the first sub-accommodating space 1210, which may also conflict with the pattern drawing directions of other structures, it may bring great difficulties to the production. Therefore, the embodiment designs the following structure to reduce production and manufacturing difficulty.

Figure 15:
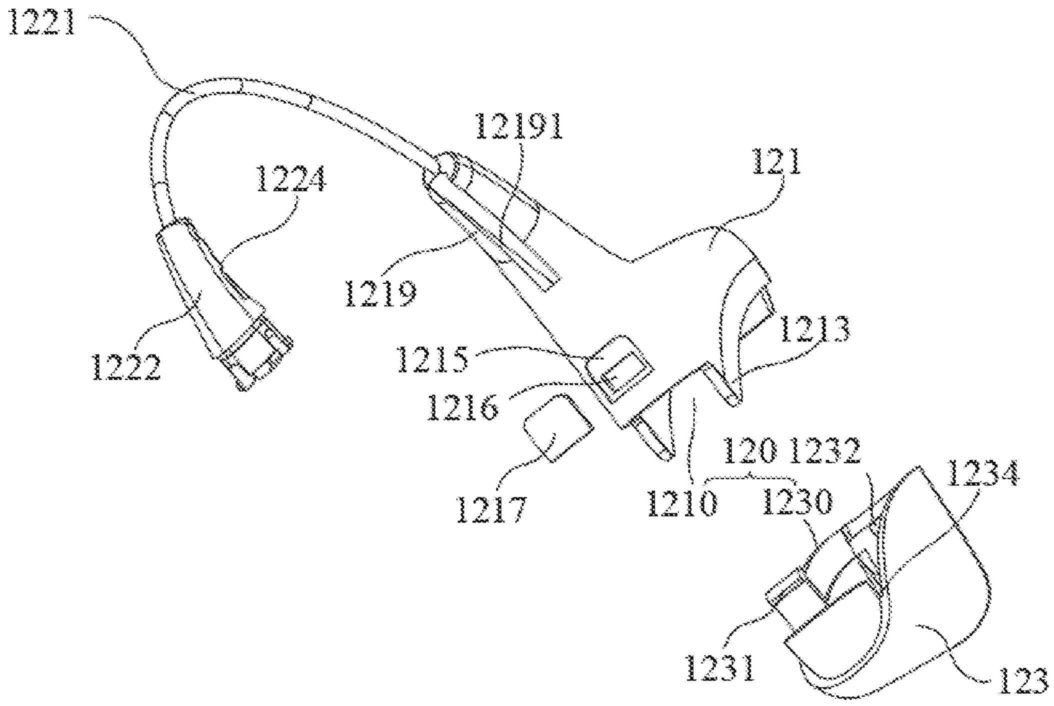
FIG. 15 is another structural diagram illustrating a first ear hook housing and a second ear hook housing of an acoustic input and output apparatus according to some embodiments of the present disclosure.

As shown in FIG. 15, in some embodiments, the first ear hook housing 121 may be configured with an outer side hole segment 1215 and an inner side hole segment 1216 communicating with each other in a direction from the outside of the accommodating space 120 to the inside of the accommodating space 120. That is, the opening direction of the outer side hole segment 1215 may be away from the accommodating space 120, and the opening direction of the inner side hole segment 1216 may face the accommodating space 120. The outer side hole segment 1215 may communicate with the inner side hole segment 1216. In some embodiments, the opening shapes of the inner side hole segment 1216 and the outer side hole segment 1215 may include a rectangle, a triangle, a circular shape, or the like, which is not specifically defined in the present disclosure.

In some embodiments, the outer side hole segment 1215 may be filled with a filling member 1217. The filling member 1217 may include, but may not be limited to, a plastic member, a metal member, a rubber member, or the like. For example, the filling member may be a hard glue. When the outer side hole segment 1215 is filled and blocked, the inner side hole segment 1216 may be configured as the first slot 1211, and the opening direction of the inner side hole segment 1216 may face the accommodating space 120 to be matched to the first block 1231.

During the actual manufacturing process, the outer side hole segment 1215 and the inner side hole segment 1216 may be formed in turn from the outside of the first ear hook housing 121 to the inside of the first ear hook housing 121. Since the pattern drawing direction of the outer side hole segment 1215 and the inner side hole segment 1216 may not need to be performed in the first sub-accommodating space 1210 but performed outside of the first ear hook housing 121, and the outer side hole segment 1215 may be filled with the filling member 1217 to allow the remaining inner side hole segment 1216 to be used as the first slot 1211, the complexity and difficulty of manufacturing may be reduced effectively, and the cost may be saved.

In some embodiments, the cross-sectional area of the outer side hole segment 1215 perpendicular to the connection direction of the inner side hole segment 1215 and the inner side hole segment 1216 may be larger than the cross-sectional area of the inner side hole segment 1216 perpendicular to the connection direction of the outer side hole segment 1215 and the inner side hole segment 1216. Since the cross-sectional area corresponding to the outer side hole segment 1215 is greater than the corresponding cross-sectional area of the inner side hole segment 1216, it may be convenient to fill the filling member 1217 in the outer side hole segment 1215, thereby having a better blocking effect and forming the first slot 1211 quickly.

An exemplary description of the manufacturing method of the ear hook assembly 12 of the present embodiment is as follows:

Step S100: the first ear hook housing 121 and the second ear hook housing 123 may be formed through an injection molding, and the outer side hole segment 1215 and the inner side hole segment 1216 communicating with each other may be formed in the first ear hook housing 121 from the outside of the first ear hook housing 121 to the inside of the first ear hook housing 121; the first block 1231 may be formed on the second ear hook housing 123.

Step S200: the outer side hole segment 1215 may be filled with the filling member 1217 and the inner side hole segment 1216 may be used as the first slot 1211.

Alternatively, the outer side hole segment 1215 may be filled with the filling member 1217 through injection molding.

In some embodiments, in order to protect the first ear hook housing 121, the first ear hook housing 121 may be covered by the ear hook elastic cover layer 1223 after S200, details are as follows:

Step S210: the periphery of the first ear hook housing 121 may be covered by the ear hook elastic cover layer 1223 through injection molding, and the outer side hole segment 1215 may also be covered.

The ear hook elastic cover layer 1223 may refer to a part of the ear hook assembly 12 contacting the user. The surface of the ear hook assembly 12 configured with the ear hook elastic cover layer 1223 may improve the comfort when the user wears the bone conduction headset, and improve the user experiences. More details regarding the ear hook elastic cover layer 1223 may refer to the description of other embodiments of the present disclosure, which may not be described herein.

Step S300: the first slot 1211 may be matched to and plugged in the first block 1231 to splice the first ear hook housing 121 and the second ear hook housing 123.

Other structures of the ear hook assembly 12 may be manufactured by the existing molding method based on the specific structure of the ear hook assembly 12 mentioned above, which may not be described herein.

In some embodiments, the accommodating space 120 of the ear hook assembly 12 may accommodate other components of the bone conduction headset, for example, the battery assembly 14, the control circuit assembly 15, or the like. In order to facilitate the user to control the bone conduction headset, a button structure associated with the components may also be arranged on the ear hook housing. For example, the ear hook housing may be configured with a power plug-in hole 1233 that is electrically connected to the battery assembly 14, and the user may charge the battery assembly 14 via the power plug-in hole 1233. As another example, a buttonhole 1235 arranged on the ear hook housing may be electrically connected to the control circuit assembly 15, and a control button arranged in the buttonhole 1235 may be electrically connected to the control circuit assembly 15, for example, a volume button, a pause/start button. The user may control the bone conduction headset via the control button.

In order to better reduce the volume of the ear hook assembly 12, the positions of the components in the accommodating space 120 may be designed so that the accommodating space 120 may be effectively compressed, and the volume of the ear hook housing may be reduced.

In some embodiments, if the power plug-in hole 1233, or the like, of the acoustic input and output apparatus 10 may be arranged on one side of the second ear hook housing 123 away from the bottom wall 1112 of the first ear hook housing 121, the volume of the ear hook assembly 12 may be increased. In order to effectively reduce the volume of the ear hook assembly 12, the position of the power plug-in hole 1233 may be adjusted in one or more embodiments of the present disclosure, details are as follows:

As shown in FIG. 12 to FIG. 14, in some embodiments, the ear hook housing may include a housing panel contacting the user, a housing backplane deviate from the user, and a plurality of side panels connecting the housing panel and the housing back panel. The buttonhole 1235 and the power plug-in pole 1233 may be arranged on different housing side panels of the plurality of housing side panels, respectively.

In some embodiments, the ear hook housing may have different shapes, for example, the ear hook housing may be a spheroid, an elliptical sphere, a rectangular cuboid (e.g., 8 corners of the rectangular square are rounded corners), a prismatic body, or the like. In some embodiments, when the first ear hook housing 121 and the second ear hook housing 123 are spliced, the shape as shown in FIG. 14 may be formed.

In some embodiments, part of the housing (e.g., the housing side panel below the splicing direction in FIG. 14) of the second ear hook housing 123 far from the ear hook connection assembly 122 may be configured with the power plug-in hole 1233. The power plug-in hole 1233 may communicate with the accommodating space 120, and the power plug-in hole 1233 may be configured to accommodate the power supply interface 152. The battery module 14 may be charged via the power interface. In some embodiments, the second ear hook housing 123 may include a housing bottom part and a housing side part, and the housing side part may surround and connect the housing bottom part to form a second sub-accommodating space 1230. The housing bottom part may refer to the housing side panels below the splicing direction in FIG. 14. The housing side part may be a part of the housing side panels (e.g., a part of the housing panels in the splicing direction) of the ear hook housing. A side edge of the housing side part away from the housing bottom part may be the second splicing edge 1202 spliced with the first ear hook housing 121.

In some embodiments, the buttonhole 1235 and the power plug-in hole 1233 may be arranged on different housing side panels. The different housing side panels described herein may be understood as the housing side panels in different directions. For example, in the embodiment shown in FIG. 14, the buttonhole 1235 and the power plug-in hole 1233 may be arranged on the housing side panels (e.g., the housing bottom part) below the splicing direction and the housing side panels (e.g., the housing side part) with the length directions turning to the right, respectively.

In some embodiments, the power plug-in hole 1233 may be arranged on the housing side part, communicating with the second sub-accommodating space 1230, that is, communicating with the accommodating space 120.

As shown in FIG. 14, in some embodiments, the second block 1232 may be arranged close to the power plug-in hole 1233. That is, the second block 1232 may be arranged protruding from the part of the housing of the second ear hook housing 123 away from the ear hook connection assembly 122, and extend toward the inside of the accommodating space 120. In the present embodiment, the second block 1232 may be closer to the accommodating space 120 compared with the power plug-in hole 1233, that is, the second block 1232 may be closer to the ear hook connection assembly 122 compared with the power plug-in hole 1233.

In some embodiments, the projections of the second block 1232 and the power plug-in hole 1233 on a first reference plane perpendicular to the length direction may overlap each other. In the present embodiment, overlapping each other may include partial overlap (e.g., the overlapping part is a part of the projection of the second block 1232, that is, a part of the projection of the power plug-in hole 1233), and also may include overall overlap (e.g., the projection of the second block 123 completely falls into the projection of the power plug-in hole 1233). In the present embodiment, taking the plane perpendicular to the length direction as the first reference plane, the projection of the second block 1232 on the first reference plane may be located in the projection of the power plug-in plane 1233 on the first reference plane, that is, ranges of two projections may overall overlap each other. The positions of the second block 1232 and the power plug-in hole 1233 may make the structure of the second ear hook housing 123 to be compact, and the volume of the ear hook housing assembly 12 may be reduced without affecting the installation of the power supply interface 152.

In some embodiments, the projections of the second block 1232 and the power plug-in hole 1233 on a second reference plane perpendicular to the splicing direction may overlap each other. Overlapping each other described herein may also include partial overlap and overall overlap. In the present embodiment, taking the plane perpendicular to the splicing direction as the second reference plane, the projection of the second block 1232 on the second reference plane may also be located in the projection of the power plug-in hole 1233 on the second reference plane, that is, ranges of two projections may also overlap. The arrangement of the structures of the second block 1232 and the power plug-in hole 1233 may be compact compare no matter in the splicing direction or the length direction. The space occupied by the power plug-in hole 1233 and the second block 1232 may be saved to improve the compact of the structure of the ear hook assembly 12.

It should be noted that the present application may not specifically limit the positions of the power plug-in hole 1233 and the buttonhole 1235. For example, in addition to the arrangement positions described in the embodiments mentioned above, the power plug-in hole 1233 may be arranged on the housing side panels of the ear hook housing above the splicing direction, and the buttonhole 1235 may be arranged on the housing side panels below the splicing direction. As another example, the power plug-in hole 1233 may be arranged on the housing side panels of the ear hook housing below the splicing direction, and the buttonhole 1235 may be arranged on the housing side panels on the left side of the length direction.

In some embodiments, in addition to the housing side panels, the buttonhole 1235 or the power plug-in hole 1233 may also be arranged on the housing back panel. For example, the buttonhole 1235 and the power plug-in hole 1233 may be arranged on the housing side panels and the housing back panel, respectively. Specifically, the buttonhole 1235 may be arranged on the housing side panels below the splicing direction, and the power plug-in hole 1233 may be arranged on the housing back panel.

The acoustic input and output apparatus 10 may be used in the producing and manufacturing field or the like, and there may be great requirements for the control experience of the acoustic input and output apparatus 10. The power plug-in hole 1233 and the buttonhole 1235 arranged at different positions may improve the control experience of the acoustic input and output apparatus 10, and the reasons may be as follows.

In some embodiments, the acoustic input and output apparatus 10 generally may have a volume button 153, or the like. The buttonhole 1235 or the like, and the power plug-in hole 1233 corresponding to the button 153 may be generally arranged on the bottom part of the second ear hook housing 123, that is, the second ear hook housing 123 may be away from a part of the housing of the first ear hook housing 121. Since the area of the bottom part of the housing is relatively limited, the buttonhole 1235 and the power plug-in hole 1233 may be compact. The buttonhole 1235 and the power plug-in hole 1233 may occupy as little space as possible. In some application scenarios, a wearer may wear workmanship, gloves, or the like. The buttonhole 1235 may be smaller, and the arrangement may be too compact, which may cause the wearer's control experience to decline and may easily cause mishandling. The power plug-in hole 1233 may not be arranged on the bottom part of the housing in the embodiment, and the power plug-in hole 1233 may be arranged on the side part of the housing, so that the buttonhole 1235 may be designed larger, and the arrangement may be more loosely, which may be convenient for the user to operate and reduce the occurrence of the mishandling.

Figure 18:
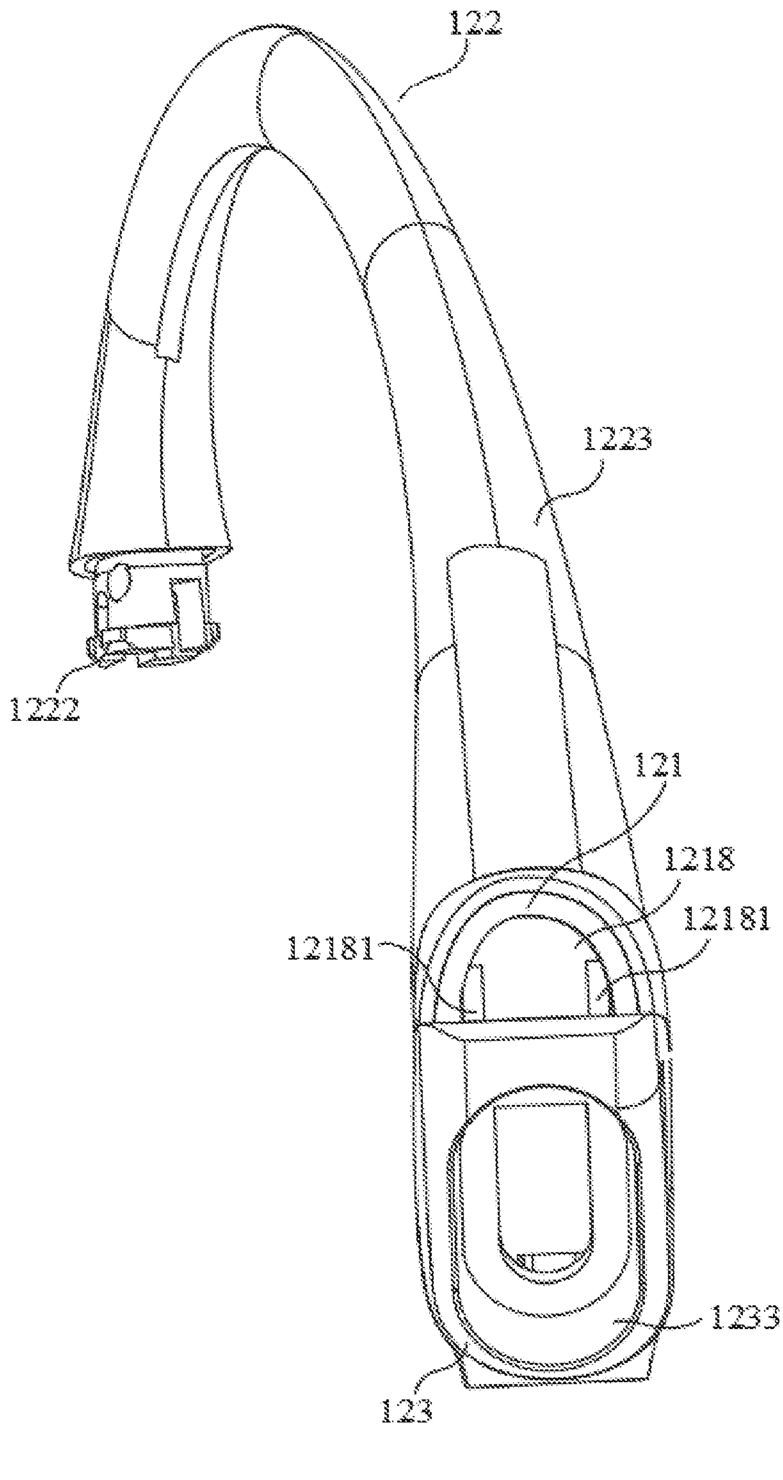
FIG. 18 is a structural diagram illustrating an ear hook assembly of an acoustic input and output apparatus according to some embodiments of the present disclosure.

In some embodiments, if the second block 1232 is arranged close to the power plug-in hole 1233 on the second ear hook housing 123 and faces the top position of the first ear hook housing 121 (such as a table area connecting the second block 1232, that is, the second block 1232 may be regarded as formed by extending upward from the table area to the splicing direction), the space of a plug-in hole 1218 (as shown in FIG. 18) of the first ear hook housing 121 may be squeezed, which in turn may affect the ear hook assembly 12 being matched to and plugged in other assemblies (the rear hook 13) of the bone conduction headset. The second block 1232 may need to occupy an additional space so that the first ear hook housing 121 and the second ear hook housing 123 may occupy a large space in the splicing direction, which may not be compact enough. Therefore, in one or more embodiments of the present disclosure, the second block 1232 and the power plug-in hole 1233 may be arranged on the bottom part of the housing of the second ear hook housing 123, and the structure between the second block 1232 and the power plug-in hole 1233 may be arranged based on the projection relationship mentioned above so that the structure of the second ear hook housing 123 may be more compact in the splicing direction. The second block 1232 may extend toward the inside of the accommodating space 120, and the size of the ear hook housing 12 may be miniaturized without occupying additional spaces.

In order to reduce the failure rate of the acoustic input and output apparatus 10, it may be not only necessary to ensure the stability of the structure, but also need to ensure the stability of the electrical connection. The wiring group (e.g., the wiring group of the sound-pickup assembly 16 and the wiring group of the loudspeaker assembly) may be routed among the sound-pickup assembly 16, the loudspeaker assembly 11, and the ear hook assembly 12, the stability of the route may be related to the reliability of the bone conduction headset. In order to improve the reliability of the route, in some embodiments, the ear hook connection assembly 122 may include the ear hook connection member and a wire stuck part. The ear hook connection member may be configured with a lead channel configured to lead the wiring group from the loudspeaker assembly 11. The wire stuck part may be configured to stuck and stop the wiring group in a radial direction of the wiring group, thereby improving the reliability of the bone conduction headset.

Figure 16:
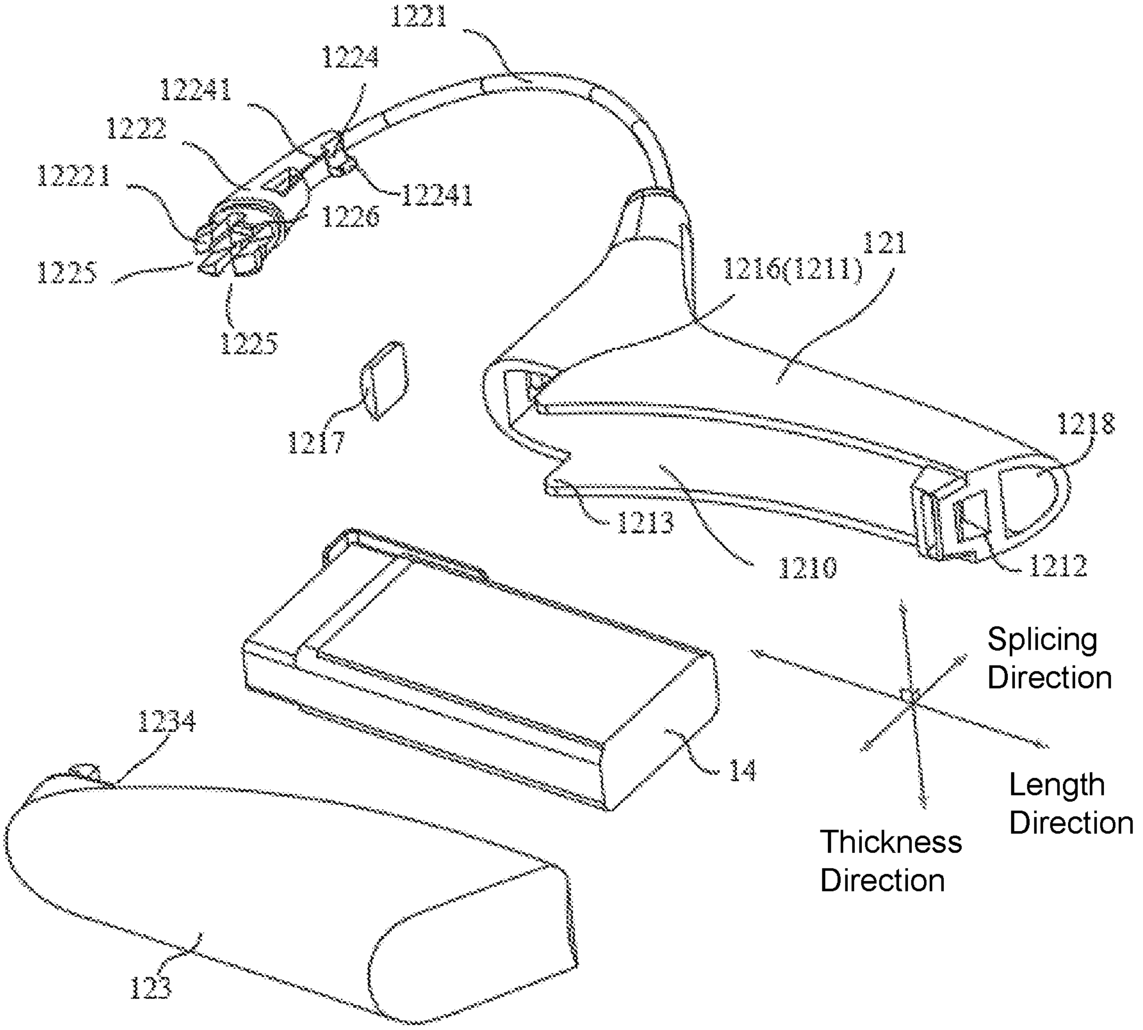
FIG. 16 is another exploded diagram illustrating a structure of an ear hook assembly of an acoustic input and output apparatus according to some embodiments of the present disclosure.

In some embodiments, a joint part 1222 may be arranged at one end of the ear hook connection member away from the ear hook housing. As shown in FIG. 15 and FIG. 16, in some implementations, the wire stuck part may include a first wire stuck part 1224 and a second wire stuck part 1219. The first wire stuck part 1224 may be arranged at the joint part 1222, and the second wire stuck part 1219 may be arranged on the first ear hook housing 121. The wiring group leading from the loudspeaker assembly 11 may enter the accommodating space 120 via the first wire stuck part 1224 and the second wire stuck part 1219 sequentially. The first wire stuck part 1224 and the second wire stuck part 1219 may be configured to stuck and stop the wiring group in the radial direction of the wiring group, so that the shaking of the wiring group in the radial direction may be reduced.

In some embodiments, the wiring group stuck and stopped by the first wire stuck part 1224 and the second wire stuck part 1219 may be an additional member such as an auxiliary titanium wire used during the preparation of the ear hook assembly 12, or the like. Specifically, during the preparation of ear hook assembly 12, the lead channel may be formed in the ear hook elastic cover layer 1223 using the auxiliary titanium wire. Therefore, the auxiliary titanium wire may be led to pass through the first wire stuck part 1224 and the second wire stuck part 1219 sequentially and enter the accommodating space 120. After the preparation is completed, the auxiliary titanium wire may be drawn out to form a lead channel of the containment space 110 and the accommodation space 120. The first wire stuck part 1224 and the second wire stuck part 1219 may keep the stability of the auxiliary titanium wire to reduce the shake of the auxiliary titanium wire, thereby enabling the formation of the lead channel to meet the quality requirements and improving the good product rate.

In some embodiments, the lead channel (not shown in the figure) and the ear hook elastic metal filament may be arranged in parallel in the ear hook elastic cover layer 1223.

In some embodiments, the wiring group stuck and stopped by the first wire stuck part 1224 and the second wire stuck part 1219 may be a wiring group (e.g., wiring group of the sound-pickup assembly) used for electrical connection and led after forming the lead channel. That is, the wiring group led by the loudspeaker assembly 11 may enter the accommodating space 120 via the first wire stuck part 1224 and the second wire stuck part 1219 and be electrically connected to the components (e.g., the battery assembly 14 and the control circuit assembly 15) in the accommodating space 120. It should be understood that the shake of the wiring group may need to be reduced before entering the lead channel and after entering the lead channel so that the lead efficiency may be improved. In addition, since the ear hook assembly 12 is used to hang on a human ear, thus the ear hook assembly 12 may generally be arc-shaped. The wiring group passing through the ear hook assembly 12 may tend to shake, move, or the like, thus the first wire stuck part 1224 and the second wire stuck part 1219 may reduce the shaking of the wiring group.

It should be noted that the wire stuck part may be combined with one or more embodiments mentioned above. For example, if the loudspeaker assembly 11 is also connected with the stick component (e.g., the connection member 181 and the sound-pickup assembly 16), the wiring group led by the loudspeaker assembly 11 may include the wiring group of the loudspeaker 113 and the wiring group of the sound-pickup assembly 16. If the loudspeaker assembly 11 is not connected to the stick assembly, the wiring group led by the loudspeaker assembly 11 may include the wiring group of the loudspeaker 113.

In the embodiment, the first wire stuck part 1224 and the second wire stuck part 1219 may be arranged at the joint part 1222, respectively. On the one hand, the movement of the auxiliary titanium wire relative to the first ear hook housing 121 and the joint part 1222 may be stuck and stopped during the preparation process to improve the good product rate of the ear hook assembly 12, on the other hand, the movement of the wiring group in the radial direction may also be stuck and stopped, thereby reducing the shake generated by the wiring group so that the leading efficiency of the wiring group may be more efficient. The structure of the wiring group in the actual product may be more stable, and the stability of the electrical connection may be guaranteed.

In some embodiments, the first wire stuck part 1224 may have two first sub-wire stuck parts 12241 arranged in the thickness direction. As shown in FIG. 16, the two first sub-wire stuck parts 12241 may be staggered from each other in the length direction of the wiring group. The two first sub-wire stuck parts 12241 may stuck and stop the wiring group in the thickness direction when the wiring group passes between the two first sub-wire stuck parts 12241, which in turn may restrict the movement of the wiring group in the thickness direction.

In some embodiments, the extending lengths of the two first sub-wire stuck parts 12241 may be different in the length direction of the wiring group. For example, the extending length of the first wire stuck part 1224 close to the second wire stuck part 1219 in the length direction of the wiring group may be greater than the extending length of the first wire stuck part 1224 away from the second wire stuck part 1219 in the length direction of the wiring group.

The second wire stuck part 1219 may have two second sub-wire stuck parts 12191 arranged in the thickness direction, and the two second sub-wire stuck parts 12191 may be arranged opposite relatively. The two second sub-wire stuck parts 12191 may stuck and stop the wiring group in the thickness direction when the wiring group passes between the two second sub-wire stuck parts 12191, which in turn may restrict the movement in the thickness direction.

It should be noted that the count of the first sub-wire stuck part 12241 and the count of the second sub-wire stuck part 12191 may not be limited in the present disclosure, for example, the count of the first sub-wire stuck part 12241 and the count of the second sub-wire stuck part 12191 may be one, three, four, or the like.

In some embodiments, the first wire stuck part 1224 may be formed recessed on the joint part 1222, and the second wire stuck part 1219 may be formed recessed on the first ear hook housing 121 so that the wiring group may be seen in the first wire stuck part 1224 and the second wire stuck part 1219, which may reduce the distance when the wiring group is led and passes through an invisible area to improve the leading efficiency. In some embodiments, the first wire stuck part 1224 and the second wire stuck part 1219 may be hollow structures, and the wiring group may pass through the inside of the first wire stuck part 1224 and the second wire stuck part 1219.

In some embodiments, when the ear hook assembly 12 is connected to the loudspeaker assembly 11, the joint part 1222 may need to match the second through-hole 1111. More details regarding the connection between the joint part 1222 and the second through-hole 1111 may be found in the embodiments of the present disclosure.

In some embodiments, in order to facilitate the joint part 1222 to be inserted into the second through-hole 1111 of the first loudspeaker housing 111, and enhance the connection stability between the joint part 1222 and the second through-hole 1111, as shown in FIG. 16, an end part 12221 of the joint part 1222 may form two through-grooves 1225 crossing each other to divide the end part 12221 into four sub-end parts. The end part 12221 may be divided into four sub-end parts by the two through-grooves 1225 crossing each other so that the four sub-end parts may be squeezed and may be elastically recovered. When the joint part 1222 is inserted into the second through-hole 1111, the four sub-end parts may be squeezed and close to each other, so that the sub-end parts may be smaller, and the joint part 1222 may be easy to be inserted into the second through-hole 1111. It should be noted that the count of the sub-end parts may not be limited in the present disclosure, and the count of the sub-end parts may be two, three, five, or the like.

In some embodiments, a protrusion 1226 may be arranged protruding from the periphery of the sub-end parts. The joint part 1222 may be inserted into the loudspeaker assembly 11 and the protrusion 1226 may be stuck and stopped by the loudspeaker assembly 11 to restrict the movement of the joint part 1222 from moving away from the loudspeaker assembly 11. Specifically, after the joint part 1222 is inserted into the second through-hole 1111, the four sub-end parts may be elastically recovered, which may cause the protrusion 1226 on the periphery of the sub-end parts to be stuck and stopped by the loudspeaker assembly 11. Specifically, the protrusion 1226 may be arranged in the accommodating space 110, and the protrusion 1226 may be stuck and stopped at the edge of the connection between the second through-hole 1111 and the containment space 110. The connection reliability of the ear hook assembly 12 and the loudspeaker assembly 11 may be improved.

In some embodiments, the ear hook connection assembly 122 may further include the ear hook elastic metal filament 1221, and the joint part 1222 may be arranged at one end of the ear hook elastic metal filament 1221.

In some embodiments, the material of the ear hook elastic metal filament 1221 may be spring steel, titanium, or the like, and the material of the ear hook elastic metal filament may be a nickel-titanium alloy.

In order to protect the ear hook elastic metal filament 1221, the ear hook connection assembly 122 may also include the ear hook elastic cover layer 1223 (as shown in FIG. 12) at least covering the periphery of the ear hook elastic metal filament 1221. Certainly, the ear hook housing elastic metal filament 1221 may further cover the first ear hook housing 121. The joint part 1222 may be configured to be matched and connected to the loudspeaker assembly 11. The other end of the ear hook elastic metal filament 1221 may be connected to the first ear hook housing 121.

It should be noted that the ear hook elastic cover layer 1223 and elastic cover layer in one or more embodiments mentioned above may be configured to refer to a part of the bone conduction headset contacting the user. Therefore, the arrangement form of the ear hook elastic cover layer 1223 may be similar to the elastic cover layer 183. In some embodiments, the ear hook elastic cover layer 1223 and the elastic cover layer 183 may be made of the same material. For example, the material of the ear hook elastic cover layer may be silica gel, rubber, plastic, or the like. In some embodiments, the elastic modulus of the ear hook elastic cover layer 1223 may be 0.5 GPa to 2 GPa. In some embodiments, the elastic modulus of the elastic cover layer may be 0.8 GPa to 1.5 GPa. In some embodiments, the elastic modulus of the elastic cover layer may be 1.2 GPa to 1.4 GPa.

In some embodiments, the ear hook elastic cover layer 1223 may only cover the ear hook elastic metal filament 1221. In some embodiments, the ear hook elastic cover layer 1223 may further cover the first ear hook housing 121 and the second ear hook housing 123. In some embodiments, the ear hook elastic cover layer 1223 may cover the second wire stuck part 1219. In some embodiments, it may be possible to make the power plug-in hole 1233, the buttonhole 1235, or the like, to be exposed for the user to operated (e.g., charging by the power plug-in hole 1233). In some embodiments, the ear hook elastic cover layer 1223 may also cover at least a part of the joint part 1222, and may cover the first wire stuck part 1224.

In some embodiments, the acoustic input and output apparatus 10 may further include a rear hook assembly 13 configured to connect the ear hook assembly 12 so that the acoustic input and output apparatus 10 may be in stable contact with the backside of the head of the user. For example, taking the bone conduction headset shown in FIG. 3 as an example, when the user wears the bone conduction headset, the rear hook assembly may be located at the backside of the head of the user. The rear hook assembly may cause the two ear hook assemblies connected to the rear hook assembly to be in stable contact with the user's ears.

In some embodiments, the rear hook assembly 13 may include a rear hook connection member and inserting parts 133 arranged at two ends of the rear hook connection member, and the inserting parts 133 may be configured to facilitate a stable connection between the rear hook connection member 12 and the ear hook assembly 12.

Figure 17:
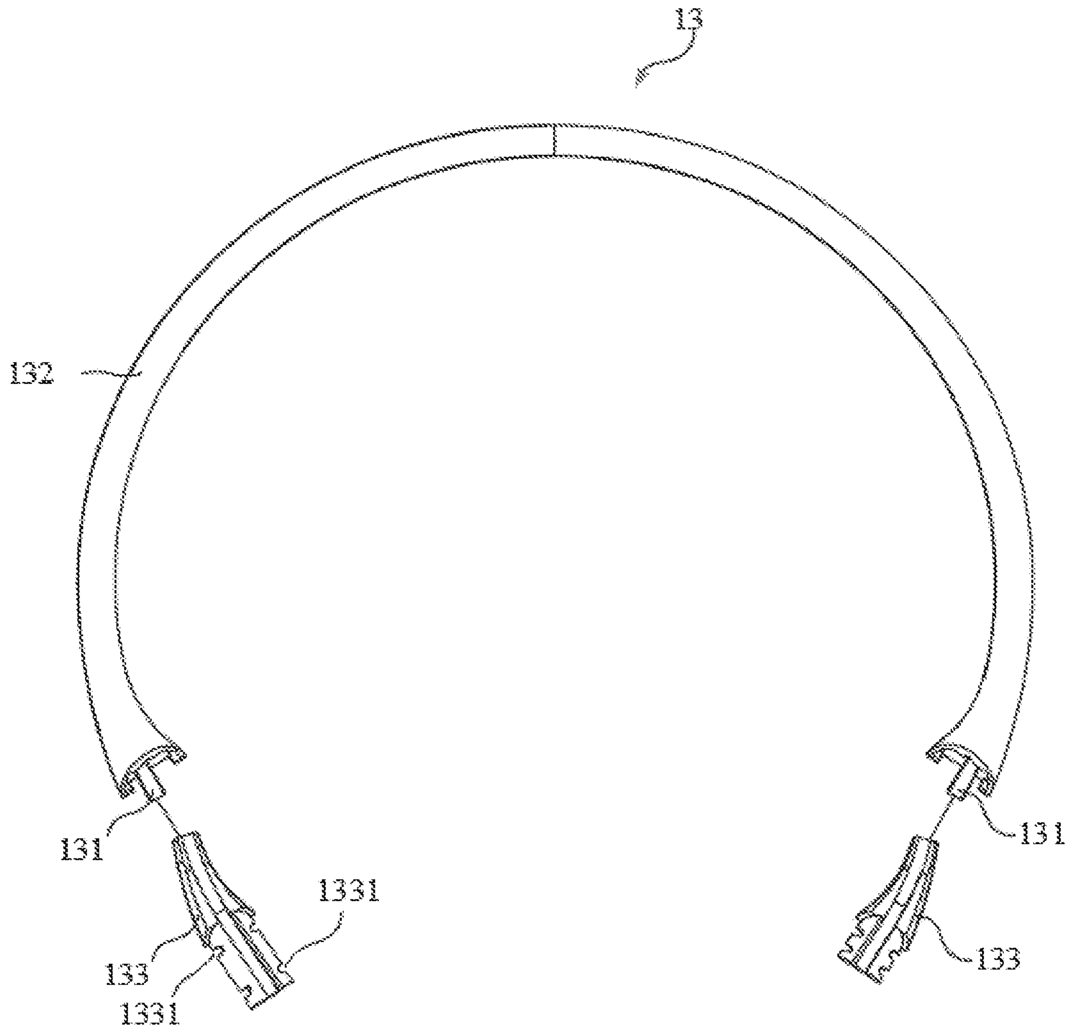
FIG. 17 is an exploded diagram illustrating a structure of a rear hook assembly of an acoustic input and output apparatus according to some embodiments of the present disclosure.

In some embodiments, as shown in FIG. 17, the rear hook connection member may include a rear hook elastic metal filament 131, a rear hook elastic cover layer 132 covering the rear hook elastic metal filament 131, and the inserting parts 133 arranged at the two ends of the rear hook elastic metal filament 131. The rear hook elastic cover layer 132 may also cover at least a part of the inserting parts 133.

The inserting parts 133 may be configured to be matched to and plugged in the ear hook assembly 12. In some embodiments, one side of the first ear hook housing 121 away from the ear hook connection assembly 122 may be configured with the plug-in hole 1218 (as shown in FIG. 18). The plug-in hole 1218 and the second slot 1212 may be arranged adjacently. The inserting parts 133 may be matched to and plugged in the plug-in hole 1218. At least one of the inserting parts 133 may be configured with two groups of notches 1331 arranged at an interval in the length direction. That is, the two groups of notches 1331 may be arranged on at least one of the inserting parts 133 at an interval in the length direction of the inserting parts 133, and each group of notches 1331 may include at least one notch 1331. The rear hook elastic metal filament 131 may be inserted into the inserting parts 133 via one end of the inserting parts 133. A group of notches 1331 may be close to the inserting parts 133, and the other group of notches 1331 may be arranged at one end away from the inserting parts 133.

In some embodiments, the two groups of notches 1331 may be sequentially arranged along the direction from one end of the inserting parts 133 to the other end of the inserting parts 133. The notches 1331 near one end of the inserting parts 133 may be configured to perform mold positioning. The notches 1331 away from one end of the inserting parts 133 may be configured to be stuck and matched to the first ear hook housing 121.

In some embodiments, the two groups of notches 1331 may be divided into a first group of notches 1331 and a second group of notches 1331. The first group of notches 1331 may be arranged at one end away from the inserting parts 133 and configured to be stuck and matched to the ear hook assembly 12. As shown in FIG. 17 and FIG. 18, in some embodiments, stuck connection parts 12181 may be arranged protruding from the first ear hook housing 121. For example, the stuck connection parts 12181 may be arranged protruding from the plug-in hole of the first ear hook housing 121. The inserting parts 133 may be inserted into the plug-in hole 1218 and the stuck connection parts 12181 may be inserted into the first group of notches 1331, thereby restricting the relative movement between the ear hook assembly 12 and the rear hook assembly 13.

In some embodiments, the second group of notches 1331 may be arranged at one end close to the inserting parts 133 and configured for mold positioning. That is, the second group of notches 1331 may be combined with corresponding convex structures on the mold, thereby accurately fixing the inserting parts 133 to a certain position and performing other processes to enhance the good product rate. For example, the inserting parts 133 and the rear hook elastic metal filament 131 may be positioned by the second group of notches 1331, and the rear hook elastic cover layer 132 may be formed by injection molding.

In some embodiments, the notches 1331 may be arranged to extend along a direction along edges at two sides of a central axis of the inserting part to the central axis.

In some embodiments, the count of notches in each group may be the same or different. As shown in FIG. 17, in some embodiments, each group of notches 1331 may include two notches 1331, and two notches 1331 in each group may be arranged opposite to each other. In some embodiments, the count of notches 1331 in the first group of notches 1331 may be one, and the count of the second group of notches 1331 may be two.

It should be noted that the headset may be for illustrative purposes merely, and the specific form of the acoustic input and output apparatus 10 in the present disclosure may be not limited to the headset, for example, the acoustic input and output apparatus 10 may be glasses, such as cycling glasses, music glasses, AR (AugmentReality) glasses, VR (VirtualReality) glasses. As another example, the acoustic input and output apparatus 10 may be a hearing aid.

The basic concepts have been described above, apparently, to those skilled in the art, the detailed disclosure is only taken as an example, and does not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In addition, those skilled in the art may understand that various aspects of the present disclosure may be illustrated and described through several patentable categories or situations, including any new and useful processes, machines, products, or combinations of materials or any new and useful improvements to them. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block", "module", "engine", "unit", "component" or "system". In addition, aspects of the present disclosure may appear as a computer product located in one or more computer-readable media, the product including computer-readable program code.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, a number illustrating elements and the count of attributes may be used. It should be understood that such numbers describing the embodiments, in some examples, may use "about", "approximately", "generally", or the like, to modify. Unless otherwise stated, "about", "approximately", or "generally" may indicate that the number is allowed to vary by ±20%. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An acoustic input and output apparatus, comprising:

a loudspeaker assembly;

a sound-pickup assembly configured to pick up a sound signal; and a connection assembly including an elastic member, wherein a first end of the elastic member connects to the loudspeaker assembly, and a second end of the elastic member connects to the sound-pickup assembly, wherein the sound-pickup assembly is rotatable relative to the loudspeaker assembly; and the loudspeaker assembly includes a first loudspeaker housing, wherein the connection assembly further includes a rotation member matched and connected to a first through-hole arranged on the first loudspeaker housing rotatably, and the sound-pickup assembly is connected with the rotation member so as to rotate relative to the first loudspeaker housing.

2. The acoustic input and output apparatus of claim 1, wherein the loudspeaker assembly further includes a second loudspeaker housing and a loudspeaker, wherein the first loudspeaker housing is matched and connected to the second loudspeaker housing to form a containment space for accommodating the loudspeaker, wherein the first through-hole and a second through-hole are arranged on the first loudspeaker housing at an interval, and the first through-hole and second through-hole are in communication with the containment space; and a wiring group of the sound-pickup assembly traverses the first through-hole, the containment space, and the second through-hole.

3. The acoustic input and output apparatus of claim 1, wherein the rotation member includes a wire-guiding part and a rotation part connecting with each other;

the rotation part is inserted in the first through-hole; and the sound-pickup assembly is connected with the wire-guiding part to enable the wiring group of the sound-pickup assembly to pass through the wire-guiding part and enter the first through-hole via the rotation part.

4. The acoustic input and output apparatus of claim 3, wherein a damping groove is arranged along a circumferential direction of the rotation part;

the connection assembly further includes a damping member arranged in the damping groove; and the damping member contacts an inner wall of the first through-hole to provide a rotational damping for the rotation part via contact friction.

5. The acoustic input and output apparatus of claim 4, wherein the rotation part includes a rotation main body, and a first stopping part and a second stopping part protruding from two ends of the rotation main body along radial directions of the rotation main body, respectively;

the rotation main body is inserted into the first through-hole;

the first stopping part and the second stopping part abut against two sides of the first loudspeaker housing, respectively, to restrict a movement of the rotation part relative to the first loudspeaker housing along an axial direction; and the damping groove is formed between the first stopping part and the second stopping part.

6. The acoustic input and output apparatus of claim 3, wherein the connection member further includes a rotation-limiting structure configured to restrict a rotation range of the rotation part relative to the first loudspeaker housing.

7. The acoustic input and output apparatus of claim 6, wherein the rotation range of the rotation part is 0~270 degrees.

8. The acoustic input and output apparatus of claim 6, wherein the rotation-limiting structure includes a limiting groove arranged at an upper portion of the rotation part along a circumferential direction, and a limiting member arranged on the inner wall of the first through-hole and matched to the limiting groove; and the limiting member abuts against two ends of the limiting groove, when the rotation part rotates relative to the first loudspeaker housing, to restrict the rotation part from rotating.

9. The acoustic input and output apparatus of claim 8, wherein the limiting groove is arranged as an open-loop.

10. The acoustic input and output apparatus of claim 3, wherein the wire-guiding part is configured with a first hole segment, the rotation part is arranged with a second hole segment, and the first hole segment communicates with the second hole segment;

the sound-pickup assembly is matched and connected to the first hole segment; and the wiring group of the sound-pickup assembly traverses the first hole segment and reaches the first through-hole via the second hole segment.

11. The acoustic input and output apparatus of claim 10, wherein the loudspeaker assembly further includes a fixing member configured to restrict a movement of the sound-pickup assembly relative to the rotation member.

12. The acoustic input and output apparatus of claim 11, wherein the fixing member includes a fixing main body inserted into the second hole segment, and matched and connected to the first end of the elastic member to restrict the movement of the elastic member relative to the rotation member.

13. The acoustic input and output apparatus of claim 12, wherein the fixing member further includes a fixedly connection part arranged on one end of the fixing main body, and the first end of the elastic member is configured with a fixedly adaptive connection part; and the fixedly connection part is able to be matched and connected with the fixedly adaptive part.

14. The acoustic input and output apparatus of claim 12, wherein gaps are formed at one end of the rotation part away from the wire-guiding part, and the gaps communicate with the second hole segment; and the fixing member further includes convex tables arranged protruding from a periphery of the fixing main body, and the convex tables are inserted into the gaps to fill the gaps.

15. The acoustic input and output apparatus of claim 14, wherein a count of the gaps is at least two, and the gaps divide the rotation part into at least two sub-members spaced apart from each other along the circumferential direction of the rotation part.

16. The acoustic input and output apparatus of claim 15, wherein the count of the gaps is two, and the gaps are arranged opposite to each other;

a count of the convex tables is two, correspondingly, and the convex tables are arranged deviating from each other; and the two convex tables are inserted into the two gaps, respectively, so that the fixing member is supported between two sub-members.

17. The acoustic input and output apparatus of claim 1, wherein the elastic member includes an elastic metal filament and plug-in parts connecting to the two ends of the elastic metal filament, respectively;

one of the plug-in part is configured to match and plug in the sound-pickup assembly;

the other one of the plug-in part is configured to match and plug in the loudspeaker assembly; and the plug-in part is connected to and plugged in the loudspeaker assembly.

18. The acoustic input and output apparatus of claim 1, wherein the connection assembly further includes an elastic cover layer covering a periphery of the elastic member.

19. The acoustic input and output apparatus of claim 1, wherein the elastic member is configured to cause an average amplitude attenuation rate of vibrations within a phonic frequency band generated by the loudspeaker assembly to be larger than or equal to 35% in a process that the vibrations transmit from the first end of the elastic member to the second end of the elastic member.

* * * * *